(12) United States Patent
Sasaki et al.

(10) Patent No.: US 12,049,556 B2
(45) Date of Patent: *Jul. 30, 2024

(54) RESIN COMPOSITION, OPTICAL FILTER, IMAGE DISPLAY DEVICE, SOLID-STATE IMAGING ELEMENT, AND COMPOUND

(71) Applicant: FUJIFILM Corporation, Tokyo (JP)

(72) Inventors: Daisuke Sasaki, Kanagawa (JP); Hidetomo Furuyama, Kanagawa (JP); Akihiro Hara, Kanagawa (JP); Hiroki Kuwahara, Kanagawa (JP); Yu Naito, Kanagawa (JP); Nobutaka Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1006 days.

This patent is subject to a terminal disclaimer.

(21) Appl. No.: 17/001,833

(22) Filed: Aug. 25, 2020

(65) Prior Publication Data

US 2020/0385558 A1 Dec. 10, 2020

Related U.S. Application Data

(63) Continuation of application No. PCT/JP2019/007265, filed on Feb. 26, 2019.

(30) Foreign Application Priority Data

Feb. 28, 2018 (JP) ................. 2018-035023
May 31, 2018 (JP) ................. 2018-104901
Oct. 1, 2018 (JP) ................. 2018-186845

(51) Int. Cl.
*C08L 25/06* (2006.01)
*C08L 45/00* (2006.01)
(Continued)

(52) U.S. Cl.
CPC ............... *C08L 25/06* (2013.01); *C08L 45/00* (2013.01); *C09B 57/007* (2013.01); *C09B 57/10* (2013.01);
(Continued)

(58) Field of Classification Search
CPC ........ C08L 25/06; C08L 45/00; C09B 57/007; C09B 57/10; G02B 5/223
See application file for complete search history.

(56) References Cited

U.S. PATENT DOCUMENTS

2008/0207918 A1   8/2008   Aoyama et al.
2020/0217993 A1   7/2020   Fukagawa et al.

FOREIGN PATENT DOCUMENTS

CN    1989208 A    * 6/2007 ............ B41M 5/265
CN    101151331 A    3/2008
(Continued)

OTHER PUBLICATIONS

English machine translation of CN 1989208A. (Year: 2007).*
(Continued)

*Primary Examiner* — John E Uselding
(74) *Attorney, Agent, or Firm* — Edwards Neils LLC; Jean C. Edwards, Esq.

(57) ABSTRACT

Provided are a resin composition including a compound represented by Formula (1) and a resin, an optical filter including the resin composition, a liquid crystal display device and a solid-state imaging element including the optical filter, and a compound suitable as a light absorbing component of the resin composition.

Formula (1)

$$\text{Dye}\text{—}(Q^1)_{n1}$$

(Continued)

In Formula (1), Dye represents a colorant structural part obtained by removing n1 hydrogen atoms from a squarylium compound having a specific structure, $Q^1$ is a structural part including a metallocene structure, and n1 represents an integer of 1 to 6.

15 Claims, 1 Drawing Sheet

(51) Int. Cl.
 *C09B 57/00* (2006.01)
 *C09B 57/10* (2006.01)
 *G02B 5/22* (2006.01)
 *G02F 1/1335* (2006.01)
 *G06F 1/16* (2006.01)

(52) U.S. Cl.
 CPC ........ *G02B 5/223* (2013.01); *G02F 1/133514* (2013.01); *G06F 1/1609* (2013.01)

(56) References Cited

FOREIGN PATENT DOCUMENTS

| | | | | |
|---|---|---|---|---|
| CN | 102675376 A | * | 9/2012 | ............ C07F 17/02 |
| JP | 2006-312710 A | | 11/2006 | |
| JP | 2008-145480 A | | 6/2008 | |
| KR | 10-2007-0117594 A | | 12/2007 | |
| WO | 2006/035555 A1 | | 4/2006 | |
| WO | 2006/109618 A1 | | 10/2006 | |
| WO | 2008/090757 A1 | | 7/2008 | |
| WO | 2019/066043 A1 | | 4/2019 | |

OTHER PUBLICATIONS

English machine translation of CN 102675376A. (Year: 2012).*
Office Action, issued by the State Intellectual Property Office on Sep. 23, 2021, in connection with Chinese Patent Application No. 201980015386.4.
Office Action, issued by the State Intellectual Property Office on May 7, 2022, in connection with Chinese Patent Application No. 201980015386.4.
Office Action, issued by the Korean Intellectual Property Office on Jan. 26, 2022, in connection with Korean Patent Application No. 10-2020-7024629.
Office Action, issued by the State Intellectual Property Office on Feb. 8, 2022, in connection with Chinese Patent Application No. 201980015386.4.
Office Action, issued by the Japanese Patent Office on Mar. 30, 2021, in connection with Japanese Patent Application No. 2020-503517.
International Search Report issued in connection with International Patent Application No. PCT/JP2019/007265 on May 28, 2019.
Written Opinion of the International Searching Authority issued in connection with International Patent Application No. PCT/JP2019/007265 on May 28, 2019.
International Preliminary Report on Patentability issued in connection with International Patent Application No. PCT/JP2019/007265 on Sep. 1, 2020.
Yang Wei Huang et al., Synthesis and Properties of a Novel Squaraine Dye Modified by Ferrocene, Chinese Chemical Letters, 2011 22, pp. 1301-1304, China.
Yutaka Hyodo et al., Synthesis and Light Absorption/Emission Properties of Novel Squarylium Dimers Bearing a Ferrocene Spacer, Dyes and Pigments, 2002, 54, pp. 163-171, Japan.
Hiroyuki Nakazumi et al., Synthesis and Photochemical Properties of Ferrocene-Linked Squarylium Dimer, Synthetic Metals, 2003, 137, pp. 1395-1396, Japan.
Herbert Meier et al., Near Infrared Dyes by Combibation of Squaraine and Ferrocene Chromophores, Tetrahedron Letters, 2000, 41, pp. 5475-5478, Germany.

* cited by examiner

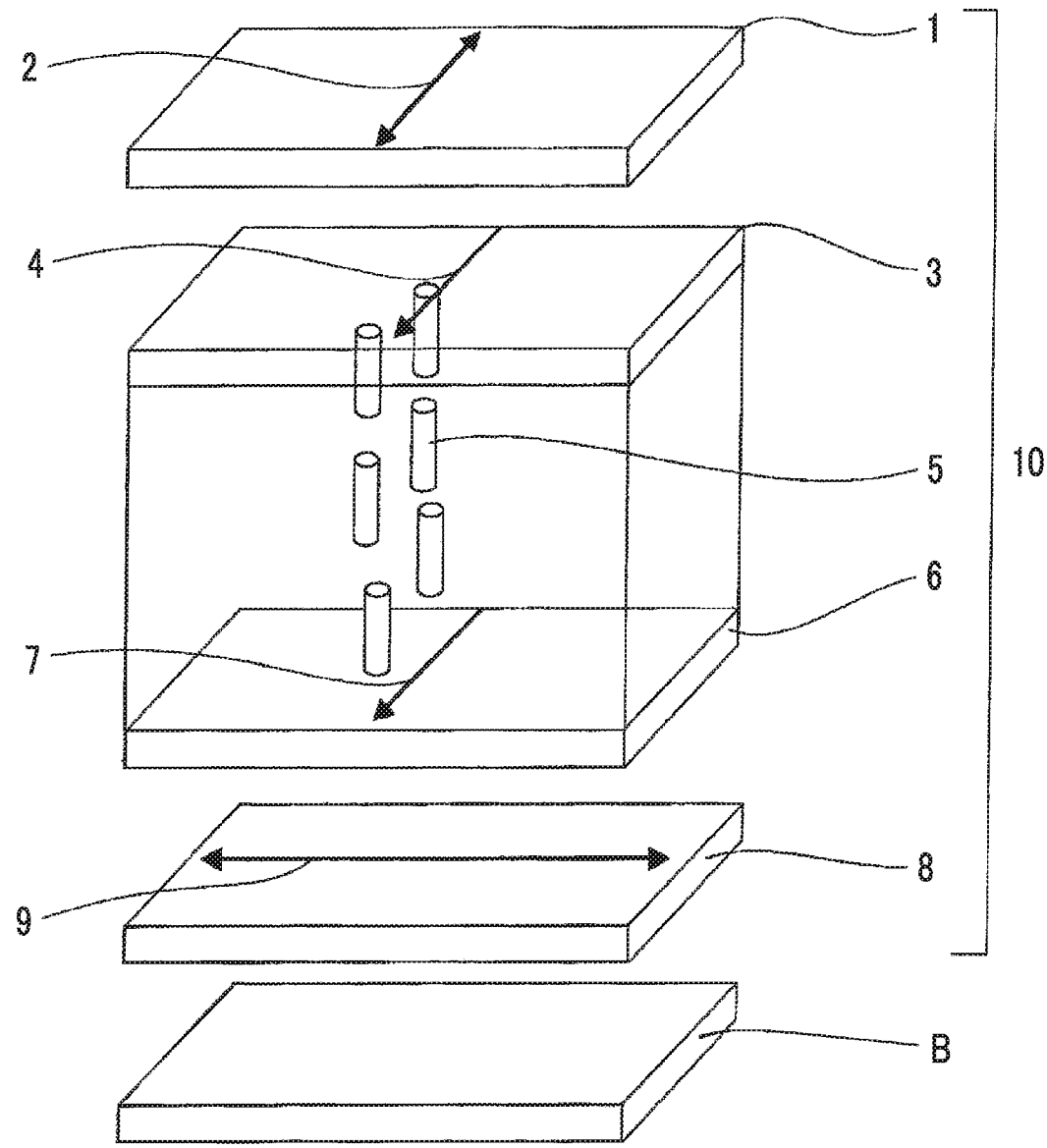

RESIN COMPOSITION, OPTICAL FILTER, IMAGE DISPLAY DEVICE, SOLID-STATE IMAGING ELEMENT, AND COMPOUND

CROSS-REFERENCE TO RELATED APPLICATIONS

This application is a Continuation of PCT International Application No. PCT/JP2019/007265 filed on Feb. 26, 2019, which was published under PCT Article 21(2) in Japanese, and which claims priority under 35 U.S.C. § 119 (a) to Japanese Patent Application No. JP2018-035023 filed in Japan on Feb. 28, 2018, Japanese Patent Application No. JP2018-104901 filed in Japan on May 31, 2018, and Japanese Patent Application No. JP2018-186845 filed in Japan on Oct. 1, 2018. The above applications are hereby expressly incorporated by reference, in their entirety, into the present application.

BACKGROUND OF THE INVENTION

1. Field of the Invention

The present invention relates to a resin composition suitable as a constituent material of an optical filter, an optical filter formed of the resin composition, and an image display device and a solid-state imaging element formed of the optical filter. In addition, the present invention relates to a compound suitable as a light absorbing component of the resin composition.

2. Description of the Related Art

A liquid crystal display device is widely used as a space-saving image display device with low power consumption. In a market in which high-quality images are required, such as a television, there is an increasing demand for improvement in color reproducibility in addition to a resolution.

In the liquid crystal display device, a liquid crystal panel displaying images is a non-light emitting element which does not emit light itself. Therefore, a backlight unit is disposed on a rear surface of the liquid crystal panel and supplies light to the liquid crystal panel.

In recent years, as a light source for the backlight unit, a white light emitting diode (LED) has been used. As a light emitting device formed of the white LED, a device of producing white light by mixing blue light radiated from a blue LED and light radiated from a yellow fluorescent body, or a green fluorescent body and a red fluorescent body is known. However, the above-described device has a problem in that a color reproduction range is narrow compared to an organic light emitting diode (OLED) or the like which is in the spotlight as a next-generation display. There is a demand for new technique for overcoming this problem, a technique in which a coating layer including a dye is provided on a diffusion film in the backlight unit, thereby blocking light having an unnecessary wavelength which is emitted from the white LED, has been proposed. In addition, in WO2008/090757A and JP2008-145480A, color correcting filters formed of squarylium colorants having a specific substituent are proposed. In JP2006-312710A, an optical filter formed of a cyanine compound is proposed.

SUMMARY OF THE INVENTION

However, as a result of additional studies with regard to the colorant disclosed in WO2008/090757A and JP2008-145480A, the present inventors have found that, in a case where an optical filter formed of the colorant is used, for example, as a protective film for a polarizing plate used in a liquid crystal display device, fluorescence emitted according to an absorption of light by the colorant causes depolarization, which lowers the polarization performance of the polarizing plate (a disadvantage in achieving high contrast). In addition, it has also been clarified that a light absorption capacity of the optical filter easily decreases over time by irradiation with light.

In addition, it has also been found that even the colorant described in JP2006-312710A cannot sufficiently satisfy light resistance required for the optical filter.

Therefore, an object of the present invention is to provide an optical filter which is capable of blocking light at a target specific wavelength, such as a light having an unnecessary wavelength which is emitted from a white LED, is capable of effectively suppressing fluorescence emission, and has an excellent light resistance, a resin composition suitable as a constituent material of the optical filter, and an image display device and a solid-state imaging element comprising the optical filter. In addition, an object of the present invention is to provide a compound suitable as a light absorbing component of the resin composition.

As a result of repeated intensive studies with regard to the above-described objects, the present inventors have found that, in a case of forming an optical filter by a composition which includes a compound having a specific squarylium colorant structural part and a metallocene structural part, and a resin, it is possible to obtain an optical filter which is capable of specifically absorbing and blocking light at a target specific wavelength, is also capable of effectively suppressing fluorescence emission excited from the squarylium colorant structural part by the absorption of light, and further has an excellent light resistance. That is, by forming a molecular structure in which a squarylium colorant known as a fluorescent colorant with a high quantum yield is linked to a metallocene compound, and further introducing a hydrogen-bonding group which forms an intramolecular hydrogen bond, it is possible to sufficiently suppress fluorescence emission while realizing the absorption of light at a specific wavelength, and at the same time, to suppress oxidative decomposition of the squarylium colorant accompanying the absorption of light.

The present invention has been completed by further repeating studies on the basis of the above-described finding.

That is, the above-described objects can be achieved by the following methods.

[1] A resin composition comprising:
a compound represented by Formula (1); and
a resin, $$\text{Dye}-(Q^1)_{n1} \qquad \text{Formula (1)}$$

in Formula (1), Dye represents a colorant structural part obtained by removing n1 hydrogen atoms from a compound represented by Formula (2), Formula (2)

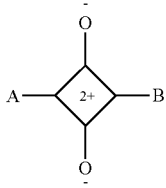

in Formula (2), A and B represent an aryl group, a heterocyclic group, or —CH=G, in which G represents a heterocyclic group, and at least one of A or B has a hydrogen-bonding group forming an intramolecular hydrogen bond,
$Q^1$ represents a group represented by Formula (2M), Formula (2M)

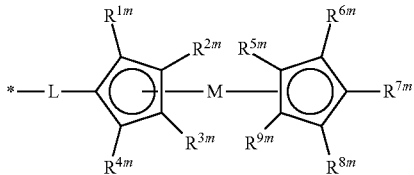

here, L represents a single bond or a divalent linking group which is not conjugated with Dye, $R^{1m}$ to $R^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part with Dye, and
n1 represents an integer of 1 to 6.
[2] The resin composition according to [1],
in which A in Formula (2) is a heterocyclic group.
[3] The resin composition according to [1],
in which Dye represents a colorant structural part obtained by removing n1 hydrogen atoms from a compound represented by Formula (5-1) or (5-2), Formula (5-1)

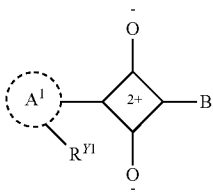

Formula (5-2)

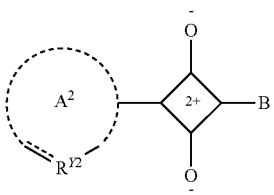

here, $A^1$ represents an aryl group or a heterocyclic group and $A^2$ represents a heterocyclic group,
$R^{Y1}$ represents a monovalent hydrogen-bonding group and $R^{Y2}$ represents a divalent or trivalent hydrogen-bonding group, and B has the same meaning as B in Formula (2).
[4] The resin composition according to any one of [1] to [3], in which M in Formula (2M) is Fe.
[5] The resin composition according to any one of [1] to [4],
in which the resin is at least one kind selected from a polystyrene resin, a cellulose acylate resin, an acrylic resin, or a cycloolefin resin.
[6] An optical filter comprising:
the resin composition according to any one of [1] to [5].
[7] The optical filter according to [6],
in which the optical filter has a film form.
[8] An image display device comprising:
the optical filter according to [6] or [7].
[9] A solid-state imaging element comprising:
the optical filter according to [6] or [7].
[10] A compound represented by Formula (1A), Formula (1A)

$Dye^1\text{—}(Q^1)_{n1}$ in Formula (1A), $Dye^1$ represents a colorant structural part obtained by removing n hydrogen atoms from a compound represented by Formula (2A), Formula (2A)

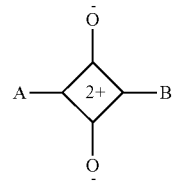

in Formula (2A), A represents a heterocyclic group, B represents an aryl group, a heterocyclic group, or —CH=G, in which G represents a heterocyclic group, and at least one of A or B has a hydrogen-bonding group forming an intramolecular hydrogen bond,
$Q^1$ represents a group represented by Formula (2MA), Formula (2MA)

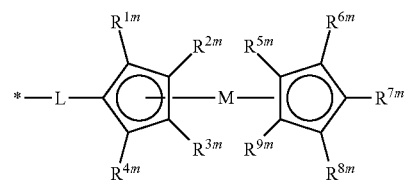

here, L represents a single bond or a divalent linking group which is not conjugated with $Dye^1$, $R^{1m}$ to $R^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part with $Dye^1$, and
n1 represents an integer of 1 to 6.
[11] The compound according to [10],
in which L in Formula (2MA) is a single bond, a group selected from the group consisting of an alkylene group having 1 to 8 carbon atoms, an arylene group having 6 to 12 carbon atoms, —CH=CH—, —CO—, —NR—, —O—, —S—, —SO$_2$—, and —N=CH—, or a group of a combination of two or more groups selected from the group consisting thereof, in which R represents a hydrogen atom or a monovalent substituent, R$^{1m}$ to R$^{9m}$ are a hydrogen atom, a halogen atom, an alkyl group, an acyl group, or an alkoxy group, and M is Fe.

[12] The compound according to [10] or [11], in which Dye$^1$ is a colorant structural part obtained by removing n1 hydrogen atoms from a compound represented by Formula (5-1A) or (5-2A),

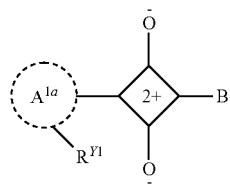

Formula (5-1A)

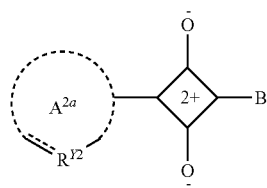

Formula (5-2A)

here, A$^{1a}$ and A$^{2a}$ represent a heterocyclic group,

R$^{Y1}$ represents a monovalent hydrogen-bonding group and R$^{Y2}$ represents a divalent or trivalent hydrogen-bonding group, and B has the same meaning as B in Formula (2A).

[13] The compound according to any one of [10] to [12], in which Dye$^1$ is a colorant structural part obtained by removing n1 hydrogen atoms from a compound represented by Formula (3),

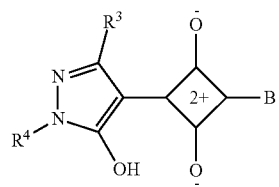

Formula (3)

here, R$^3$ and R$^4$ represent a hydrogen atom or a substituent, and

B is the same as B in Formula (2A).

[14] A compound represented by Formula (6),

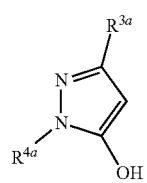

Formula (6)

in the formula, R$^{3a}$ and R$^{4a}$ represent a hydrogen atom or a substituent and at least one of R$^{3a}$ or R$^{4a}$ represents a group represented by Formula (2MB),

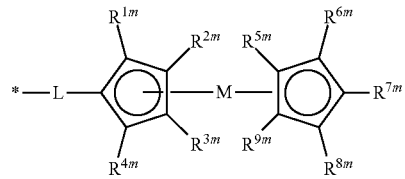

Formula (2MB)

here, L is a single bond, a group selected from the group consisting of an alkylene group having 1 to 8 carbon atoms, an arylene group having 6 to 12 carbon atoms, —CH=CH—, —CO—, —NR—, —O—, —S—, —SO$_2$—, and —N=CH—, or a group of a combination of two or more groups selected from the group consisting thereof, in which R represents a hydrogen atom or a monovalent substituent, R$^{1m}$ to R$^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part.

[15] A compound represented by Formula (7),

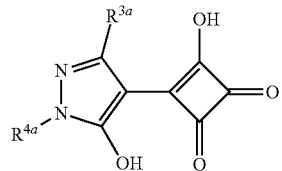

Formula (7)

in the formula, R$^3$ and R$^4$ represent a hydrogen atom or a substituent and at least one of R$^{3a}$ or R$^{4a}$ represents a group represented by Formula (2MB),

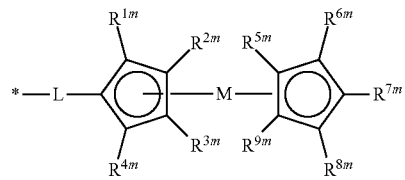

Formula (2MB)

here, L is a single bond, a group selected from the group consisting of an alkylene group having 1 to 8 carbon atoms, an arylene group having 6 to 12 carbon atoms, —CH=CH—, —CO—, —NR—, —O—, —S—, —SO$_2$—, and —N=CH—, or a group of a combination of two or more groups selected from the group consisting thereof, in which R represents a hydrogen atom or a monovalent substituent, R$^{1m}$ to R$^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part.

In compounds (colorants) represented by chemical structural formulae described in the present invention or the present specification, cations are present in a delocalized manner, and a plurality of tautomer structures is present.

Therefore, in the present invention, in a case where at least one tautomer structure of a certain colorant matches a chemical structural formula defined as each formula, the colorant is considered as a colorant represented by the individual general formula. Therefore, a colorant represented by a specific general formula can be said to be a colorant having at least one tautomer structure which can be represented by the specific general formula. In the present invention, a colorant represented by a general formula may have any tautomer structure as long as at least one tautomer structure of the colorant matches the general formula.

In the present invention, numerical ranges expressed using "to" include numerical values before and after "to" as the lower limit value and the upper limit value.

In the present invention, in a case of a plurality of substituents, linking groups, and the like (hereinafter, referred to as a substituent and the like) represented by a specific reference, or in a case of simultaneously or alternatively defining a plurality of the substituent and the like, it means that each of the substituent and the like may be the same as or different from each other. The same applies to the definition of the number of substituents and the like. In a case where a plurality of the substituents and the like is near (particularly, adjacent to each other), it means that the substituents and the like may be linked to each other or condensed to form a ring.

In the present invention, the expression of a compound is used to include the compound itself, a salt thereof, and an ion thereof. In addition, it means that a part of the structure may be changed as long as the desired effect is not impaired. Examples of the salt of the compound include an acid-addition salt of the compound, formed of the compound and an inorganic acid or an organic acid, and a base-addition salt of the compound, formed of the compound and an inorganic base or an organic base. In addition, examples of the ion of the compound include ions generated by dissolving the salt of the compound in water, a solvent, or the like.

In the present specification, regarding a substituent (the same applies to a linking group) in which whether it is substituted or unsubstituted is not specified, within the range not impairing the desired effect, it means that the group may have any substituent. The same applies to a compound or a repeating unit in which whether it is substituted or unsubstituted is not specified.

In the present invention, in a case of defining a number of carbon atoms of a group, the number of carbon atoms means the number of carbon atoms of the entire group. That is, in a case of an aspect in which the group has a substituent, it means the total number of carbon atoms including the substituent.

In the present invention, in the case where a group can form an acyclic skeleton and a cyclic skeleton, unless described otherwise, the group includes an acyclic skeleton group and a cyclic skeleton group. For example, an alkyl group includes, unless described otherwise, a linear alkyl group, a branched alkyl group, and a cyclic (cyclo) alkyl group. In a case where a group forms a cyclic skeleton, the lower limit of the number of carbon atoms in the cyclic skeleton group is preferably 3 or more and more preferably 5 or more, regardless of the lower limit of the number of carbon atoms specifically described for the group.

In the present invention, the term "(meth)acrylic" is used to include both methacrylic and acrylic.

The optical filter according to an aspect of the present invention is capable of blocking light at a target specific wavelength, such as a light having an unnecessary wavelength which is emitted from a white LED, is also capable of effectively suppressing fluorescence emission, and further has an excellent light resistance. In addition, the image display device and solid-state imaging element according to an aspect of the present invention are excellent in image contrast. In addition, the resin composition according to an aspect of the present invention is suitable as a material for forming the optical filter according to the aspect of the present invention. In addition, the compound according to an aspect of the present invention can be used as a light absorbing component of the resin composition according to the aspect of the present invention.

BRIEF DESCRIPTION OF THE DRAWINGS

FIG. 1 is a schematic view showing an outline of an embodiment of a liquid crystal display device comprising a polarizing plate which has the optical filter of the present invention in a backlight.

DESCRIPTION OF THE PREFERRED EMBODIMENTS

[Resin Composition]

The resin composition according to the embodiment of the present invention is formed of a colorant compound having a specific structure and a resin as a binder. The colorant compound has a structural part of a squarylium colorant having absorption in a specific wavelength range of visible light, and a metallocene structural part. In the resin composition, in a case where the squarylium colorant structural part is excited by absorption of light, the metallocene structural part of the colorant compound suppresses the fluorescence emission, and also suppresses decomposition of the squarylium colorant structural part. The decomposition is more effectively suppressed by forming an intramolecular hydrogen bond in the colorant compound. The resin composition according to the embodiment of the present invention is suitable as a constituent material of the optical filter (filter including a colorant compound and a resin) according to the embodiment of the present invention.

<Colorant>

The colorant compound used in the resin composition according to the embodiment of the present invention is represented by Formula (1).

$$\text{Dye} \text{---} (Q^1)_{n1} \qquad \text{Formula (1)}$$

In Formula (1), Dye represents a colorant structural part obtained by removing n1 hydrogen atoms from a compound represented by Formula (2).

$Q^1$ represents a group represented by Formula (2M).

n1 represents an integer of 1 to 6, preferably 1 to 4, and more preferably 1 or 2. In a case where n1 is an integer of 2 or more, $Q^1$ may be the same as or different from each other.

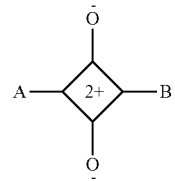

Formula (2)

In Formula (2), A and B each independently represent an aryl group, a heterocyclic group, or —CH=G. G represents a heterocyclic group. At least one of A or B has a hydrogen-bonding group forming an intramolecular hydrogen bond.

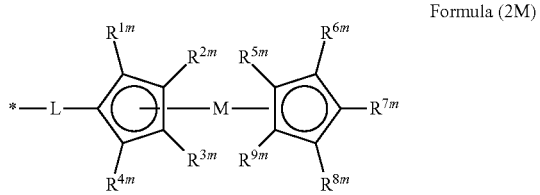

Formula (2M)

In Formula (2M), L represents a single bond or a divalent linking group which is not conjugated with Dye. $R^{1m}$ to $R^{9m}$ represent a hydrogen atom or a substituent. M represents Fe, Co, Ni, Ti, Cu, Zn, Zr, Cr, Mo, Os, Mn. Ru, Sn, Pd, Rh, V, or Pt. * represents a bonding part with Dye.

In the compound of Formula (1), in a case where L in Formula (2M) is a divalent linking group, Dye is a structure up to a portion (atom) where a conjugated structure is interrupted by linking with L. That is, in a case where L is not a single bond but a divalent linking group, the bonding portion of L with Dye does not have a conjugated structure. In other words, L is a single bond in a case where a conjugated structure continues from Dye to the group represented by Formula (2M) (metallocene structural part) (that is, a case where a conjugated structure continues from Dye to the metallocene skeleton in Formula (2M)). Here, the conjugated structure means a structure forming a system of connected p-orbitals having delocalized electrons located in alternating single bond and multiple bond, and also includes a structure including a p-orbital donating group, a p-orbital donating atom, or a p-orbital donating group and a p-orbital donating atom. Examples of the p-orbital donating group include a carbonyl group and a sulfonyl group. The p-orbital donating atom is an atom having two lone electron-pairs, one of which occupies a p-orbital, and examples thereof include an oxygen atom, a nitrogen atom, and a sulfur atom. In a case of including a p-orbital donating group and a p-orbital donating atom, examples thereof include a structure of a combination of a plurality (preferably an integer number of 2 to 10) of the p-orbital donating atom and the p-orbital donating group. For example, a divalent group represented by —O—CO—, —NH—CO—, —NH—SO$_2$—, —NH—CO—NH—, and the like is a group which forms the conjugated structure. In the present invention, in a case where L in Formula (2M) is a single bond, a cyclopentadienyl ring (ring having $R^{1m}$ in Formula (2M)) directly bonded to Dye is not included in the conjugated structure conjugated with Dye.

Since the squarylium colorant has a sharp absorption spectrum and can specifically absorb light in a specific wavelength range, it is considered to be used as a light blocking component in a display and the like having an LED backlight. However, the squarylium colorant is a fluorescent colorant with a high quantum yield, strong fluorescence is generated with the absorption of light, and there is a problem in which defects such as depolarization occur in a case of being applied to an image display device or the like. In addition, the squarylium colorant is easily oxidized and decomposed by the absorption of light, and from this viewpoint, it is difficult to apply the squarylium colorant to an image display device or the like, which requires high light resistance. On the other hand, the compound represented by Formula (1) has a molecular structure in which the squarylium colorant structure is linked to the metallocene structural part. With such a structure, while exhibiting the light absorbing effect of the squarylium colorant, drawbacks such as the fluorescence emission property and the photo-oxidative decomposition property are overcome. The reason is not clear, but is assumed as follows.

That is, by the molecular structure in which the squarylium colorant is linked to the metallocene compound, it is considered that, in a case where the squarylium colorant structural part is photoexcited, the electron-donor metallocene structural part rapidly injects electrons into the squarylium colorant structural part, which deactivates the excited state. In addition, in the fluorescence deactivation due to an electron transfer, the colorant tends to be in an unstable state (anion radical) in a case where electrons are accepted in excess, which accelerates decomposition of the colorant. On the other hand, since the compound represented by Formula (1) has the molecular structure in which the squarylium colorant structural part is bonded to the metallocene structural part, it is considered that a reverse electron transfer from the anion-radicalized colorant structural part to the metallocene structural part is also promoted, which contributes to the stabilization of the squarylium colorant structural part.

Furthermore, the compound represented by Formula (1) has a characteristic in which it is difficult to associate even in a case of being used at a high concentration. It is known that the squarylium colorant generally has high leveling and has various association states such as H-associate in a case where the concentration of the colorant is increased. The formation of the associates broadens the absorption spectrum of the colorant and also reduces light resistance. However, in the compound represented by Formula (1), moderate steric hindrance is caused by the metallocene structural part and the formation of associates can be effectively suppressed even in a case where the concentration of the colorant is increased. As a result, there is also an advantage that optical filters having various colorant concentrations can be produced according to the purpose.

Furthermore, the compound represented by Formula (1) has a hydrogen-bonding group forming an intramolecular hydrogen bond in the squarylium colorant structural part. The intramolecular hydrogen bond is typically formed between the hydrogen-bonding group and an oxygen atom bonded to a four-membered ring (four-membered ring represented by Formula (2)) of the squarylium colorant structural part. By the intramolecular hydrogen bond, light resistance of the squarylium colorant structural part itself is significantly improved. Furthermore, by shortening excitation lifetime due to an intramolecular proton transfer, it is considered that fluorescence emission of the squarylium colorant can also be effectively suppressed.

As described above, by a combination of the link between the metallocene structural part and the squarylium colorant structural part and the introduction of intramolecular hydrogen bond, it is possible to have excellent light resistance and sufficiently suppress fluorescence emission.

Hereinafter, preferred structures of Dye and $Q^1$ in Formula (1) will be described in detail.

(Dye in Formula (1))

Dye in Formula (1) represents a colorant structural part consisting of a structure in which n1 hydrogen atoms are removed from the compound represented by Formula (2). The portion where the hydrogen atom is removed is a bonding part with L.

An aspect of removing hydrogen atoms from Dye is not particularly limited, and the hydrogen atom may be a hydrogen atom (hydrogen atom directly bonded to an atom constituting the ring structure of an aryl group or a heterocyclic group) included in an aryl group or a heterocyclic group which can be adopted as A or B in Formula (2), or may be a hydrogen atom included in a substituent bonded to the aryl group or the heterocyclic group.

Formula (2)

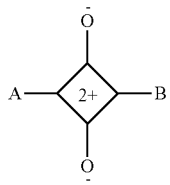

In Formula (2), A and B represent an aryl group, a heterocyclic group, or —CH=G, in which G represents a heterocyclic group.

In Formula (2), A and B may be the same as or different from each other. In addition, A is preferably a heterocyclic group. With such a configuration, the oxidation potential is lower and light resistance is improved.

The aryl group which can be adopted as A or B is not particularly limited, and may be a group formed of a single ring or a group formed of a fused ring. The number of carbon atoms in the aryl group is preferably 6 to 30, more preferably 6 to 20, and still more preferably 6 to 12. Examples of the aryl group include groups formed of a benzene ring or a naphthalene ring, and groups formed of a benzene ring are more preferable.

A heterocyclic group which can be adopted as A or B is not particularly limited, examples thereof include groups formed of an aliphatic hetero ring or an aromatic hetero ring, and groups formed of an aromatic hetero ring are preferable. Examples of a heteroaryl group which is an aromatic heterocyclic group include heteroaryl groups which can be adopted as the substituent X described later. The aromatic heterocyclic group which can be adopted as A or B is preferably a group of a five-membered ring or a six-membered ring and more preferably a group of a nitrogen-containing five-membered ring. Specifically, suitable examples thereof include groups formed of any one of a pyrrole ring, a furan ring, a thiophene ring, an imidazole ring, a pyrazole ring, a thiazole ring, an oxazole ring, a triazole ring, an indole ring, an indolenine ring, an indoline ring, a pyridine ring, a pyrimidine ring, a quinoline ring, a benzothiazole ring, a benzoxazole ring, or a pyrazolotriazole ring. Among these, groups formed of any one of a pyrrole ring, a pyrazole ring, a thiazole ring, a pyridine ring, a pyrimidine ring, or a pyrazolotriazole ring are preferable. The pyrazolotriazole ring is formed of a fused ring of a pyrazole ring and a triazole ring, and means a fused ring formed by fusing at least one of each of the rings.

G in —CH=G which can be adopted as A or B represents a heterocyclic group which may have a substituent, and suitable examples thereof include examples listed as A and B. Among these, groups formed of any one of a benzoxazole ring, a benzothiazole ring, or an indoline ring are preferable.

At least one of A or B has a hydrogen-bonding group forming an intramolecular hydrogen bond. Here, the hydrogen-bonding group means a functional group capable of forming a hydrogen bond with another functional group. The hydrogen-bonding group can be a donor hydrogen-bonding group having a hydrogen atom (hydrogen bond donator: donor). The donor hydrogen-bonding group may function as an acceptor hydrogen-bonding group in the tautomer.

It is preferable that the hydrogen-bonding group is a group which forms an intramolecular hydrogen bond with an oxygen atom bonded to the four-membered ring of the squarylium colorant and adjacent to A or B. That is, it is preferable that the hydrogen-bonding group and the oxygen atom bonded to the four-membered ring of the squarylium colorant are at a distance (positional relationship) capable of forming an intramolecular hydrogen bond. A plurality of hydrogen-bonding groups may be included in the compound represented by Formula (2).

A and B may have the hydrogen-bonding group as a substituent. In this case, the hydrogen-bonding group is a monovalent group having one linking site. Here, "having a monovalent hydrogen-bonding group having one linking site" means that, within the range not impairing the effects of the present invention, the hydrogen-bonding group may be bonded to A or B through a linking group. In addition, in a case where A and B are ring groups, a ring-constituting atom may be also present as a constituent atom of the hydrogen-bonding group (this aspect also referred to as that the hydrogen-bonding group is incorporated in a ring). In this case, the hydrogen-bonding group may be a divalent group having two linking sites for incorporation as ring-constituting atoms, or may be a trivalent group having three linking sites for incorporation as ring-constituting atoms. The hydrogen-bonding group is not particularly limited as long as the hydrogen-bonding group exhibits a hydrogen-bonding property, examples thereof include a hydrogen-donor group. In a case where the hydrogen-bonding group is bonded as a substituent on A and B, the hydrogen-bonding group is preferably —OH, —SH, —NHR$^{1a}$, or —N$^+$HR$^{1a}$R$^{2a}$. R$^{1a}$ and R$^{2a}$ can be appropriately selected from a hydrogen atom or a substituent which can be adopted as R$^1$ in Formula (4) described later. In a case where the hydrogen-bonding group is incorporated in a ring, the hydrogen-bonding group is preferably —NH— or =N$^+$H—.

Each of A, B, and G may have a substituent X, and in a case where A, B, or G has the substituent X, adjacent substituents may be bonded to each other to further form a ring structure. In addition, each of A, B, and G may have a plurality of substituents. In addition, a substituent X included in A and the hydrogen-bonding group included in A may be linked to each other to form a ring. In addition, a substituent X included in B and the hydrogen-bonding group included in B may be linked to each other to form a heterocyclic ring.

Examples of the substituent X include substituents which can be adopted as R$^1$ in Formula (4) described later, and specific examples thereof include a halogen atom, a cyano group, a nitro group, an alkyl group, an alkenyl group, an alkynyl group, an aryl group, a heteroaryl group, an aralkyl group, —OR$^{10a}$, —COR$^{11a}$, —COOR$^{12a}$, —OCOR$^{13a}$, —NR$^{14a}$R$^{15a}$, —NHCOR$^{16a}$, —CONR$^{17a}$R$^{18a}$, —NHCONR$^{19a}$R$^{20a}$, —NHCOOR$^{21a}$, —SR$^{22a}$, —SO$_2$R$^{23a}$, —SO$_3$R$^{24a}$, —NHSO$_2$R$^{25a}$, and —SO$_2$NR$^{26a}$R$^{27a}$.

R$^{10a}$ to R$^{27a}$ each independently represent a hydrogen atom, an aliphatic group, an aromatic group, or a heterocyclic group. The aliphatic group and the aromatic group which can be adopted as R$^{10a}$ to R$^{27a}$ are not particularly limited, and can be appropriately selected from the substituents which can be adopted as R$^1$ in Formula (4) described later. Among these, an alkyl group or an alkenyl group is preferable as the aliphatic group, and an aryl group is preferable as the aromatic group. The heterocyclic group which can be adopted as $R^{10a}$ to $R^{27a}$ may be aliphatic or aromatic, and can be appropriately selected from heteroaryl groups or heterocyclic groups which can be adopted as $R^1$ in Formula (4) described later.

In a case where $R^{12a}$ in —$COOR^{12a}$ is a hydrogen atom (that is, a carboxy group), the hydrogen atom may be dissociated (that is, a carbonate group) or may be in a state of salt. In addition, in a case where $R^{24a}$ in —$SO_3R^{24a}$ is a hydrogen atom (that is, a sulfo group), the hydrogen atom may be dissociated (that is, a sulfonate group) or may be in a state of salt.

Examples of the halogen atom which can be adopted as X include a fluorine atom, a chlorine atom, a bromine atom, and an iodine atom.

The number of carbon atoms in the alkyl group which can be adopted as X is preferably 1 to 20, more preferably 1 to 15, and still more preferably 1 to 8. The number of carbon atoms in the alkenyl group is preferably 2 to 20, more preferably 2 to 12, and still more preferably 2 to 8. The number of carbon atoms in the alkynyl group is preferably 2 to 40, more preferably 2 to 30, and particularly preferably 2 to 25. Each of the alkyl group, the alkenyl group, and the alkynyl group may be any of linear, branched, or cyclic, and is preferably linear or branched.

The aryl group includes a group of a single ring or a fused ring. The number of carbon atoms in the aryl group is preferably 6 to 30, more preferably 6 to 20, and still more preferably 6 to 12.

An alkyl portion in the aralkyl group (alkyl-substituted aryl group) is the same as the above-described alkyl group. An aryl portion in the aralkyl group is the same as the above-described aryl group. The number of carbon atoms in the aralkyl group is preferably 7 to 40, more preferably 7 to 30, and still more preferably 7 to 25.

The heteroaryl group includes a group formed of a single ring or a fused ring, and a group formed of a single ring or a fused ring having 2 to 8 rings is preferable and a group formed of a single ring or a fused ring having 2 to 4 rings is more preferable. The number of hetero atoms constituting a ring of the heteroaryl group is preferably 1 to 3. Examples of the hetero atoms constituting the ring of the heteroaryl group include a nitrogen atom, an oxygen atom, and a sulfur atom. The heteroaryl group is preferably a group formed of a five-membered ring or a six-membered ring. The number of carbon atoms constituting the ring of the heteroaryl group is preferably 3 to 30, more preferably 3 to 18, and still more preferably 3 to 12. Examples of the heteroaryl group include groups formed of a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, or a thiadiazole ring.

Each of the alkyl group, the alkenyl group, the alkynyl group, the aralkyl group, the aryl group, and the heteroaryl group exemplified as the examples of the substituent X may further have a substituent or may be unsubstituted. The substituent which may be further included is not particularly limited, but is preferably a substituent selected from an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbo- nylamino group, an aryloxycarbonylamino group, a sulfonylamino group, an alkylthio group, an arylthio group, an aromatic heterocyclic thio group, a sulfonyl group, a hydroxy group, a mercapto group, a halogen atom, a cyano group, a sulfo group, and a carboxy group, and more preferably a substituent selected from an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxy group, a mercapto group, a halogen atom, a cyano group, a sulfo group, and a carboxy group. These groups can be appropriately selected from the substituents which can be adopted as $R^1$ in Formula (4) described later.

Examples of a preferred embodiment of the colorant represented by Formula (2) include a colorant represented by Formula (5-1) or (5-2).

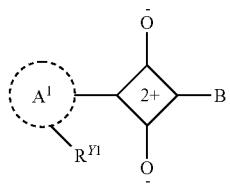

Formula (5-1)

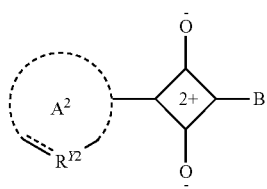

Formula (5-2)

$A^1$ represents an aryl group or a heterocyclic group.

Examples of the aryl group or the heterocyclic group which can be adopted as $A^1$ include the same groups as the aryl group or the heterocyclic group which can be adopted as A in Formula (2).

$R^{Y1}$ represents a monovalent hydrogen-bonding group. Here, "representing a monovalent hydrogen-bonding group" means that, within the range not impairing the effects of the present invention, the hydrogen-bonding group may be bonded to $A^1$ through a linking group. $R^{Y1}$ is not particularly limited as long as $R^{Y1}$ exhibits a hydrogen-bonding property, but is preferably —OH, —SH, —$NHR^{1a}$, or —$N^+HR^{1a}R^{2a}$. $R^{1a}$ and $R^{2a}$ can be appropriately selected from a hydrogen atom or a substituent which can be adopted as $R^1$ in Formula (4) described later, and are preferably —$COR^{c1}$, —$COR^{c2}COR^{c3}$, —$CONR^{c4}R^{c5}$, or the like. $R^{c1}$, $R^{c3}$, $R^{c4}$, and $R^{c5}$ have the same meaning as $R^{10a}$, and are preferably a hydrogen atom, an alkyl group, an alkenyl group, or an aryl group. $R^{c2}$ represents a divalent aliphatic group, and is preferably an alkylene group having 1 to 3 carbon atoms.

In Formula (5-1), it is preferable that $R^{Y1}$ forms an intramolecular hydrogen bond with one oxygen atom of two oxygen atoms bonded to a four-membered ring (hereinafter, simply referred to as a "four-membered ring") which constitutes the squarylium colorant structural part and is bonded to $A^1$. By forming an intramolecular hydrogen bond with one oxygen atom of two oxygen atoms bonded to the four-membered ring which is bonded to $A^1$, $R^{Y1}$ preferably forms a six to eight-membered ring structure (a hydrogen atom forming a hydrogen bond is also counted as a ring-constituting atom; the same applies hereinafter), and more preferably forms a seven-membered ring structure (that is, it is preferable that, among the ring-constituting atoms of $A^1$, a ring-constituting atom adjacent to a ring-constituting atom bonded to the four-membered ring has the hydrogen-bonding group $R^{Y1}$ as a substituent without a linking group).

The aryl group and the heterocyclic group represented by $A^1$ may further have a substituent X. Specific examples of the substituent X are the same as the specific examples of the substituent X which may be included in A in Formula (2).

$A^2$ represents a heterocyclic group.

Examples of $A^2$ include the heterocyclic group which can be adopted as A in Formula (2). In $A^2$, a ring-constituting atom of $A^2$, which is bonded to the four-membered ring, may be a carbon atom or may be a hetero atom (for example, a nitrogen atom, an oxygen atom, or a sulfur atom), and is preferably a carbon atom.

$R^{Y2}$ represents a divalent or trivalent hydrogen-bonding group. $R^{Y2}$ is incorporated in the heterocyclic ring represented by $A^2$. That is, some or all of atomic groups constituting $R^{Y2}$ are present as a part of a ring-constituting atomic group of $A^2$. In Formula (5-2), a ring-constituting atom bonded to $R^{Y2}$ may be a carbon atom or may be a hetero atom (for example, a nitrogen atom, an oxygen atom, or a sulfur atom). $R^{Y2}$ is preferably —NH— or =N$^+$H—.

In Formula (5-2), a dotted straight line extending from $R^{Y2}$ indicates that there is no bond or a single bond.

In Formula (5-2), it is preferable that $R^{Y2}$ forms a hydrogen bond with one oxygen atom of two oxygen atoms bonded to the four-membered ring which is bonded to $A^2$. By forming an intramolecular hydrogen bond with one oxygen atom of two oxygen atoms bonded to the four-membered ring which is bonded to $A^2$, $R^{Y2}$ preferably forms a six to eight-membered ring structure and more preferably forms a six-membered ring structure (that is, it is preferable that, among the ring-constituting atoms of $A^2$, a ring-constituting atom adjacent to a ring-constituting atom bonded to the four-membered ring is present as a constituting atom of the hydrogen-bonding group $R^{Y2}$). $A^2$ is preferably a single ring.

The heterocyclic group which can be adopted as $A^2$ may further have a substituent X. Specific examples are the same as the specific examples of the substituent X which may be included in A in Formula (2).

In Formula (5-1) or (5-2), B has the same meaning as B in Formula (2).

The colorant represented by Formula (5-1) corresponds to a colorant having the hydrogen-bonding group as a substituent on A in Formula (2). In addition, Formula (5-2) corresponds to a colorant incorporating the hydrogen-bonding group in the ring of A in Formula (2).

Examples of a further preferred embodiment of the colorant represented by Formula (2) include a colorant represented by Formula (3).

In Formula (3), $R^3$ and $R^4$ each independently represent a hydrogen atom or a substituent. The substituent which can be adopted as $R^3$ and $R^4$ is not particularly limited, and the same substituent which can be adopted as $R^1$ in Formula (4) described later can be exemplified.

However, the substituent which can be adopted as $R^3$ is preferably an alkyl group, an alkoxy group, an amino group, an amide group, a sulfonamide group, a cyano group, a nitro group, an aryl group, a heteroaryl group, a heterocyclic group, an alkoxycarbonyl group, a carbamoyl group, or a halogen atom, more preferably an alkyl group, an aryl group, or an amino group, and still more preferably an alkyl group.

The substituent which can be adopted as $R^4$ is preferably an alkyl group, an aryl group, a heteroaryl group, a heterocyclic group, an alkoxy group, an alkoxycarbonyl group, an acyl group, an acyloxy group, an amide group, a carbamoyl group, an amino group, or a cyano group, more preferably an alkyl group, an alkoxycarbonyl group, an acyl group, a carbamoyl group, or an aryl group, and still more preferably an alkyl group.

The alkyl group which can be adopted as $R^3$ and $R^4$ may be any of linear, branched, or cyclic and is preferably linear or branched.

The number of carbon atoms in the alkyl group which can be adopted as $R^3$ is preferably 1 to 18, more preferably 1 to 12, and most preferably 1 to 6. Examples thereof include methyl, ethyl, n-propyl, isopropyl, t-butyl, 2-methylbutyl, 2-ethylhexyl, t-pentyl, neopentyl, 3,5,5-trimethylhexyl, cyclopentyl, cyclohexyl, hexyl, octyl, 1-cyclohexylethyl, 1-cyclohexylpropyl, dicyclohexylmethyl, decyl, dodecyl, hexyldecyl, and hexyloctyl, and methyl, ethyl, n-propyl, isopropyl, t-butyl, 2-methylbutyl, cyclopentyl, cyclohexyl, or hexyl is preferable.

The number of carbon atoms in the alkyl group which can be adopted as $R^4$ is preferably 1 to 24 and more preferably 3 to 18. Examples of the alkyl group include methyl, ethyl, n-propyl, isopropyl, t-butyl, 2-methylbutyl, 2-ethylhexyl, t-pentyl, neopentyl, 3,5,5-trimethylhexyl, cyclopentyl, cyclohexyl, hexyl, octyl, 1-cyclohexylethyl, 1-cyclohexylpropyl, dicyclohexylmethyl, decyl, dodecyl, hexyldecyl, and hexyloctyl, and isopropyl, t-butyl, t-pentyl, neopentyl, cyclohexyl, dicyclohexylmethyl, or 2-cthylhexyl is preferable.

The alkyl group may further have a substituent, and for example, the substituent include can be arbitrarily selected from the groups which can be adopted as the above-described substituent X.

In Formula (3), B has the same meaning as B in Formula (2).

Examples of a preferred embodiment of the colorant represented by Formula (2) or (3) include a colorant represented by Formula (4).

Formula (3)

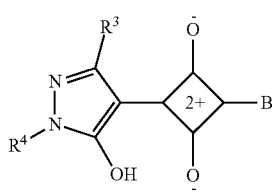

Formula (4)

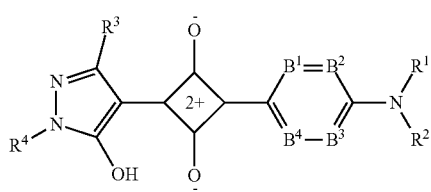

In Formula (4), $R^1$ and $R^2$ each independently represent a hydrogen atom or a substituent. $R^1$ and $R^2$ may be the same as or different from each other, and may be bonded to each other to form a ring.

The substituent which can be adopted as $R^1$ and $R^2$ is not particularly limited, and examples thereof include alkyl groups (such as a methyl group, an ethyl group, a propyl group, an isopropyl group, a butyl group, a t-butyl group, an isobutyl group, a pentyl group, a hexyl group, an octyl group, a dodecyl group, and a trifluoromethyl group), cycloalkyl groups (such as a cyclopentyl group and a cyclohexyl group), alkenyl groups (such as a vinyl group and an allyl group), alkynyl groups (such as an ethynyl group and a propargyl group), aryl groups (such as a phenyl group and a naphthyl group), heteroaryl groups (such as a furyl group, a thienyl group, a pyridyl group, a pyridazyl group, a pyrimidyl group, a pyrazyl group, a triazyl group, an imidazolyl group, a pyrazolyl group, a thiazolyl group, a benzimidazolyl group, a benzoxazolyl group, a benzothiazolyl group, a quinazolyl group, and a phthalazyl group), heterocyclic groups (such as a pyrrolidyl group, an imidazolidyl group, a morpholyl group, and an oxazolidyl group), alkoxy groups (such as a methoxy group, an ethoxy group, and a propyloxy group), cycloalkoxy groups (such as a cyclopentyloxy group and a cyclohexyloxy group), aryloxy groups (such as a phenoxy group and a naphthyloxy group), heteroaryloxy groups (aromatic heterocyclic oxy group), alkylthio groups (such as a methylthio group, an ethylthio group, and a propylthio group), cycloalkylthio groups (such as a cyclopentylthio group and a cyclohexylthio group), arylthio groups (such as a phenylthio group and a naphthylthio group), heteroarylthio groups (aromatic heterocyclic thio group), alkoxycarbonyl groups (such as methyloxycarbonyl group, an ethyloxycarbonyl group, a butyloxycarbonyl group, and an octyloxycarbonyl group), aryloxycarbonyl groups (such as a phenyloxycarbonyl group and a naphthyloxycarbonyl group), phosphoryl groups (such as dimethoxyphosphonyl group and diphenylphosphoryl group), sulfamoyl groups (such as an aminosulfonyl group, a methylaminosulfonyl group, a dimethylaminosulfonyl group, a butylaminosulfonyl group, a cyclohexylaminosulfonyl group, an octylaminosulfonyl group, a phenylaminosulfonyl group, and a 2-pyridylaminosulfonyl group), acyl groups (such as an acetyl group, an ethylcarbonyl group, a propylcarbonyl group, a cyclohexylcarbonyl group, an octylcarbonyl group, a 2-ethylhexylcarbonyl group, a phenylcarbonyl group, a naphthylcarbonyl group, and a pyridylcarbonyl group), acyloxy groups (such as an acetyloxy group, an ethylcarbonyloxy group, a butylcarbonyloxy group, an octylcarbonyloxy group, and a phenylcarbonyloxy group), acylamino groups (such as an acetylamino group, an ethylcarbonylamino group, a butylcarbonylamino group, an octylcarbonylamino group, and a phenylcarbonylamino group), amide groups (such as a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcarbonylamino group, a dodecylcarbonylamino group, a phenylcarbonylamino group, and a naphthylcarbonylamino group), sulfonylamide groups (such as a methylsulfonylamino group, an octylsulfonylamino group, a 2-ethylhexylsulfonylamino group, and a trifluoromethylsulfonylamino group), carbamoyl groups (such as an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group, and a 2-pyridylaminocarbonyl group), ureido groups (such as a methylureido group, an ethylureido group, a pentylureido group, a cyclohexylureido group, an octylureido group, a dodecylureido group, a phenylureido group, a naphthylureido group, and a 2-pyridylaminoureido group), alkylsulfonyl groups (such as a methylsulfonyl group, an ethylsulfonyl group, a butylsulfonyl group, a cyclohexylsulfonyl group, and a 2-ethylhexylsulfonyl group), arylsulfonyl groups (such as a phenylsulfonyl group, a naphthylsulfonyl group, and a 2-pyridylsulfonyl group), amino groups (such as an amino group, an ethylamino group, a dimethylamino group, a butylamino group, a dibutylamino group, a cyclopentylamino group, a 2-ethylhexylamino group, a dodecylamino group, an anilino group, a naphthylamino group, and a 2-pyridylamino group), alkylsulfonyloxy groups (methanesulfonyloxy group), a cyano group, a nitro group, halogen atoms (such as a fluorine atom, a chlorine atom, and a bromine atom), a hydroxy group, a sulfo group, and a carboxy group.

Among these, an alkyl group, an alkenyl group, an aryl group, or a heteroaryl group is preferable, an alkyl group, an aryl group, or a heteroaryl group is more preferable, and an alkyl group is still more preferable.

The substituent which can be adopted as $R^1$ and $R^2$ may further have a substituent. Examples of the substituent which may be further included include the above-described substituents which can be adopted as $R^1$ and $R^2$. In addition, $R^1$ and $R^2$ may be bonded to each other or may be bonded with a substituent which is included in $B^2$ or $B^3$ to form a ring. As the ring formed at this time, a hetero ring or a heteroaryl ring is preferable. The size of the ring formed is not particularly limited, but a five-membered ring or a six-membered ring is preferable.

In Formula (4), $B^1$, $B^2$, $B^3$, and $B^4$ each independently represent a carbon atom or a nitrogen atom. The ring including $B^1$, $B^2$, $B^3$, and $B^4$ is an aromatic ring. It is preferable that at least two or more of $B^1$ to $B^4$ are carbon atoms, and it is more preferable that all of $B^1$ to $B^4$ are carbon atoms.

The carbon atom which can be adopted as $B^1$ to $B^4$ has a hydrogen atom or a substituent. Among carbon atoms which can be adopted as $B^1$ to $B^4$, the number of carbon atoms having a substituent is not particularly limited, but is preferably 0, 1, or 2 and more preferably 1. In particular, it is preferable that $B^1$ and $B^4$ are carbon atoms and at least one has a substituent.

The substituent included in the carbon atom which can be adopted as $B^1$ to $B^4$ is not particularly limited, and examples thereof include the above-described substituents which can be adopted as $R^1$ and $R^2$. Among these, an alkyl group, an alkoxy group, an alkoxycarbonyl group, an aryl group, an acyl group, an amide group, an acylamino group, a sulfonylamide group, a carbamoyl group, an alkylsulfonyl group, an arylsulfonyl group, an amino group, a cyano group, a nitro group, a halogen atom, or a hydroxy group is preferable, and an alkyl group, an alkoxy group, an alkoxycarbonyl group, an aryl group, an acyl group, an amide group, an acylamino group, a sulfonylamide group, a carbamoyl group, an amino group, a cyano group, a nitro group, a halogen atom, or a hydroxy group is more preferable.

As the substituent included in the carbon atom which can be adopted as $B^1$ and $B^4$, an alkyl group, an alkoxy group, a hydroxy group, an amide group, an acylamino group, a sulfonylamide group, or a carbamoyl group is still more preferable, and an alkyl group, an alkoxy group, a hydroxy group, an amide group, an acylamino group, or a sulfonylamide group is particularly preferable, and a hydroxy group, an amide group, an acylamino group, or a sulfonylamide group is most preferable.

As the substituent included in the carbon atom which can be adopted as $B^2$ and $B^3$, an alkyl group, an alkoxy group, an alkoxycarbonyl group, an acyl group, an amino group, a cyano group, a nitro group, or a halogen atom is still more preferable, and it is particularly preferable that the substituent in any one of $B^2$ or $B^3$ is an electron-withdrawing group (for example, an alkoxycarbonyl group, an acyl group, a cyano group, a nitro group, or a halogen atom).

In Formula (4), $R^3$ and $R^4$ each independently represent a hydrogen atom or a substituent, and have the same meaning as $R^3$ and $R^4$ in Formula (3).

As the squarylium compound used in the present invention, a squarylium colorant represented by any of Formula (2), further Formula (3) or Formula (4) can be used without particular limitation. Examples thereof include compounds described in JP2006-160618A, WO2004/005981A, WO2004/007447A, Dyes and Pigment, 2001, 49, pp. 161 to 179, WO2008/090757A, WO2005/121098A, and JP2008-275726A.

Hereinafter, preferred specific examples of the colorant represented by Formula (2) will be shown. However, the present invention is not limited thereto.

In the following specific examples, Me represents methyl, Et represents ethyl, and Ph represents phenyl, respectively.

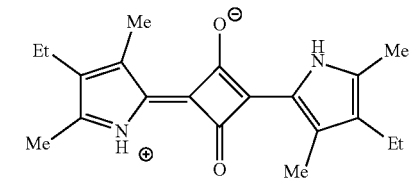

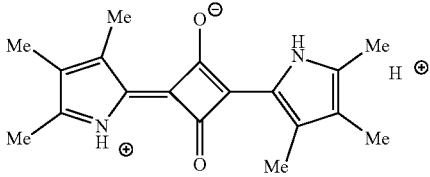

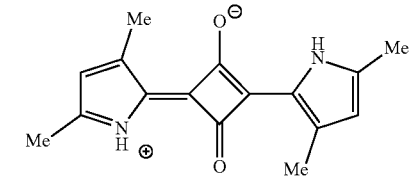

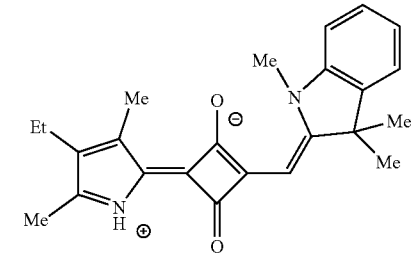

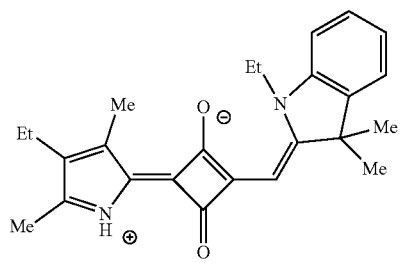

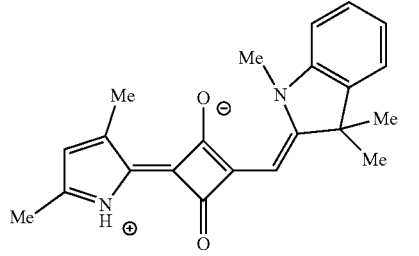

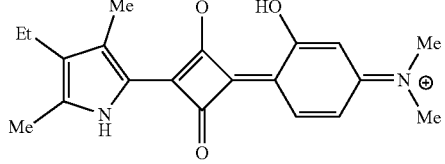

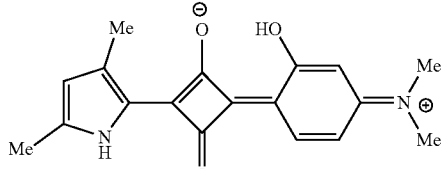

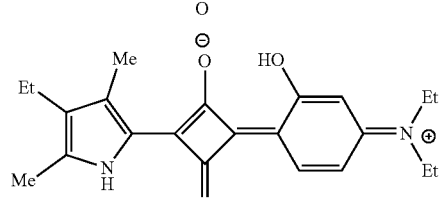

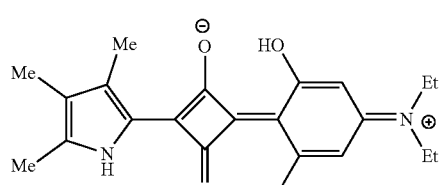

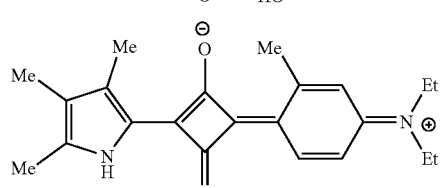

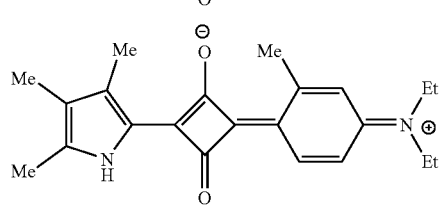

-continued
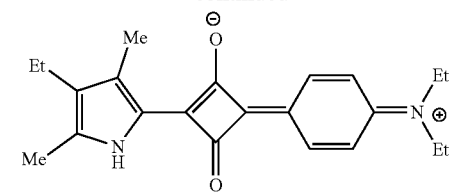
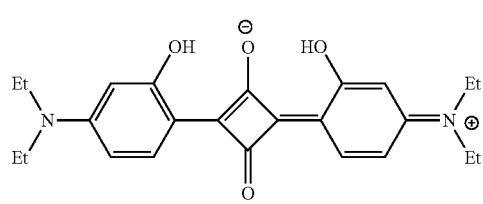
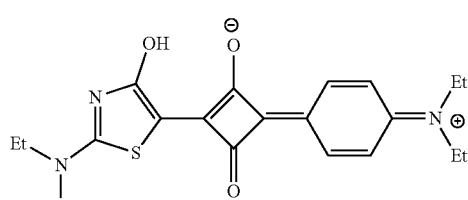
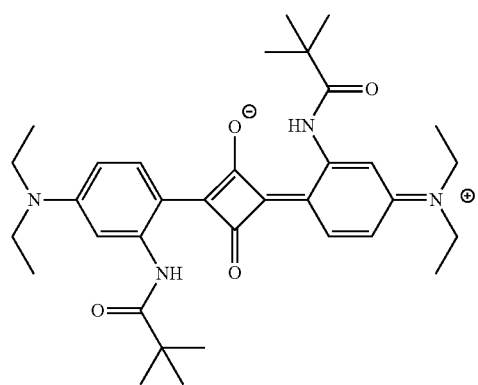
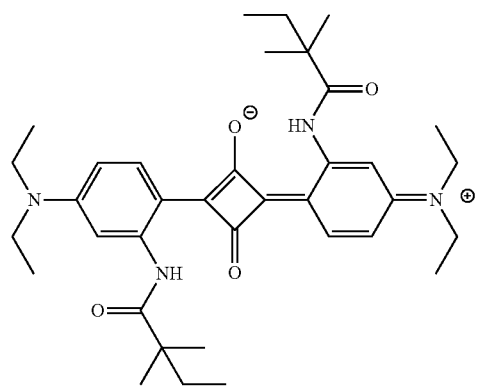
-continued
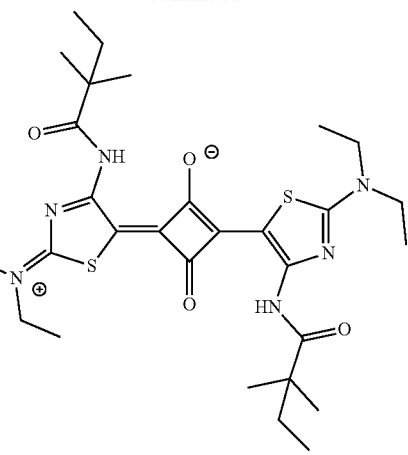
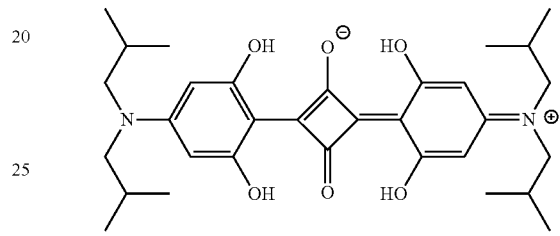
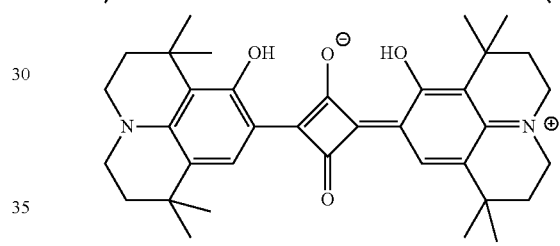
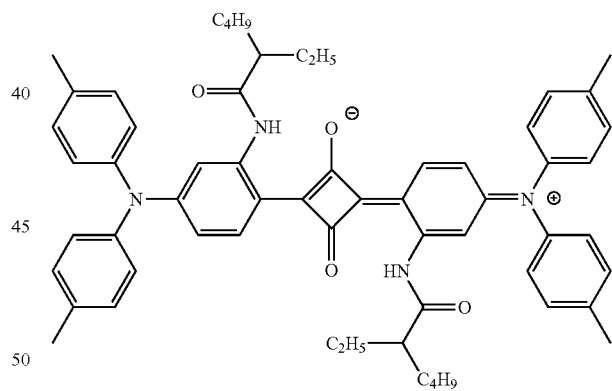
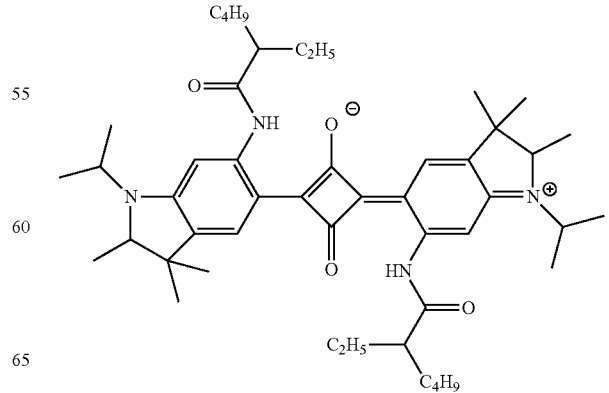

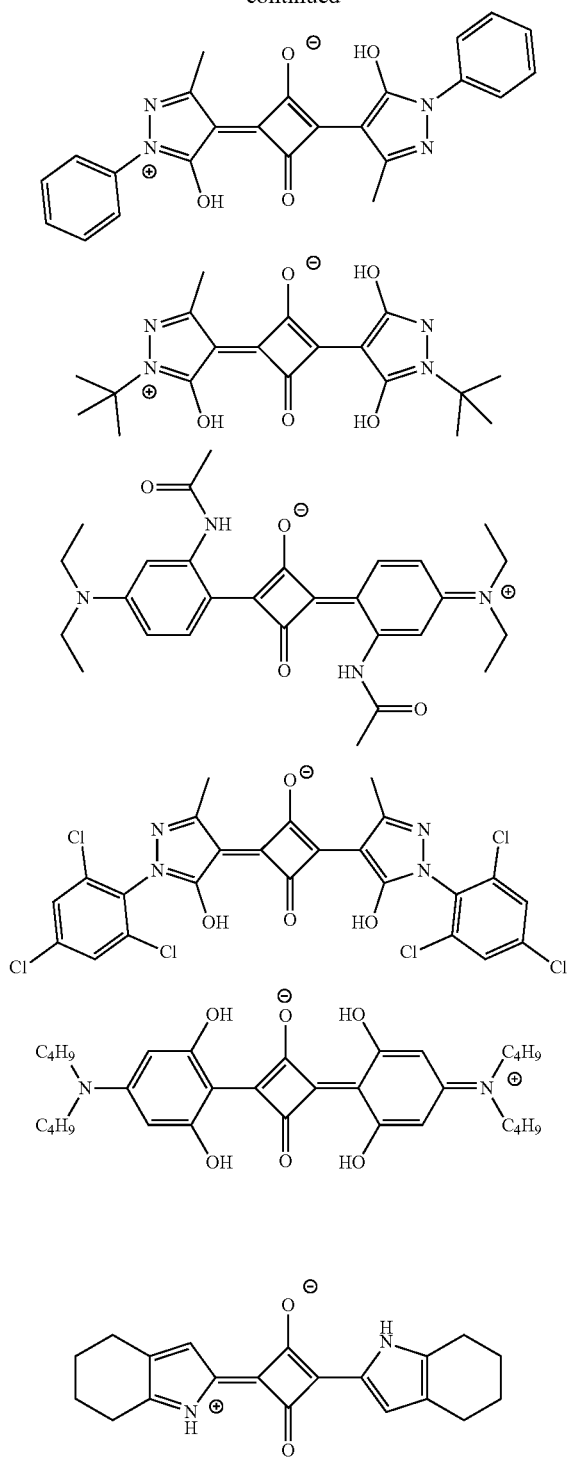

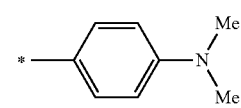
Bs-1

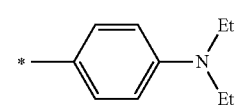
Bs-2

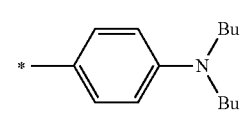
Bs-3

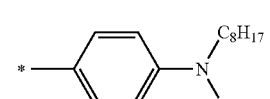
Bs-4

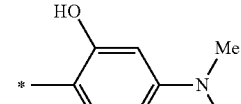
Bs-5

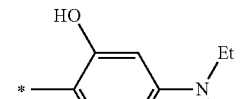
Bs-6

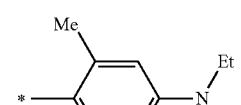
Bs-7

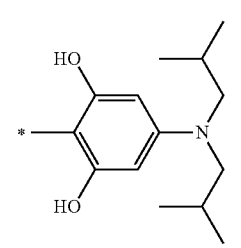
Bs-8

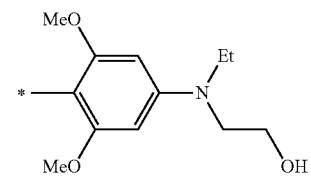
Bs-9

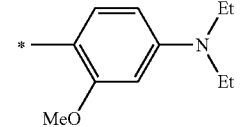
Bs-10

In addition to the above-shown specific examples, specific examples of the colorant represented by Formula (2) will be shown. In the following tables, substituents B represent the following structures. In the following structures and the following tables, Me represents methyl, Et represents ethyl, i-Pr represents i-propyl, Bu represents n-butyl, t-Bu represents t-butyl, and Ph represents phenyl, respectively. In the following structures, * indicates a bonding part with a four-membered carbon ring in each formula.

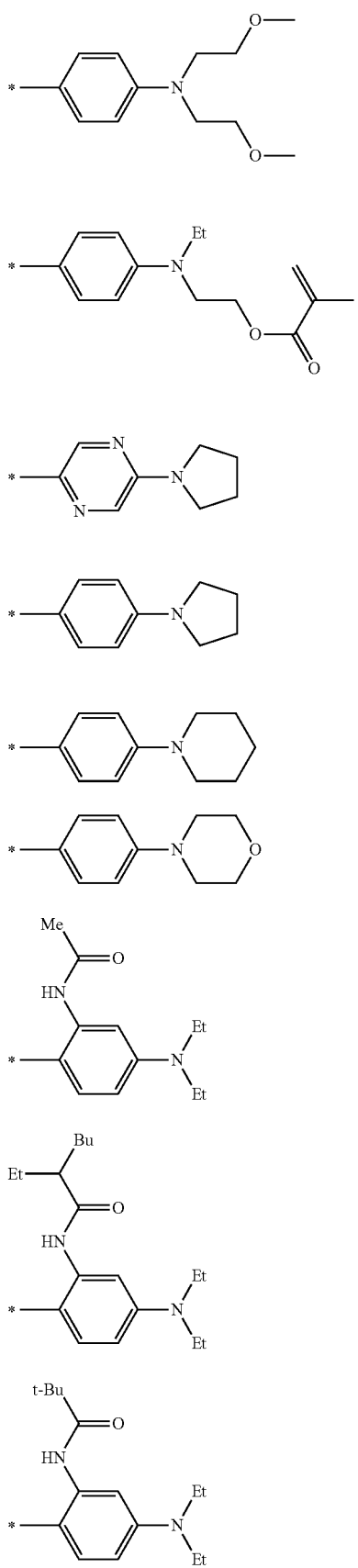
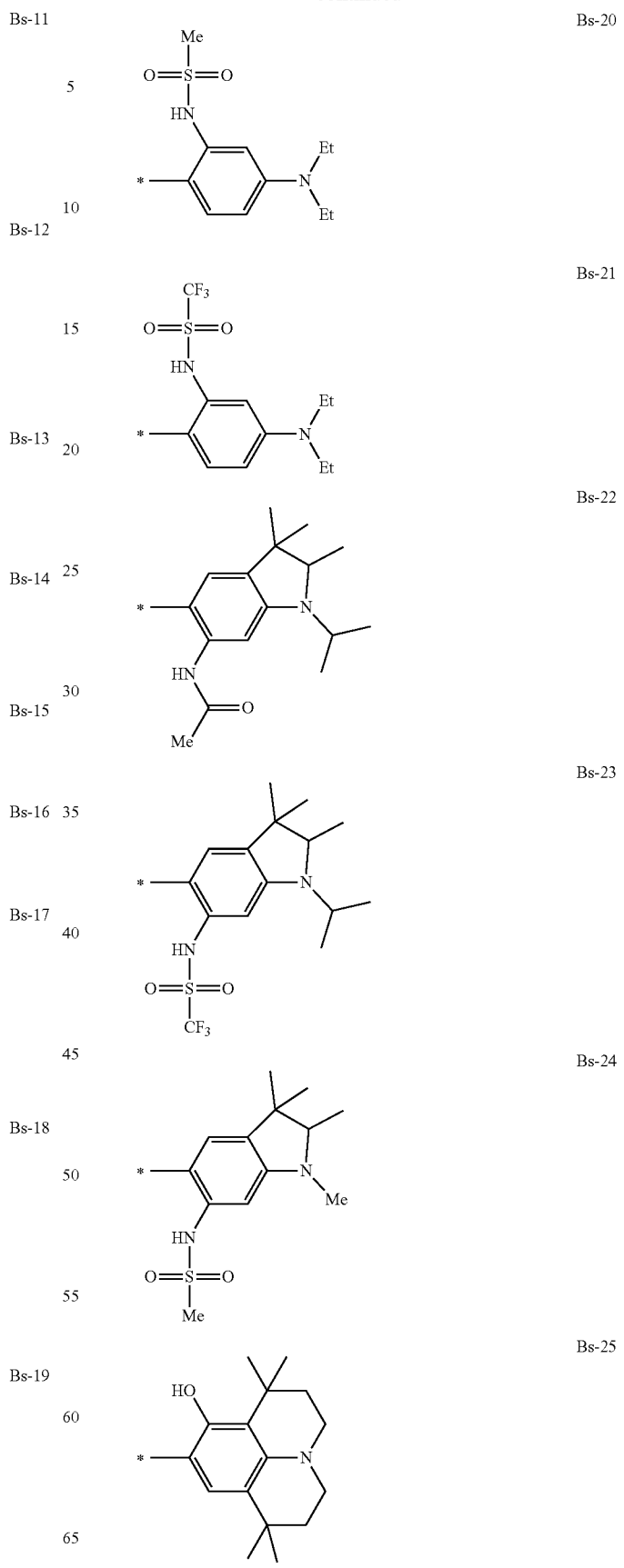

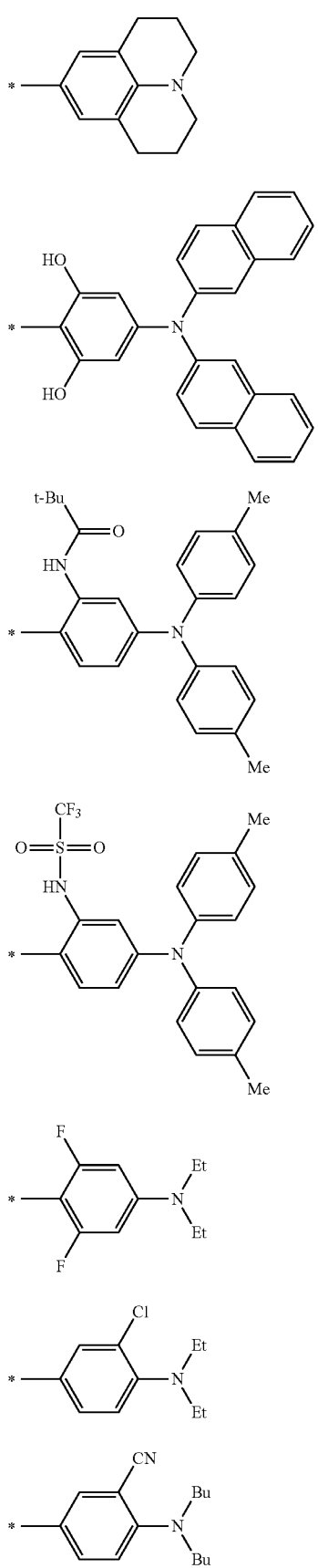
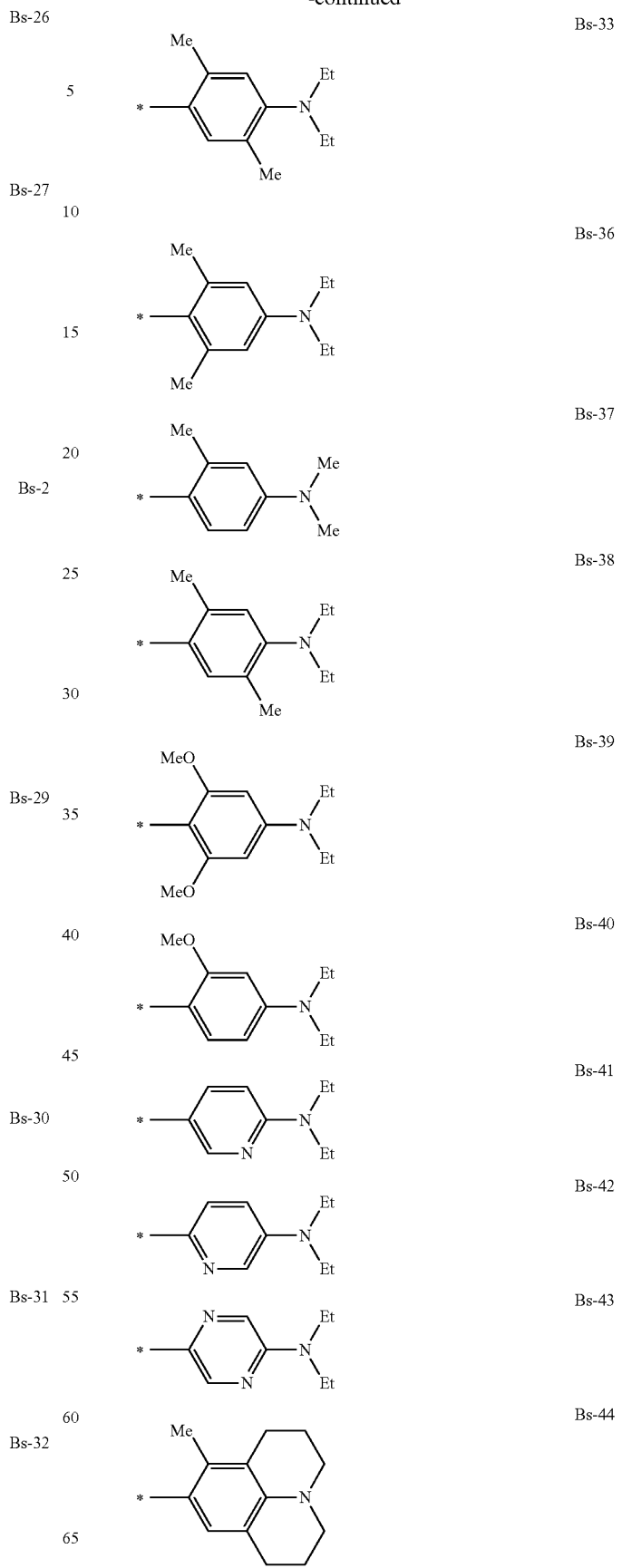

-continued

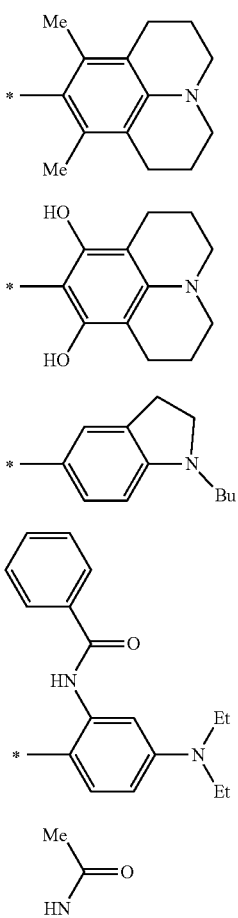

Bs-45

Bs-46

Bs-47

Bs-48

Bs-49

Bs-50

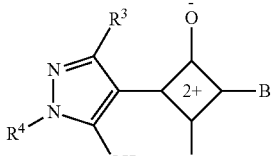

Formula (3)

| Compound No. | R³ | R⁴ | B |
|---|---|---|---|
| 3-1 | Me | Me | Bs-3 |
| 3-2 | Me | Me | Bs-4 |

-continued

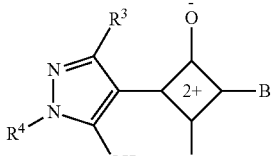

Formula (3)

| Compound No. | R³ | R⁴ | B |
|---|---|---|---|
| 3-3 | Me | Me | Bs-5 |
| 3-4 | Me | Me | Bs-10 |
| 3-5 | Me | Me | Bs-14 |
| 3-6 | Me | Me | Bs-16 |
| 3-7 | Me | Me | Bs-17 |
| 3-8 | Me | Me | Bs-18 |
| 3-9 | Me | Me | Bs-19 |
| 3-10 | Me | Me | Bs-20 |
| 3-11 | Me | Me | Bs-21 |
| 3-12 | Me | Me | Bs-22 |
| 3-13 | Me | Me | Bs-23 |
| 3-14 | Me | Me | Bs-26 |
| 3-15 | Me | Me | Bs-32 |
| 3-16 | Me | Me | Bs-33 |
| 3-17 | Me | Me | Bs-38 |
| 3-18 | Me | Me | Bs-49 |
| 3-19 | Et | *2-pyridyl | Bs-28 |
| 3-20 | Me | *4-methyl-6-hydroxypyrimidin-2-yl | Bs-29 |
| 3-21 | H | H | Bs-23 |
| 3-22 | Et | t-Bu | Bs-21 |
| 3-23 | t-Bu | Me | Bs-18 |
| 3-24 | CF₃ | i-Pr | Bs-12 |
| 3-25 | COOEt | Et | Bs-6 |
| 3-26 | CN | Ph | Bs-11 |
| 3-27 | NMe₂ | Me | Bs-2 |
| 3-28 | i-Pr | Me | Bs-17 |
| 3-29 | OEt | Bu | Bs-27 |
| 3-30 | NH₂ | i-Pr | Bs-9 |
| 3-31 | t-Bu | Me | Bs-17 |
| 3-32 | t-Bu | Bu | Bs-21 |
| 3-33 | CF₃ | Me | Bs-18 |
| 3-34 | OEt | Et | Bs-33 |
| 3-35 | NMe₂ | i-Pr | Bs-2 |
| 3-36 | Et | Me | Bs-17 |
| 3-37 | Bu | Me | Bs-18 |
| 3-38 | NH₂ | Ph | Bs-19 |
| 3-39 | OEt | *2,4,6-trichlorophenyl | Bs-25 |
| 3-40 | Me | *benzothiazol-2-yl | Bs-2 |
| 3-41 | Me | Ph | Bs-17 |
| 3-42 | Me | Ph | Bs-21 |
| 3-43 | Me | Ph | Bs-36 |
| 3-44 | Me | t-Bu | Bs-17 |
| 3-45 | Me | t-Bu | Bs-18 |
| 3-46 | Me | t-Bu | Bs-10 |
| 3-47 | OEt | Me | Bs-17 |

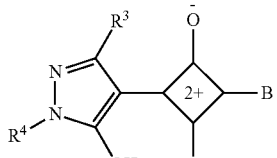

Formula (3)

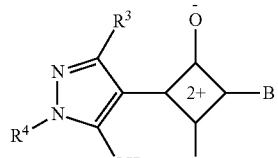

Formula (3)

| Compound No. | R³ | R⁴ | B |
|---|---|---|---|
| 3-48 | OEt | Me | Bs-10 |
| 3-49 | Me | 2,3,5-trichlorophenyl (*-C₆H₂Cl₃) | Bs-17 |
| 3-50 | Me | 2,3,5-trichlorophenyl | Bs-19 |
| 3-51 | Me | 2,3,5-trichlorophenyl | Bs-21 |
| 3-52 | Me | 2,3,5-trimethylphenyl | Bs-17 |
| 3-53 | Me | 2,3,5-trimethylphenyl | Bs-20 |
| 3-54 | Me | 2,3,5-trimethylphenyl | Bs-21 |
| 3-55 | t-Bu | Me | Bs-17 |
| 3-56 | t-Bu | Me | Bs-10 |
| 3-57 | t-Bu | Me | Bs-44 |
| 3-58 | t-Bu | t-Bu | Bs-17 |
| 3-59 | t-Bu | t-Bu | Bs-10 |
| 3-60 | t-Bu | t-Bu | Bs-6 |
| 3-61 | NBu₂ | Me | Bs-17 |
| 3-62 | NBu₂ | Me | Bs-10 |
| 3-63 | t-Bu | 2,3,5-trichlorophenyl | Bs-17 |
| 3-64 | t-Bu | 2,3,5-trichlorophenyl | Bs-19 |
| 3-65 | t-Bu | 2,3,5-trichlorophenyl | Bs-21 |
| 3-66 | t-Bu | 2,4,6-trimethylphenyl | Bs-17 |
| 3-67 | t-Bu | 2,4,6-trimethylphenyl | Bs-20 |
| 3-68 | t-Bu | 2,4,6-trimethylphenyl | Bs-21 |

In addition to the above-described compounds, examples of the squarylium-based compound used in the present invention include compounds (compounds in which a hydrogen atom is added instead of L) derived from the squarylium colorant structural part included in the exemplary compounds described later, which is represented by Formula (1), and compounds described in JP2002-097383A and JP2015-068945A.

($Q^1$ in Formula (1))

$Q^1$ in Formula (1) represents a group represented by Formula (2M). In Formula (2M), * represents a bonding part with Dye.

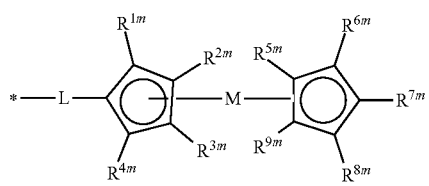

Formula (2M)

In Formula (2M), L represents a single bond or a divalent linking group which is not conjugated with Dye in Formula (1).

The divalent linking group which can be adopted as L is not particularly limited as long as a linking group which is not conjugated with Dye, and the above-described conjugated structure may be included inside the divalent linking group or in an end portion of a cyclopentadiene ring in Formula (2M). Examples of the divalent linking group include an alkylene group having 1 to 20 carbon atoms, an arylene group having 6 to 20 carbon atoms, a divalent heterocyclic group obtained by removing two hydrogen atoms from a hetero ring, —CH═CH—, —CO—, —CS—, —NR— (R represents a hydrogen atom or a monovalent substituent), —O—, —S—, —SO$_2$—, —N═CH—, and a linking group, among divalent linking groups formed of a combination of a plurality (preferably 2 to 6) of groups selected from the group consisting thereof, which is not conjugated with Dye. A group selected from the group consisting of an alkylene group having 1 to 8 carbon atoms, an arylene group having 6 to 12 carbon atoms, —CH═CH—, —CO—, —NR— (R is as defined above), —O—, —S—, —SO$_2$—, and —N═CH—, or a linking group, among divalent linking groups formed of a combination of two or more (preferably 2 to 6) groups selected from the group consisting thereof, which is not conjugated with Dye is preferable, and a group selected from the group consisting of an alkylene group having 1 to 4 carbon atoms, a phenylene group, —CO—, —NH—, —O—, and —SO$_2$—, or a linking group, among divalent linking groups formed of a combination of two or more (preferably 2 to 6) groups selected from the group consisting thereof, which is not conjugated with Dye is particularly preferable. The divalent linking group of a combination is not particularly limited, but is preferably a group including —CO—, —NH—, —O—, or —SO$_2$—. Examples thereof include a linking group, among linking groups including a group formed of a combination of two or more of —CO—, —NH—, —O—, and —SO$_2$— and linking groups formed of at least one of —CO—, —NH—, —O—, or —SO$_2$—, and an alkylene group or an arylene group, which is not conjugated with Dye. Examples of the linking group including a group formed of a combination of two or more of —CO—, —NH—, —O—, and —SO$_2$— include a linking group, among linking groups including —COO—, —OCO—, —CONH—, —NHCOO—, —NHCONH—, or —SO$_2$NH—, which is not conjugated with Dye. Examples of the linking group formed of at least one of —CO—, —NH—, —O—, or —SO$_2$—, and an alkylene group or an arylene group include a linking group, among groups of a combination of —CO—, —COO—, or —CONH—, and an alkylene group or an arylene group, which is not conjugated with Dye.

The substituent which can be adopted as R is not particularly limited, and has the same meaning as the substituent X which may be included in A in Formula (2).

L is preferably a single bond, a group selected from the group consisting of an alkylene group having 1 to 8 carbon atoms, an arylene group having 6 to 12 carbon atoms, —CH═CH—, —CO—, —NR— (R is as defined above), —O—, —S—, —SO$_2$—, and —N═CH—, or a group of a combination of two or more groups selected from the group consisting thereof.

L may have one or a plurality of substituents. The substituent which may be included in L is not particularly limited, and has the same meaning, for example, as the above-mentioned substituent X. In a case where L has a plurality of substituents, substituents bonded to an adjacent atom may be bonded to each other to further form a ring structure.

The alkylene group which can be adopted as L is may be linear, branched, or cyclic, as long as the alkylene group has carbon atoms in a range of 1 to 20. Examples thereof include methylene, ethylene, propylene, methylethylene, methylm- ethylene, dimethylmethylene, 1,1-dimethylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, propane-2,2-diyl, cyclopropane-1,1-diyl, cyclopropane-1,2-diyl, cyclobutane-1,1-diyl, cyclobutane-1,2-diyl, cyclopentane-1,1-diyl, cyclopentane-1,2-diyl, cyclopentane-1,3-diyl, cyclohexane-1,1-diyl, cyclohexane-1,2-diyl, cyclohexane-1,3-diyl, cyclohexane-1,4-diyl, and methylcyclohexane-1,4-diyl.

In a case where a linking group including at least one of —CO—, —CS—, —NR— (R is as defined above), —O—, —S—, —SO$_2$—, or —N═CH— is adopted in an alkylene group as L, the group of —CO— and the like may be incorporated at any position in the alkylene group, and the number to be incorporated is not particularly limited.

The arylene group which can be adopted as L is not particularly limited as long as a group having carbon atoms in a range of 6 to 20, and examples thereof include a group obtained by further removing one hydrogen atom from each group exemplified as the aryl group which can be adopted as A in Formula (2) and has 6 to 20 carbon atoms.

The heterocyclic group which can be adopted as L is not particularly limited, and examples thereof include a group obtained by further removing one hydrogen atom from each group exemplified as the heterocyclic group which can be adopted as A.

In Formula (2M), the remaining partial structure excluding the linking group L corresponds to a structure (metallocene structural part) in which one hydrogen atom is removed from a metallocene compound. In the present invention, a known metallocene compound can be used, without particular limitation, as the metallocene compound which is the metallocene structural part, as long as a compound (compound having a hydrogen atom bonded in place of L) accommodate with the partial structure defined by Formula (2M). Hereinafter, the metallocene structural part defined by Formula (2M) will be specifically described.

In Formula (2M), each of $R^{1m}$ to $R^{9m}$ represents a hydrogen atom or a substituent. The substituent which can be adopted as $R^{1m}$ to $R^{9m}$ is not particularly limited, but for example, can be selected from the substituents which can be adopted as $R^1$ in Formula (4). Each of $R^{1m}$ to $R^{9m}$ is preferably a hydrogen atom, a halogen atom, an alkyl group, an acyl group, an alkoxy group, an amino group, or an amide group, more preferably a hydrogen atom, a halogen atom, an alkyl group, an acyl group, or an alkoxy group, still more preferably a hydrogen atom, a halogen atom, an alkyl group, or an acyl group, particularly preferably a hydrogen atom, a halogen atom, or an alkyl group, and most preferably a hydrogen atom.

Among the alkyl groups which can be adopted as $R^1$, the alkyl group which can be adopted as $R^{1m}$ to $R^{9m}$ is preferably an alkyl group having 1 to 8 carbon atoms, and examples thereof include methyl, ethyl, propyl, isopropyl, butyl, sec-butyl, tert-butyl, isobutyl, pentyl, tert-pentyl, hexyl, octyl, and 2-ethylhexyl.

The alkyl group may have a halogen atom as a substituent. Examples of the alkyl group substituted with a halogen atom include chloromethyl, dichloromethyl, trichloromethyl, bromomethyl, dibromomethyl, tribromomethyl, fluoromethyl, difluoromethyl, trifluoromethyl, 2,2,2-trifluoroethyl, perfluoroethyl, perfluoropropyl, and perfluorobutyl.

In addition, in the alkyl group which can be adopted as $R^{1m}$ and the like, at least one methylene group forming a carbon chain may be substituted with —O— or —CO—. Examples of the alkyl group in which a methylene group is substituted with —O— include an alkyl group in which a terminal methylene group is substituted, such as methoxy, ethoxy, propoxy, isopropoxy, butoxy, secondary butoxy, tertiary butoxy, 2-methoxyethoxy, chloromethyloxy, dichloromethyloxy, trichloromethyloxy, bromomethyloxy, dibromomethyloxy, tribromomethyloxy, fluoromethyloxy, difluoromethyloxy, trifluoromethyloxy, 2,2,2-trifluoroethyloxy, perfluoroethyloxy, perfluoropropyloxy, and perfluorobutyloxy, and an alkyl group in which an internal methylene group of a carbon chain is substituted, such as 2-methoxyethyl. Examples of the alkyl group in which a methylene group is substituted with —CO— include acetyl, propionyl, monochloroacetyl, dichloroacetyl, trichloroacetyl, trifluoroacetyl, propan-2-one-1-yl, and butan-2-one-1-yl.

In Formula (2M), M is an atom capable of from the metallocene compound, and represents Fe, Co, Ni, Ti, Cu, Zn, Zr, Cr, Mo, Os, Mn, Ru, Sn, Pd, Rh, V, or Pt. Among these, M is preferably Fe, Ti, Co, Ni, Zr, Ru, or Os, more preferably Fe, Ti, Ni, Ru, or Os, still more preferably Fe or Ti, and most preferably Fe.

The group represented by Formula (2M) is preferably a group of a combination of preferred L, $R^{1m}$ to $R^{9m}$, and M, and examples thereof include a group of a combination of, as L, a single bond, a group selected from the group consisting of an alkylene group having 2 to 8 carbon atoms, an arylene group having 6 to 12 carbon atoms, —CH=CH—, —CO—, —NR— (R is as defined above), —O—, —S—, —SO$_2$—, and —N=CH—, or a group of a combination of two or more groups selected from the group consisting thereof, as $R^{1m}$ to $R^{9m}$, a hydrogen atom, a halogen atom, an alkyl group, an acyl group, or an alkoxy group, and as M, Fe.

A preferred aspect of the colorant compound of the present invention is represented by Formula (1A).

Formula (1A)

Dye$^1$—(Q$^1$)$_{n1}$

In Formula (1A), Dye$^1$ represents a colorant structural part obtained by removing n1 hydrogen atoms from a compound represented by Formula (2A).

Formula (2A)

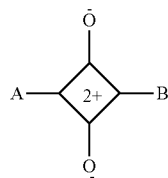

In Formula (2A), A represents a heterocyclic group. B represents an aryl group, a heterocyclic group, or —CH=G. G represents a heterocyclic group.

At least one of A or B has a hydrogen-bonding group forming an intramolecular hydrogen bond.

$Q^1$ represents a group represented by Formula (2MA).

Formula (2MA)

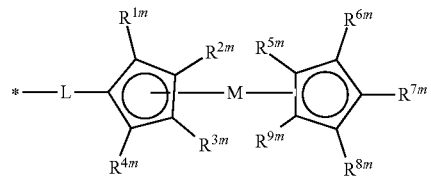

L represents a single bond or a divalent linking group which is not conjugated with Dye$^1$. $R^{1m}$ to $R^{9m}$ represent a hydrogen atom or a substituent. M represents Fe, Co, Ni, Ti, Cu, Zn, Zr, Cr, Mo, Os, Mn, Ru, Sn, Pd, Rh, V, or Pt. * represents a bonding part with Dye$^1$.

n1 represents an integer of 1 to 6.

The compound represented by Formula (2A) has the same structure as the structure of the compound represented by Formula (2) except that A represents a heterocyclic ring. The heterocyclic ring represented by A in Formula (2A) has the same meaning as the heterocyclic ring which can be adopted as A in Formula (2).

In addition, the compound represented by Formula (2MA) has the same structure as the structure of the compound represented by Formula (2M) except that L represents a single bond or a divalent linking group which is not conjugated with Dye$^1$ and * represents a bonding part with Dye$^1$. The divalent linking group which is not conjugated with Dye$^1$ in Formula (2MA) has the same meaning as the linking group which can be adopted as L in Formula (2M) and is not conjugated with Dye.

Another preferred aspect of the colorant compound of the present invention is represented by Formula (5-1A) or (5-2A).

Formula (5-1A)

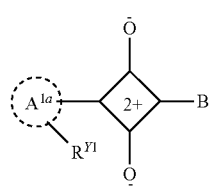

Formula (5-2A)

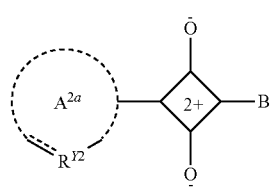

The compound represented by Formula (5-1A) has the same structure as the structure of the compound represented by Formula (5-1) except that $A^{1a}$ represents a heterocyclic ring. The heterocyclic ring represented by $A^{1a}$ has the same meaning as the heterocyclic ring which can be adopted as $A^1$ in Formula (5-1).

The compound represented by Formula (5-2A) has the same structure as the structure of the compound represented by Formula (5-2), and is separately described for convenience. The heterocyclic ring represented by $A^{2a}$ has the same meaning as the heterocyclic ring which can be adopted as $A^2$ in Formula (5-2).

In addition, each of $R^{Y1}$ and $R^{Y2}$ has the same meaning as $R^{Y1}$ and $R^{Y2}$ in Formulae (5-1) and (5-2), and the preferred aspects are also the same.

Hereinafter, specific examples of the colorant represented by Formula (1) will be shown. However, the present invention is not limited thereto.

In the following specific examples, Me represents methyl, Et represents ethyl, and tBu represents tert-butyl, respectively.

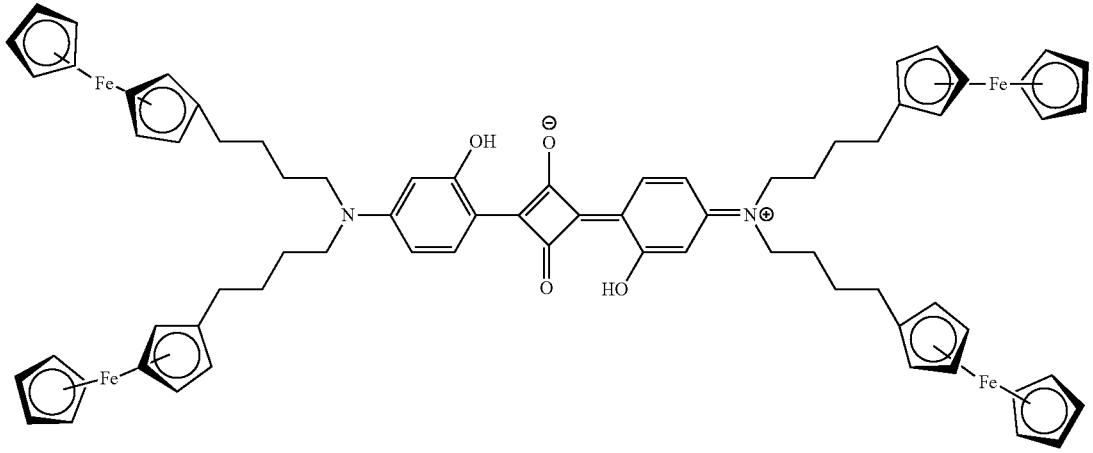

A-1

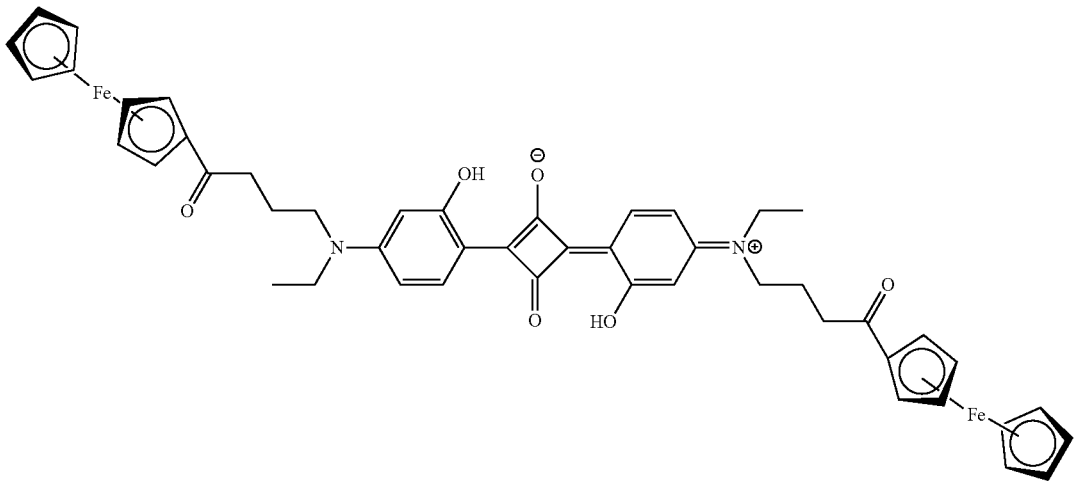

A-2

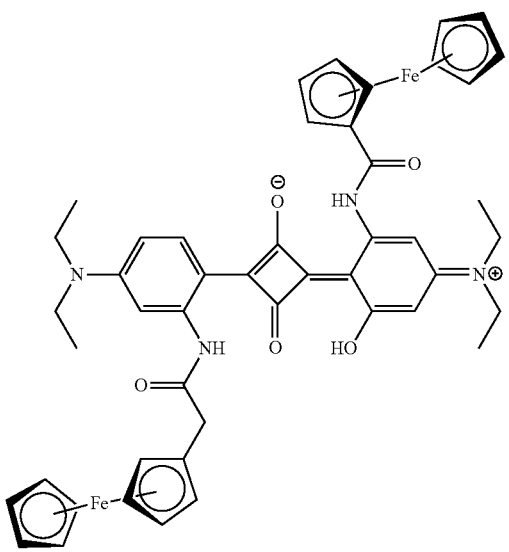

A-3

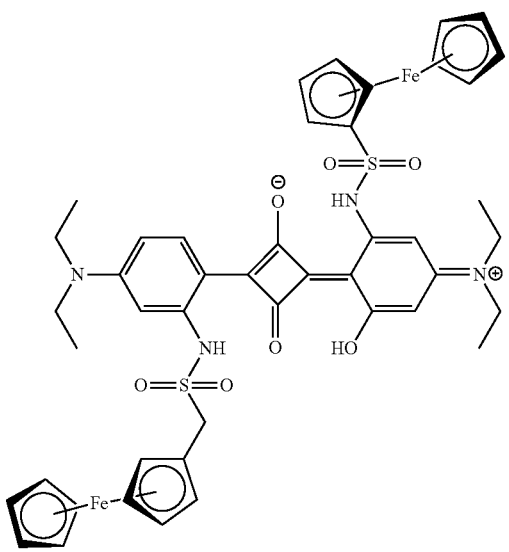

A-4

-continued
A-5
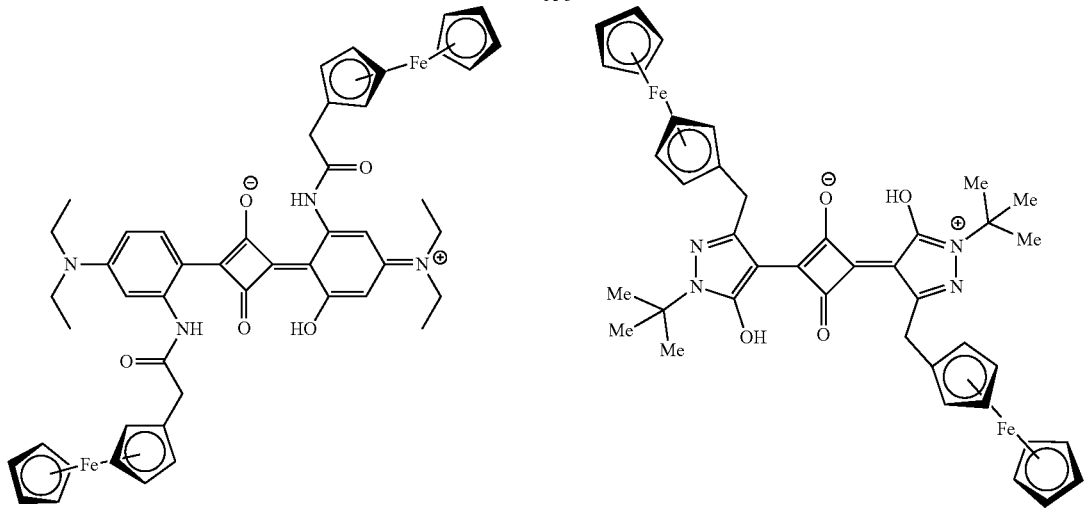
A-6
A-7
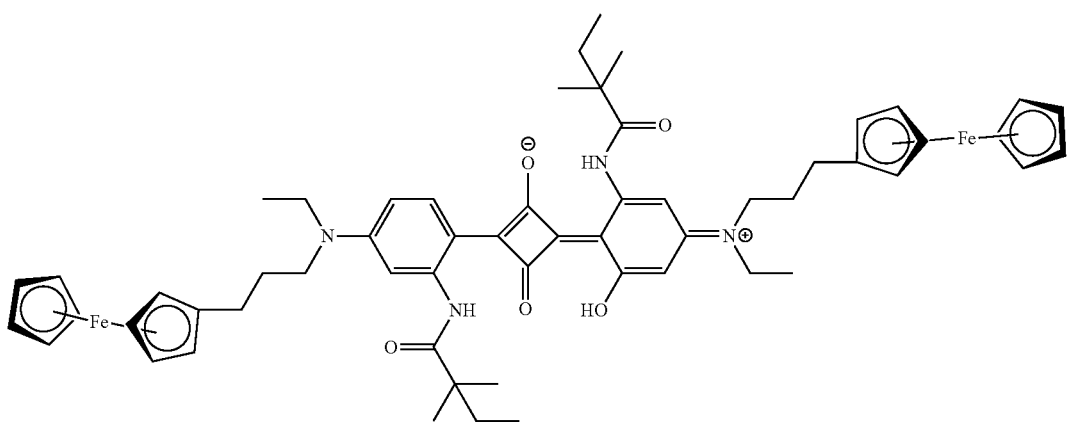
A-9
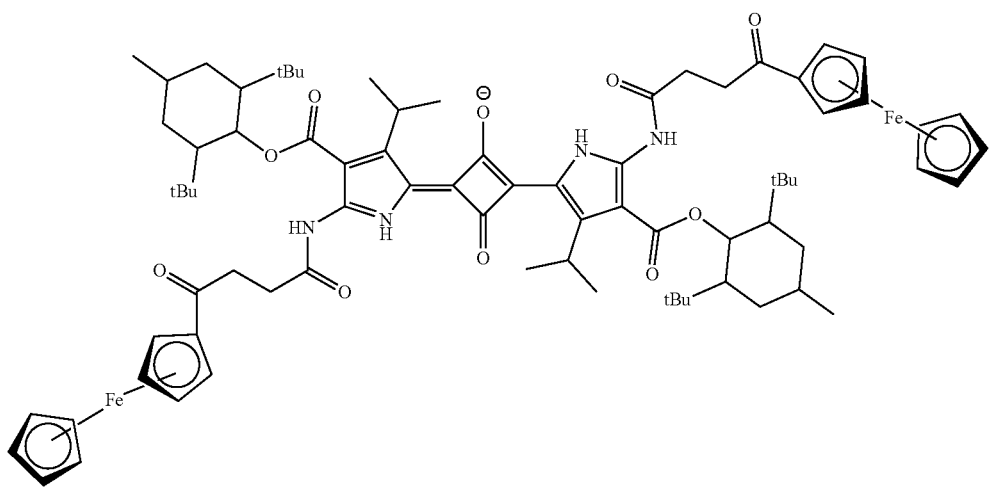

-continued
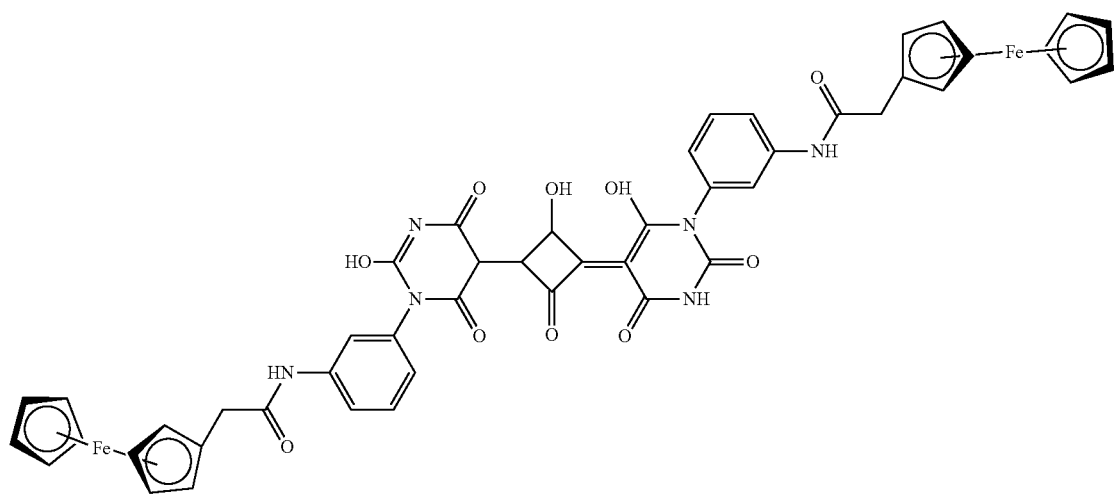
A-10
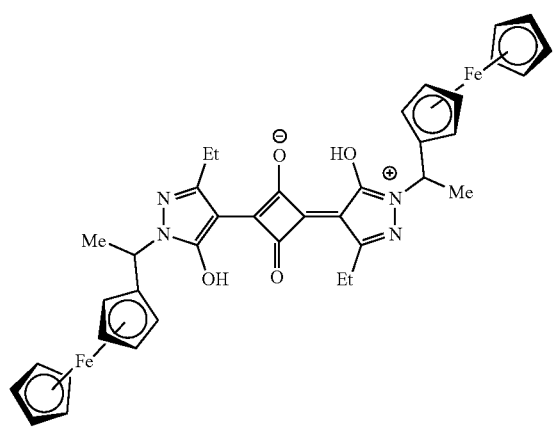
A-11
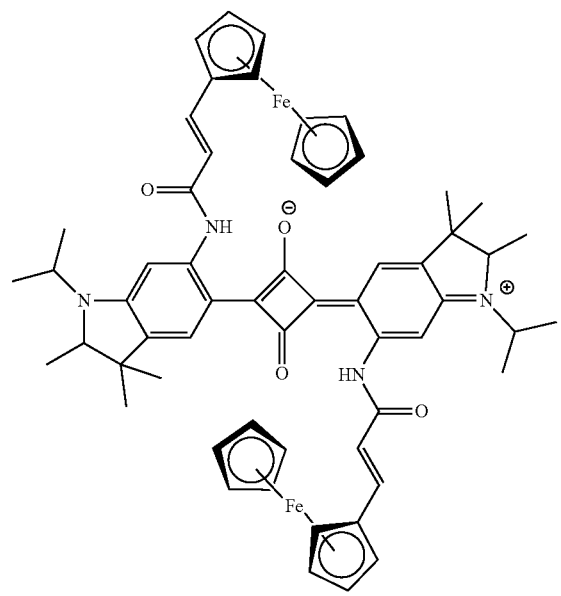
A-12
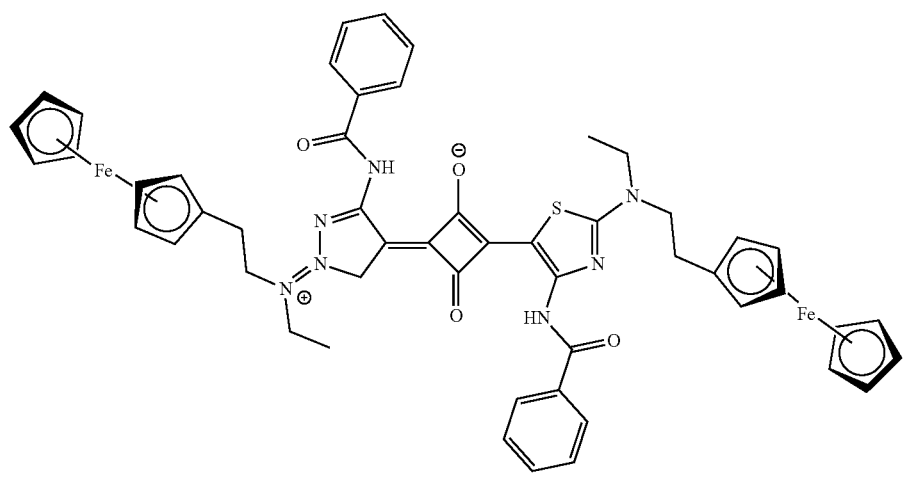
A-13

-continued
A-14
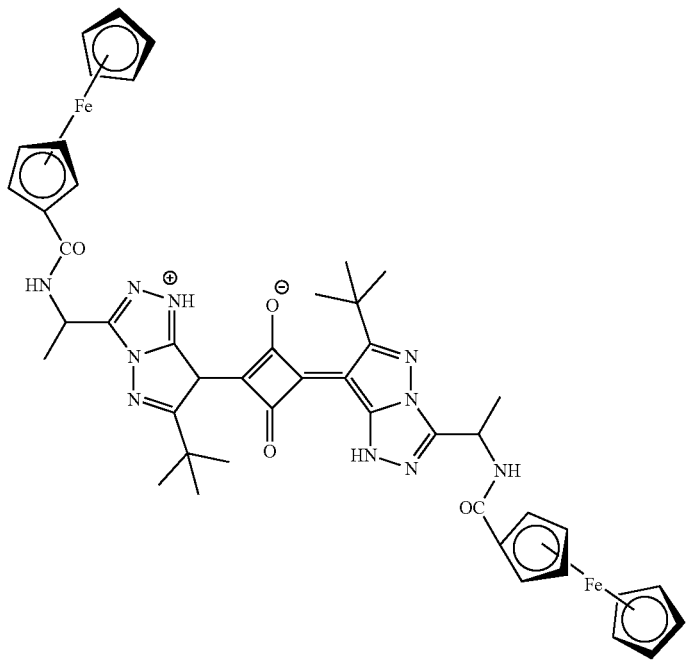
A-15
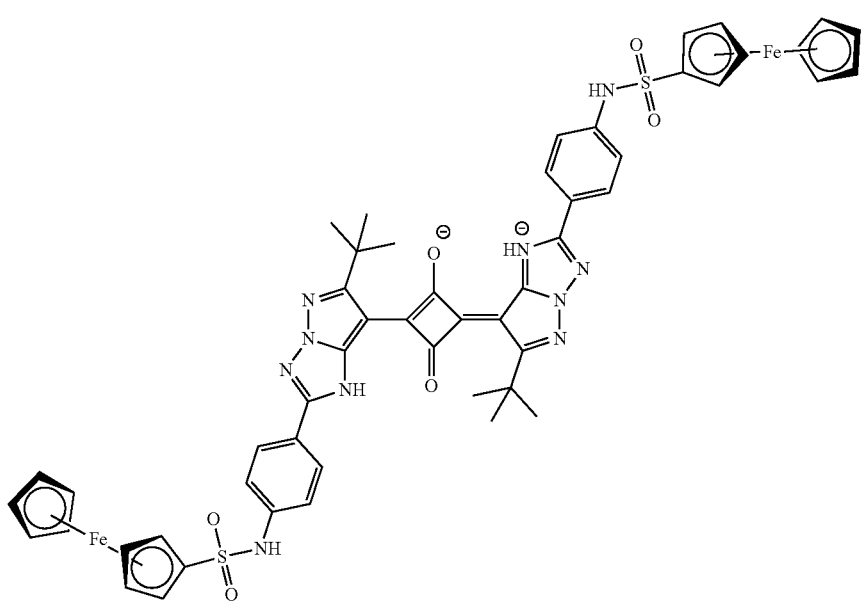

-continued
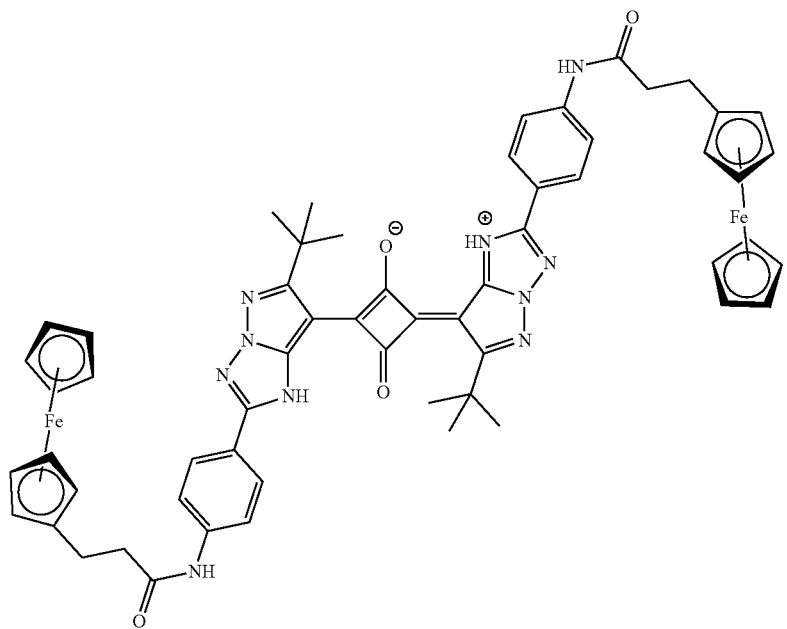
A-16
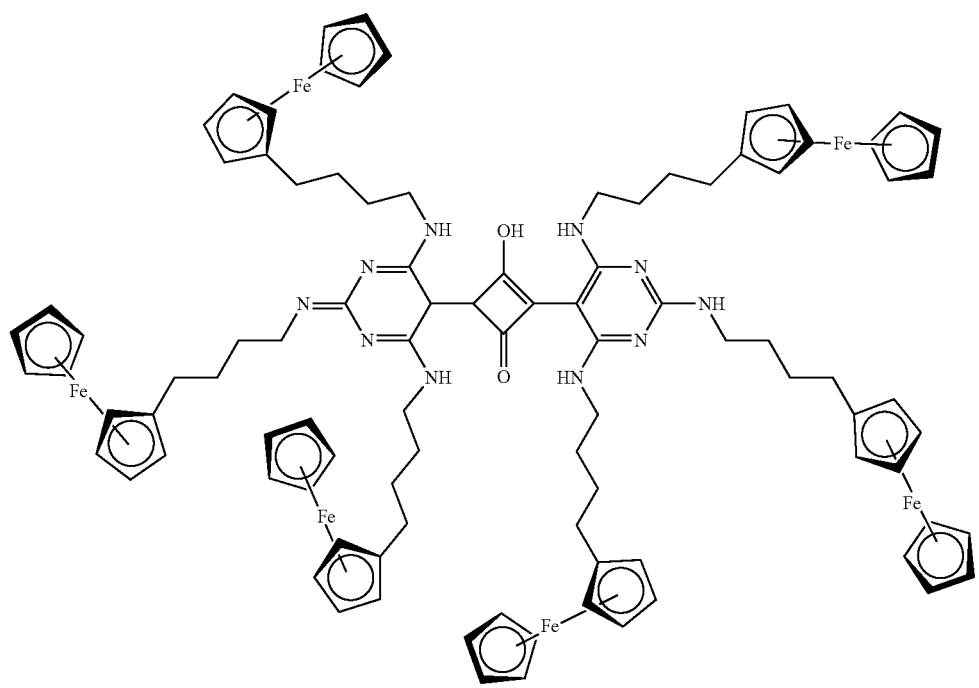
A-17

-continued
A-18
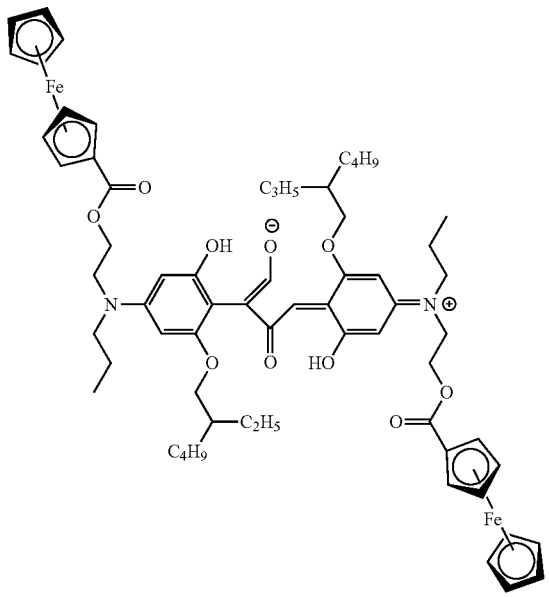
A-19
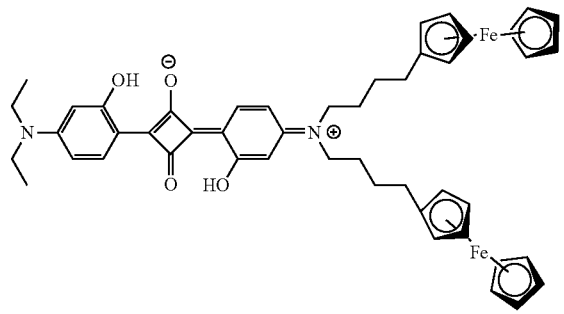
A-20
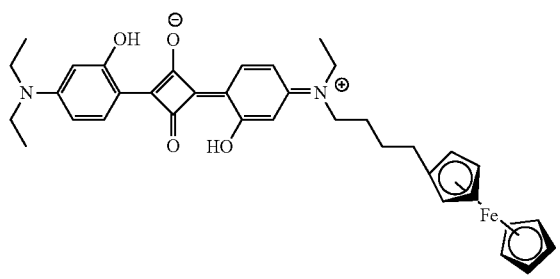
A-21
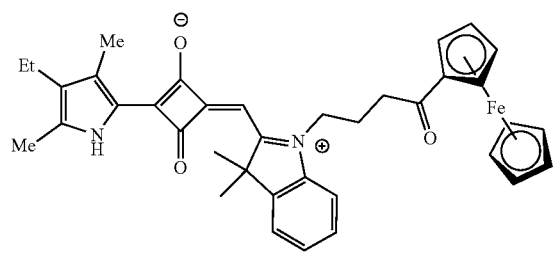
A-22
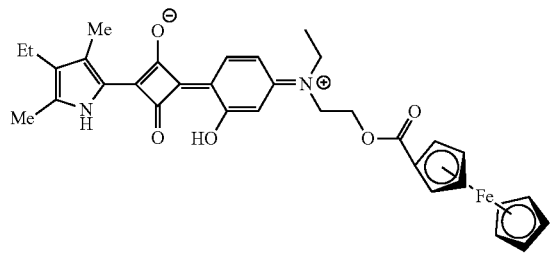
A-23
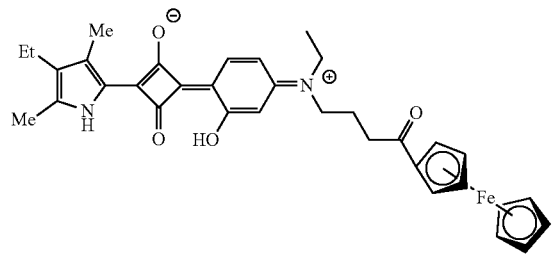
A-24
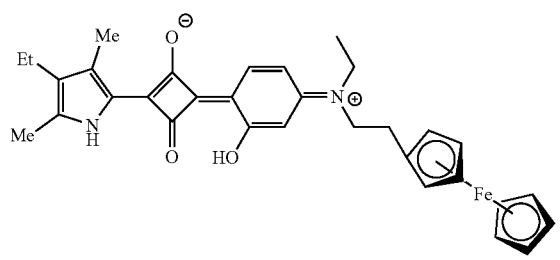
A-25
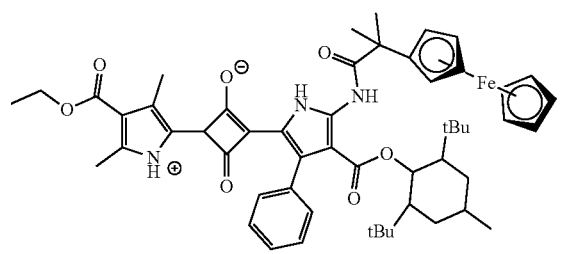

-continued
A-26
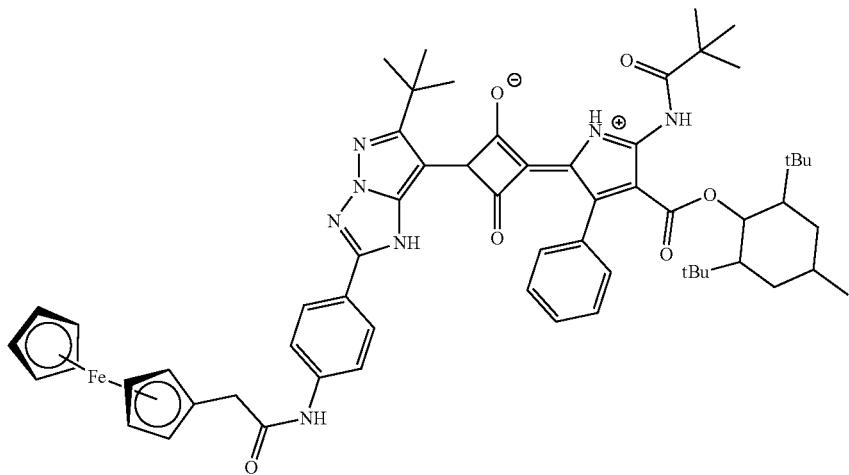
A-27
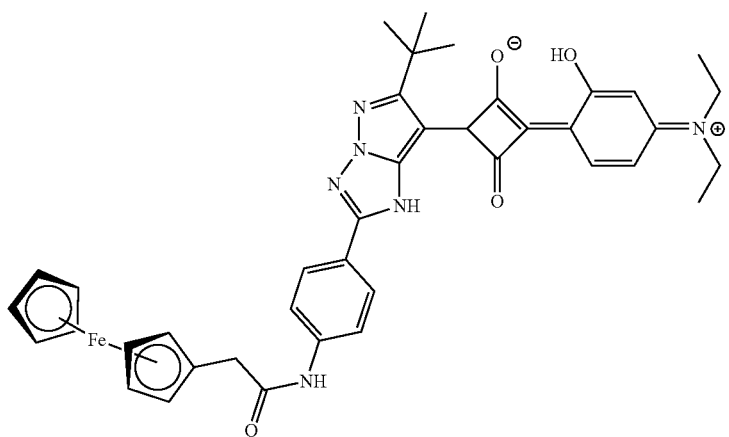
A-28
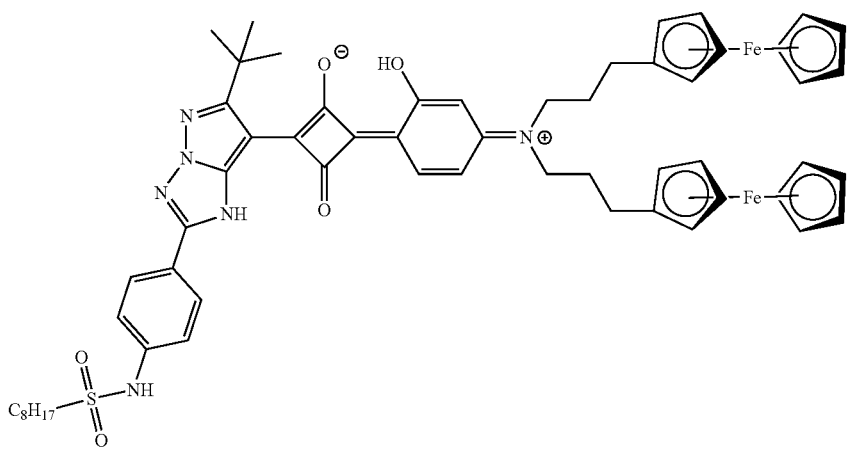

A-29
A-30
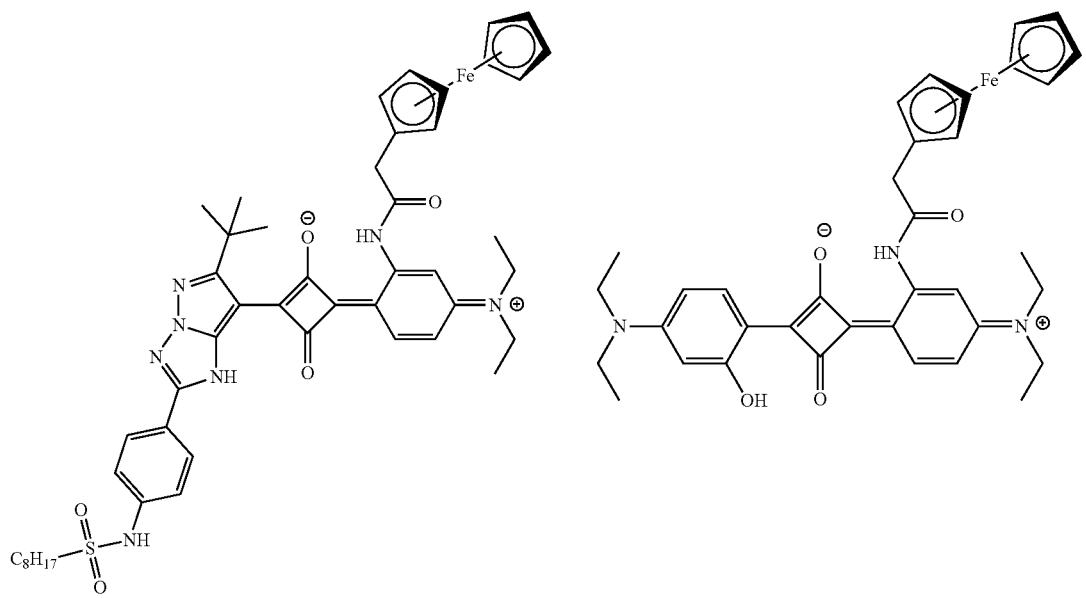
A-31
A-32
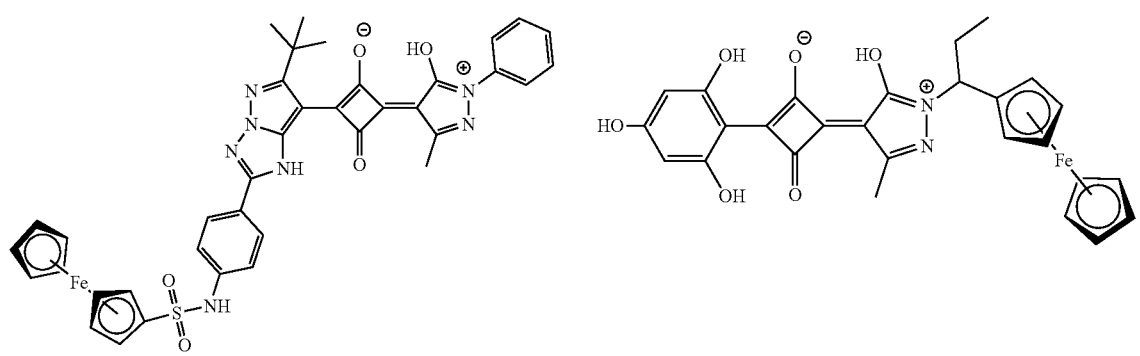
A-33
A-34
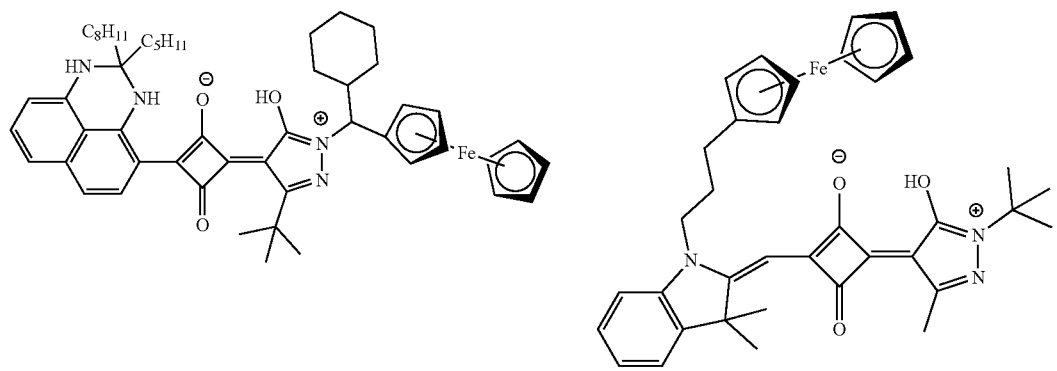

-continued
A-35
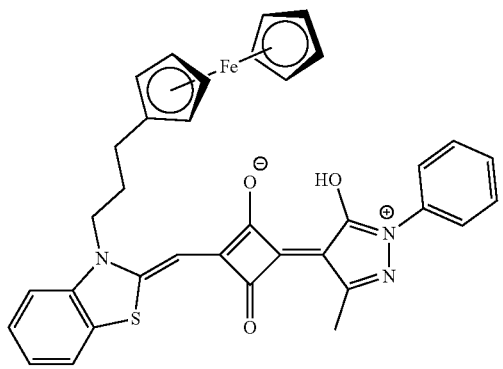
A-36
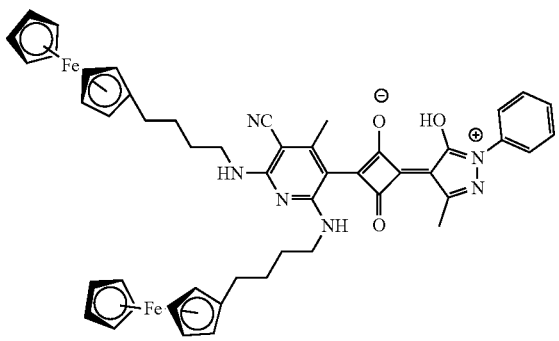
A-37
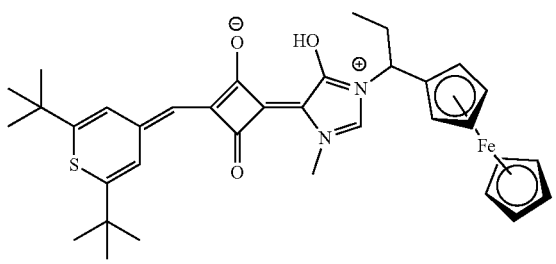
A-38
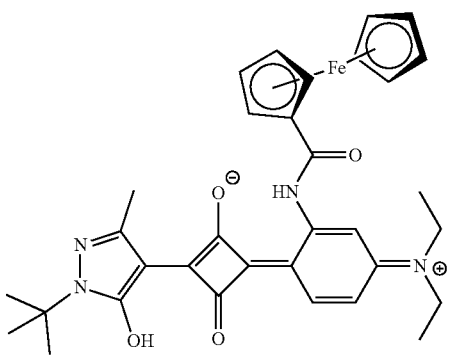
A-39
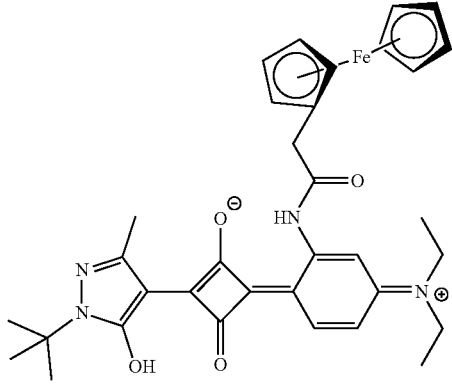
A-40
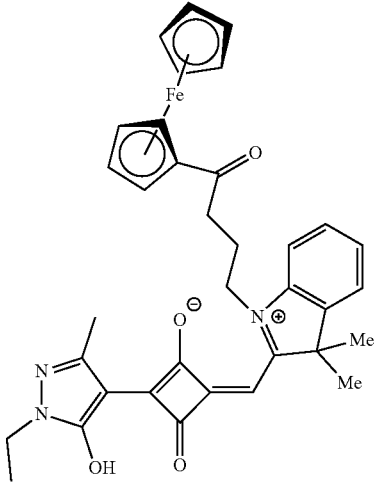
A-41
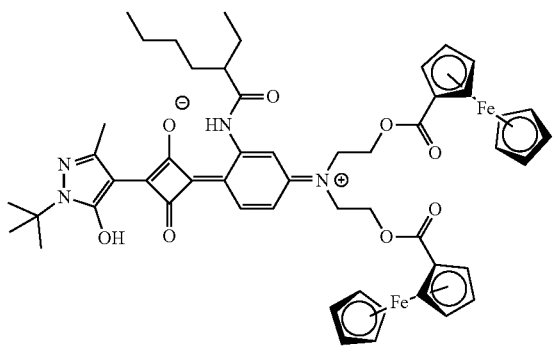
A-42
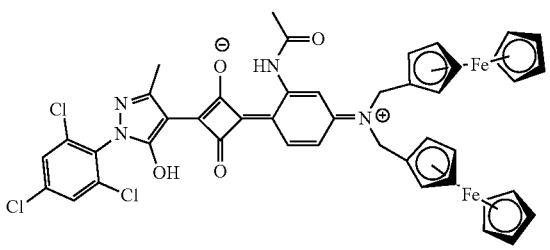

-continued
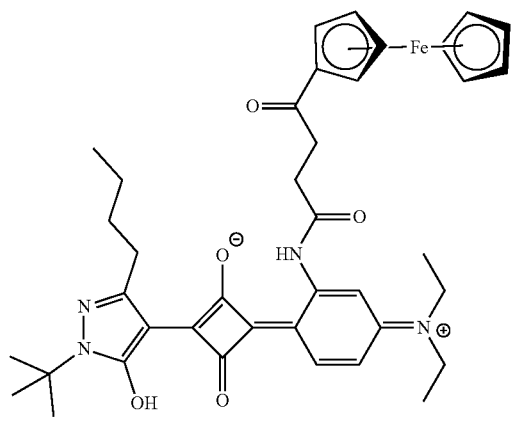
A-43
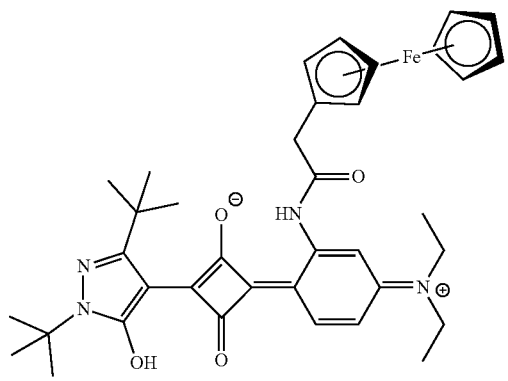
A-44
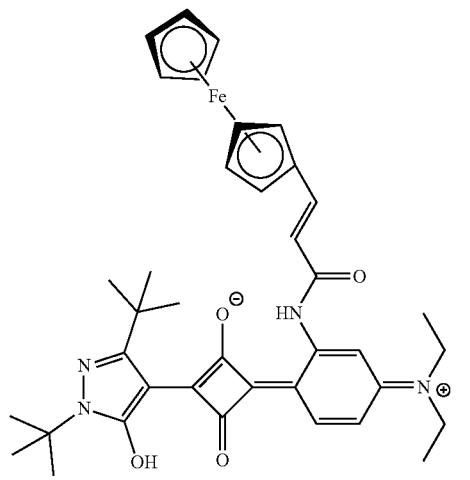
A-45
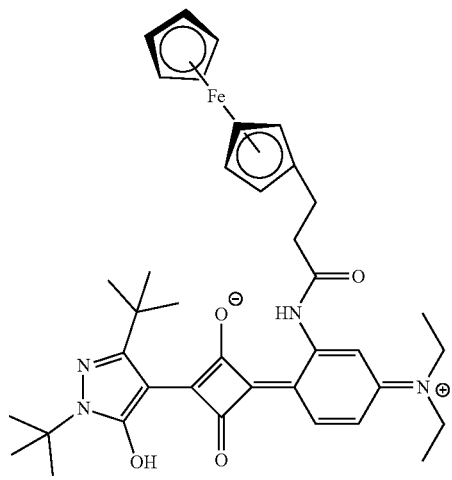
A-46
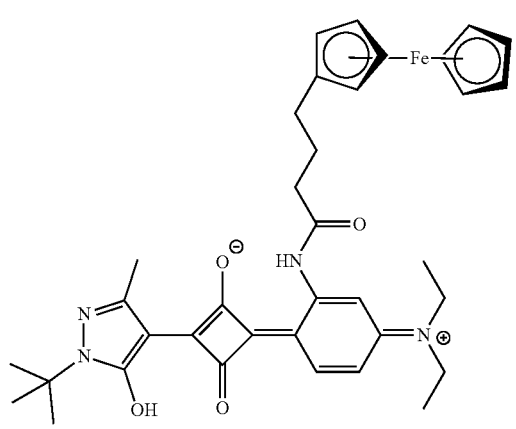
A-47
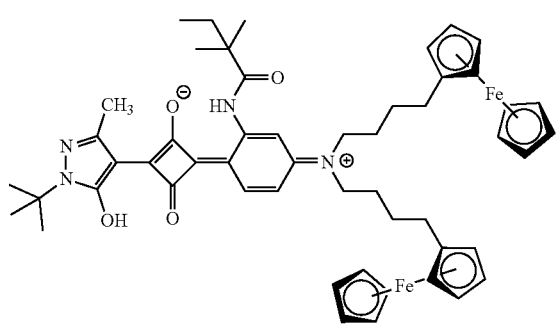
A-48
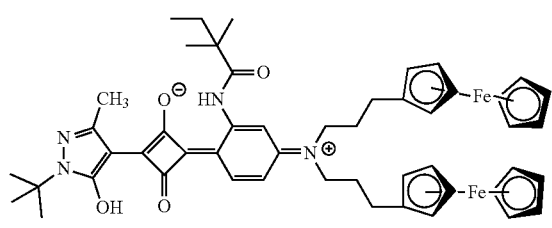
A-49
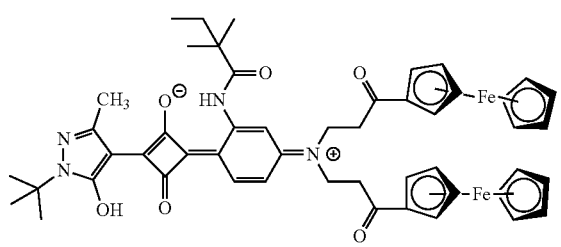
A-50

-continued
A-51
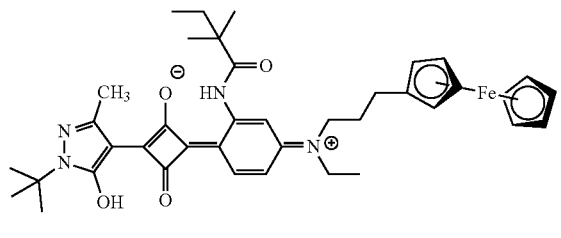
A-52
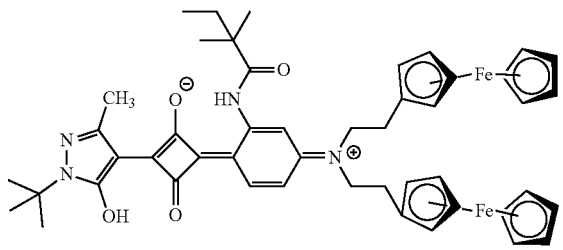
A-53
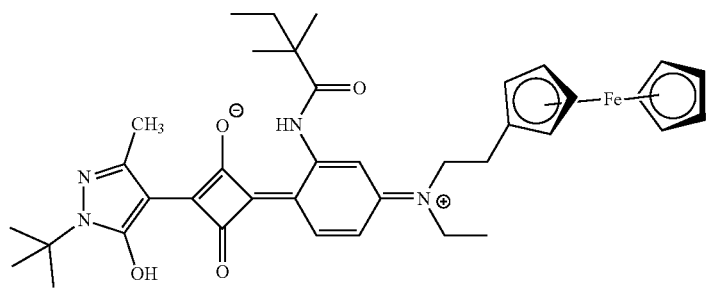
A-54
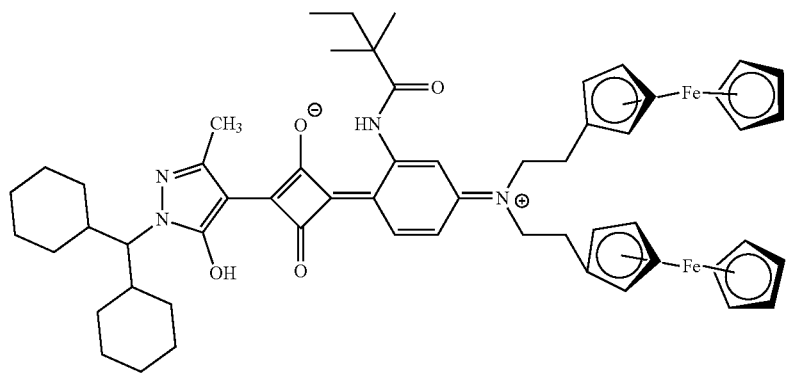
A-55
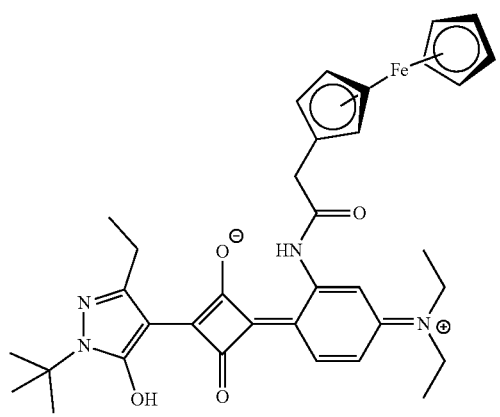
A-56
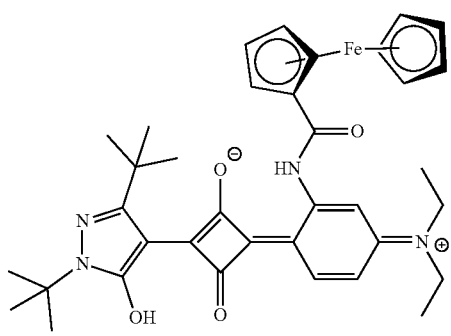

-continued
A-57
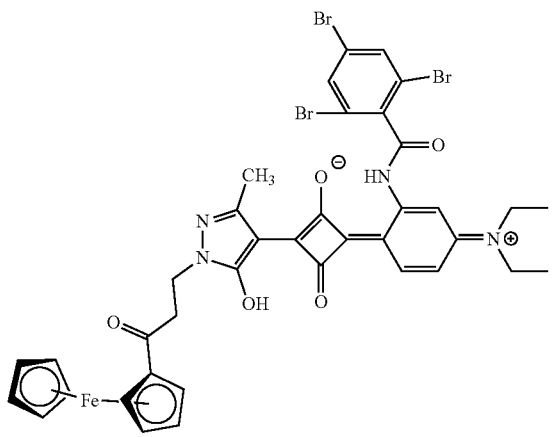
A-58
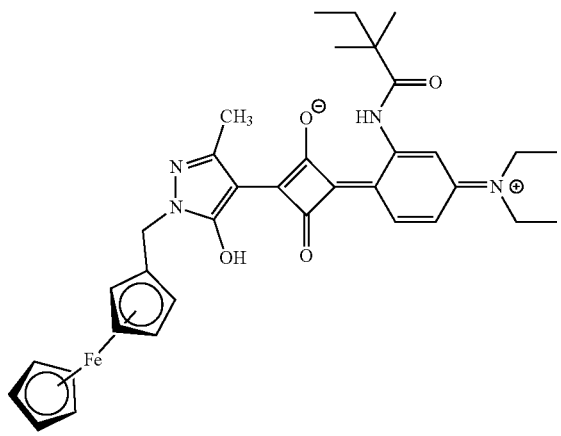
A-59
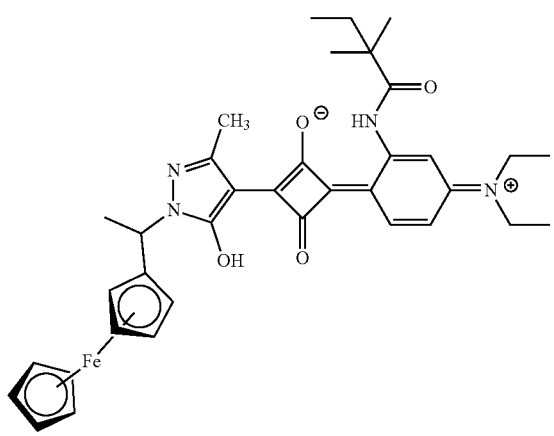
A-60
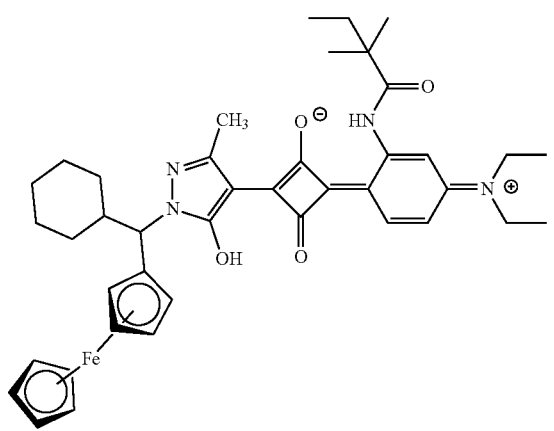
A-61
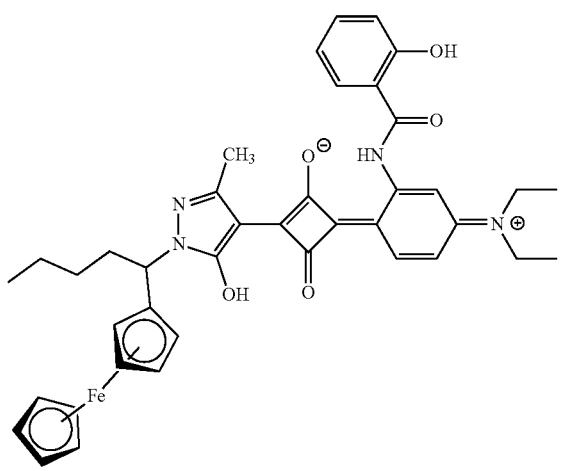
A-62
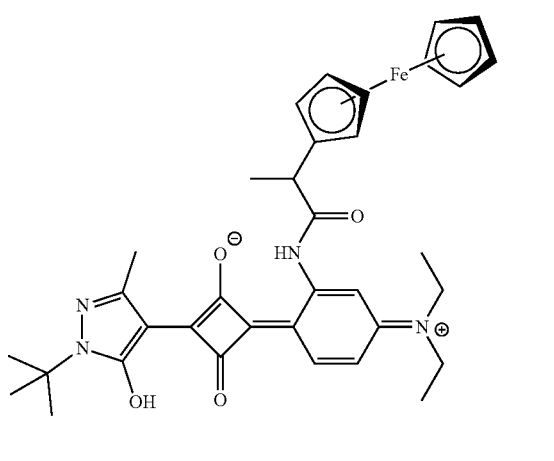

-continued
A-63
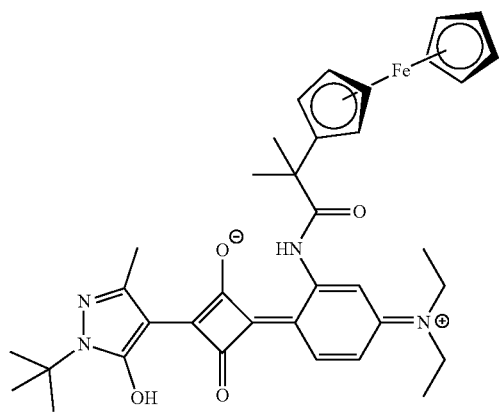
A-64
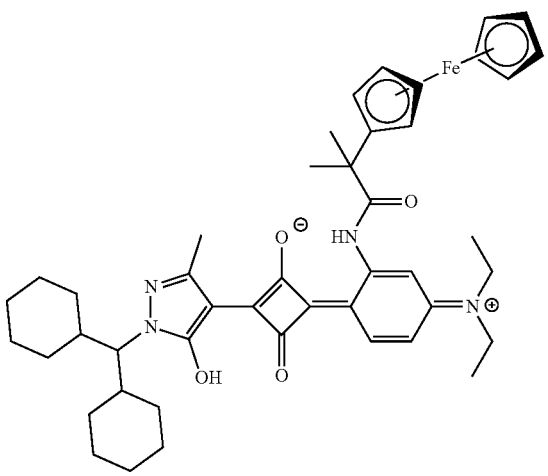
A-65
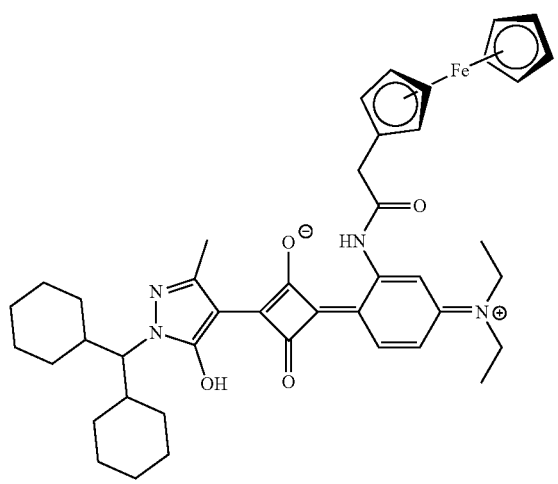
A-66
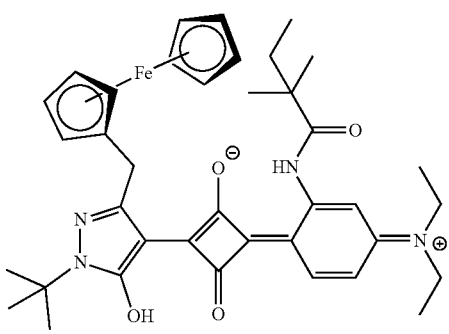
A-67
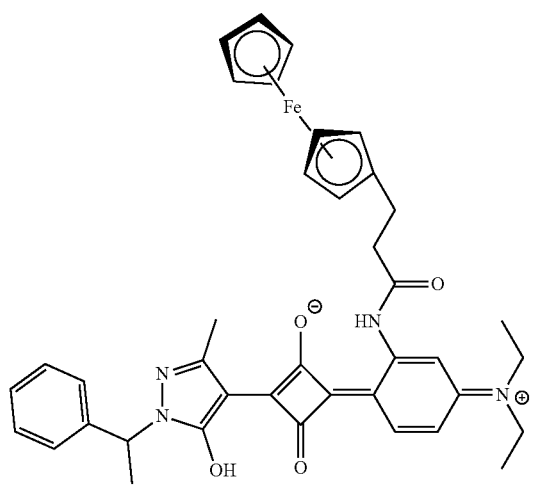
A-68
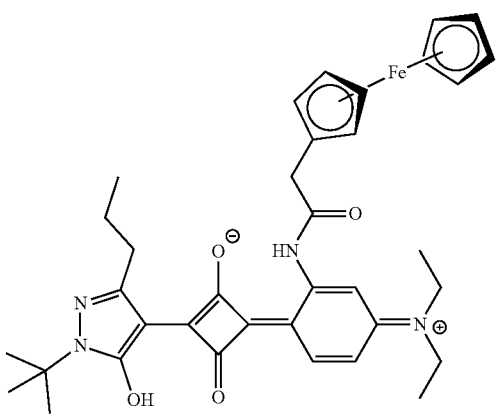

-continued
A-69
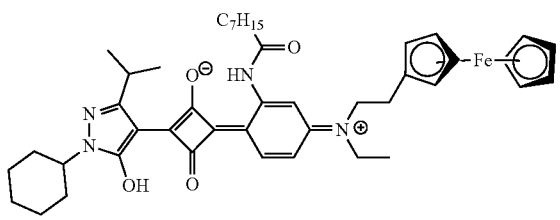
A-70
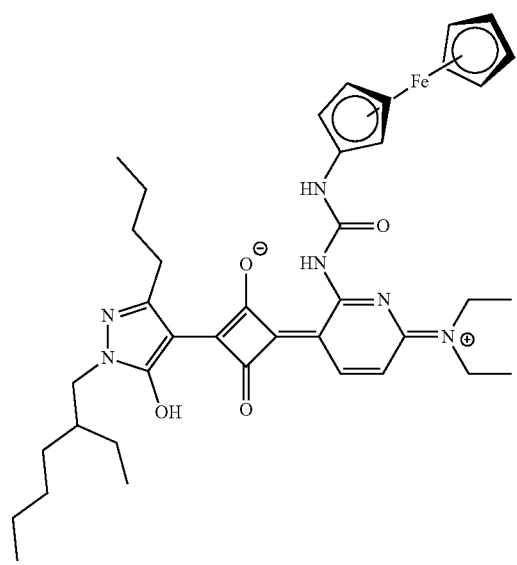
A-71
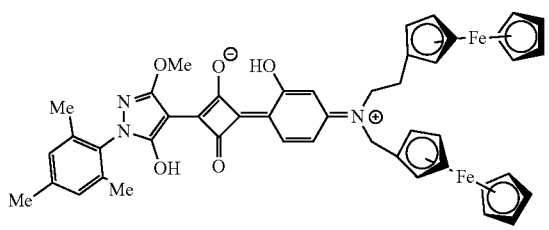
A-72
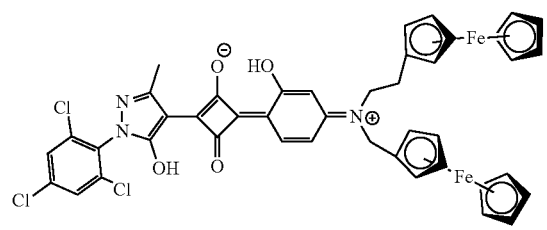
A-73
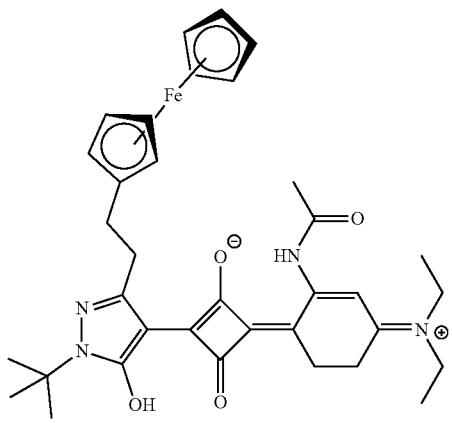
A-74
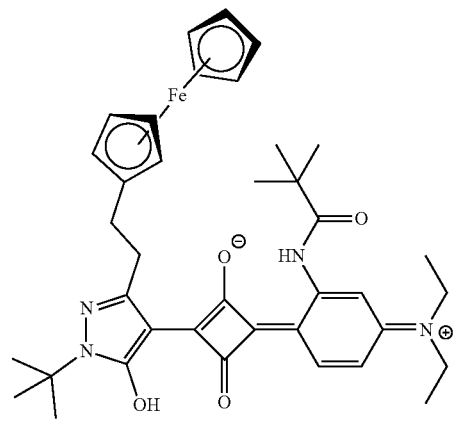

-continued
A-75
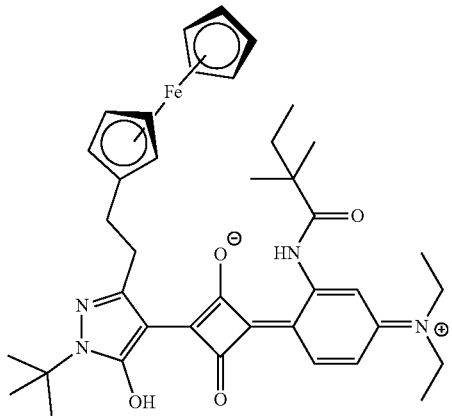
A-76
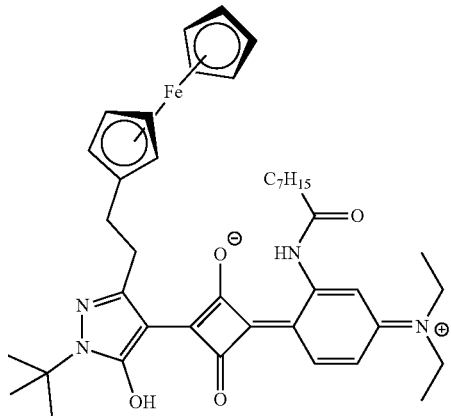
A-77
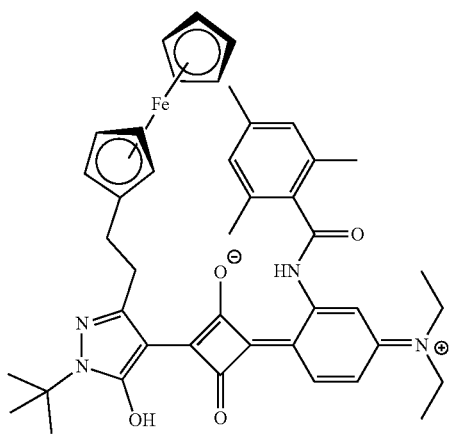
A-78
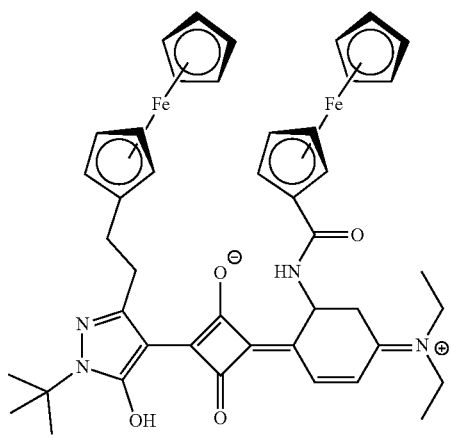
A-79
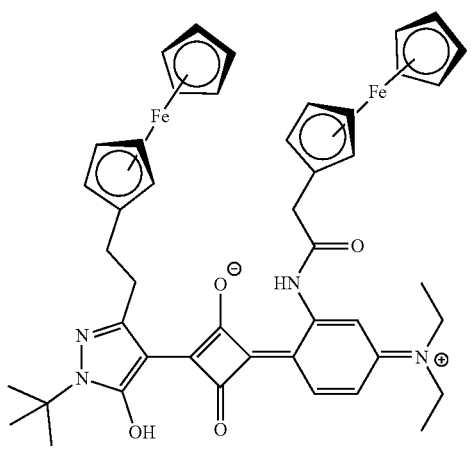
A-80
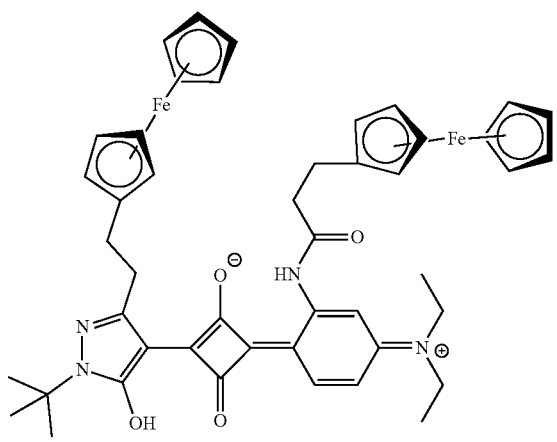

-continued
A-81
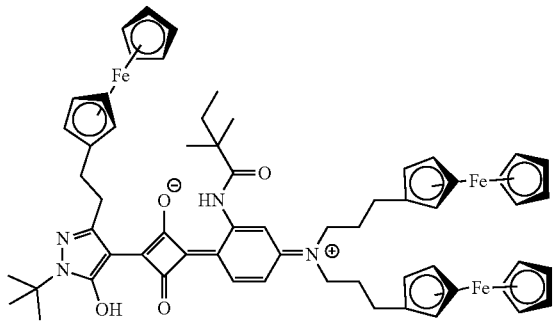
A-82
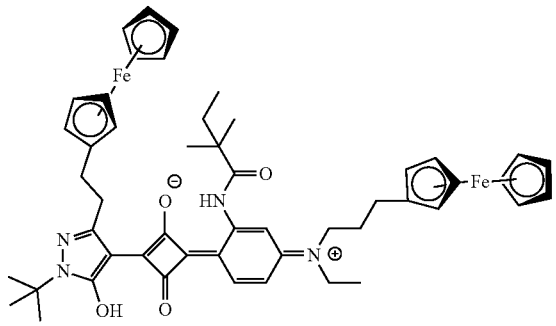
A-83
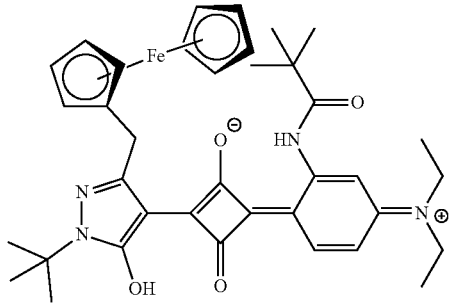
A-84
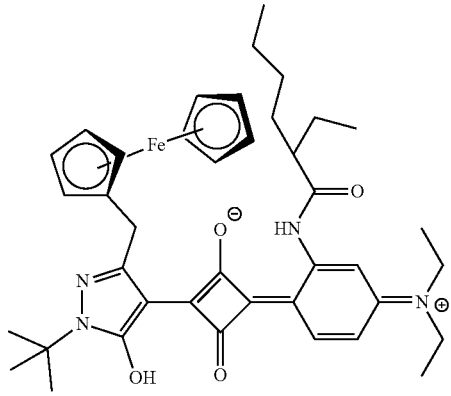
A-85
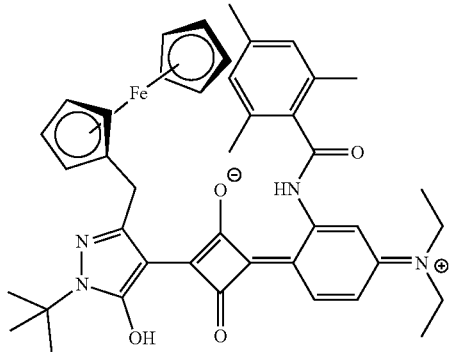
A-86
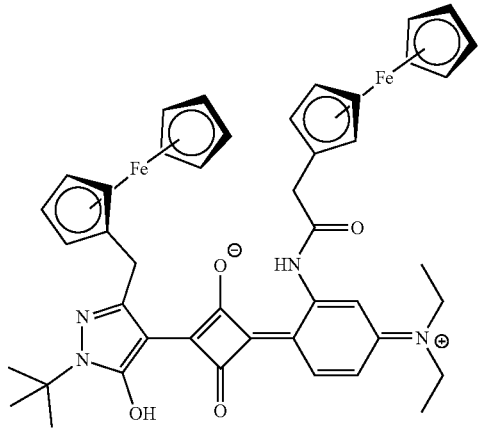
A-86
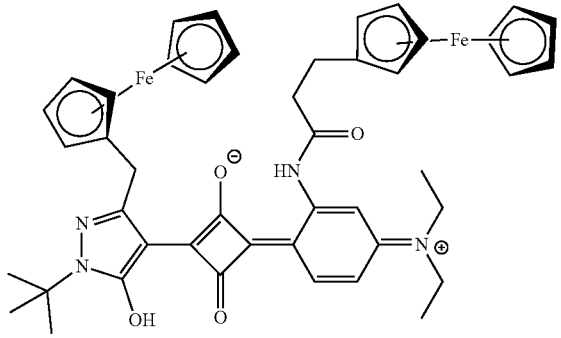
A-87
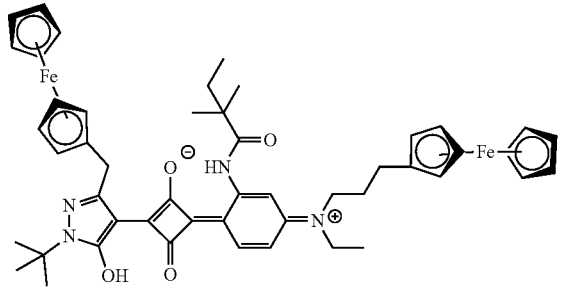

-continued
A-88
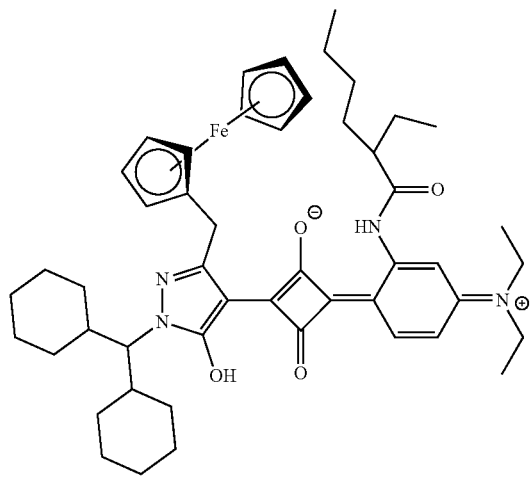
A-89
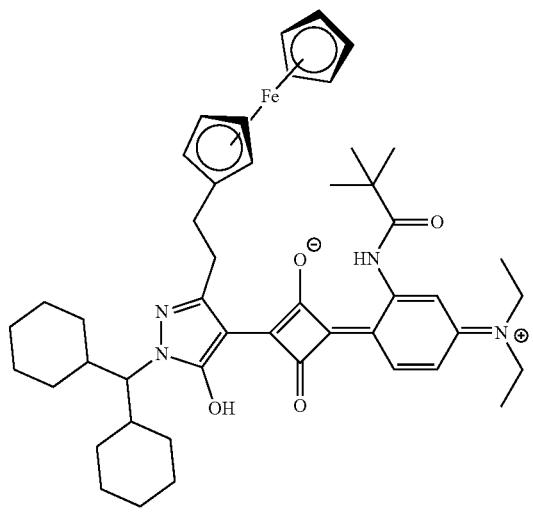
A-90
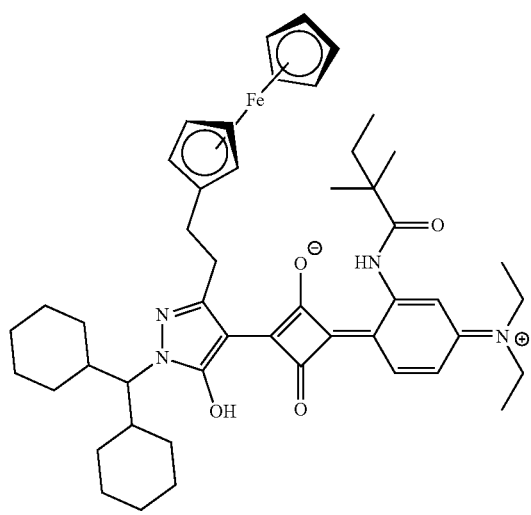
A-91
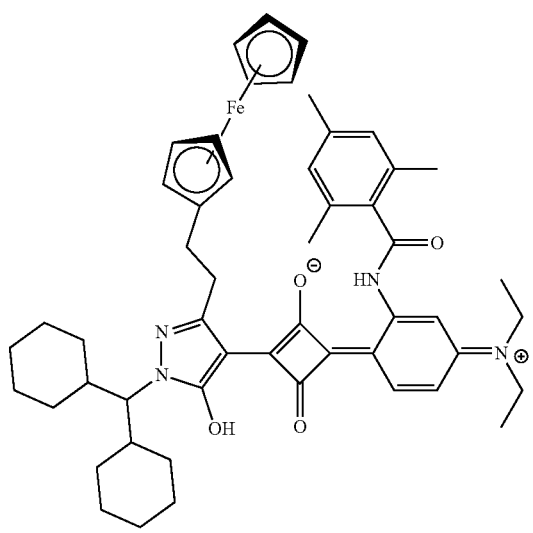
A-92
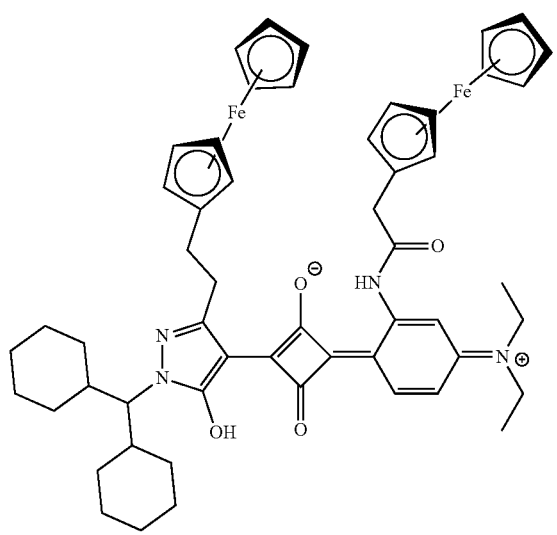
A-93
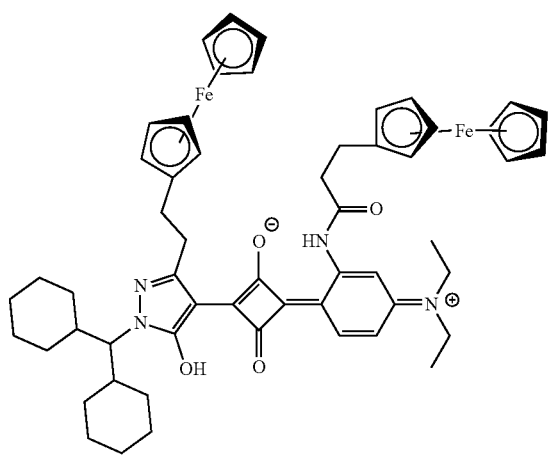

-continued
A-94
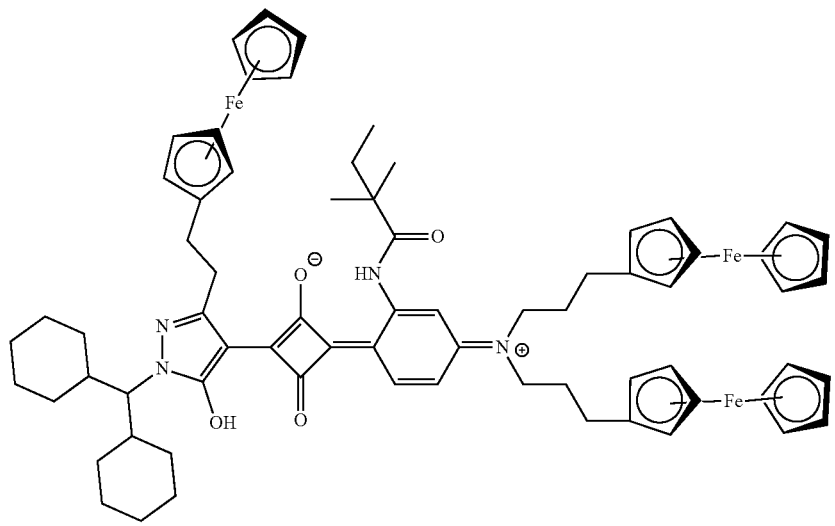
A-95
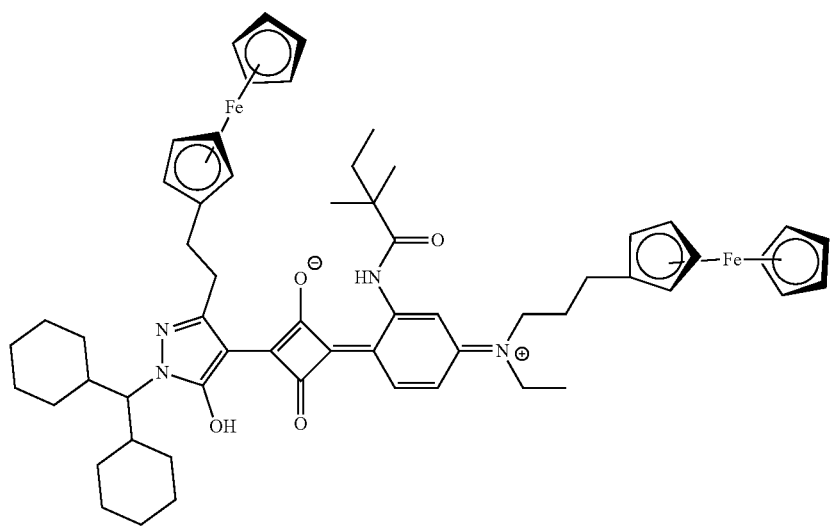
A-96
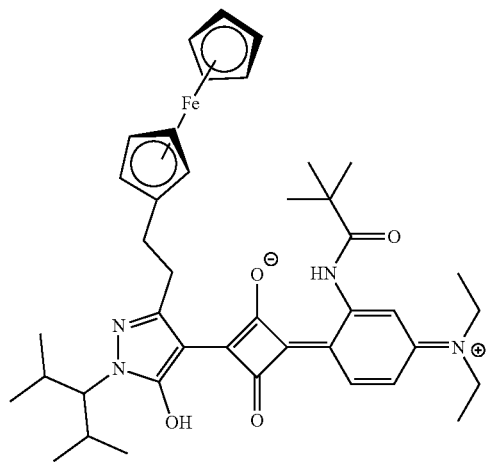
A-97
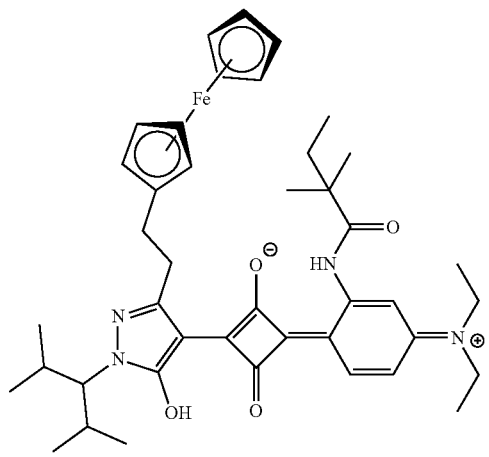

-continued
A-98
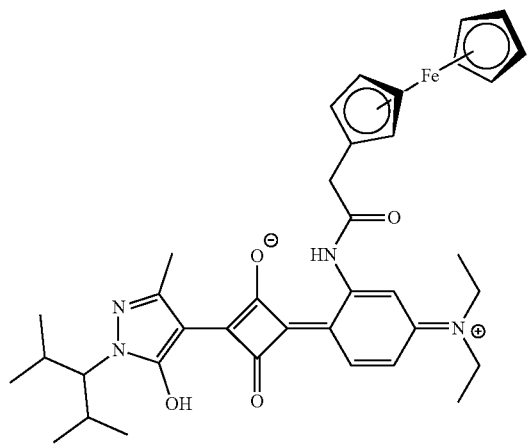
A-99
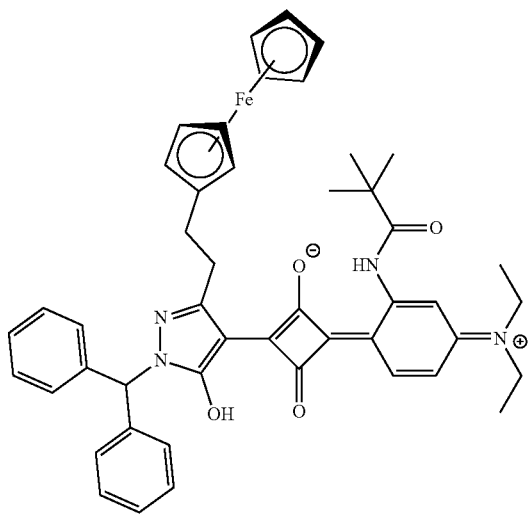
A-100
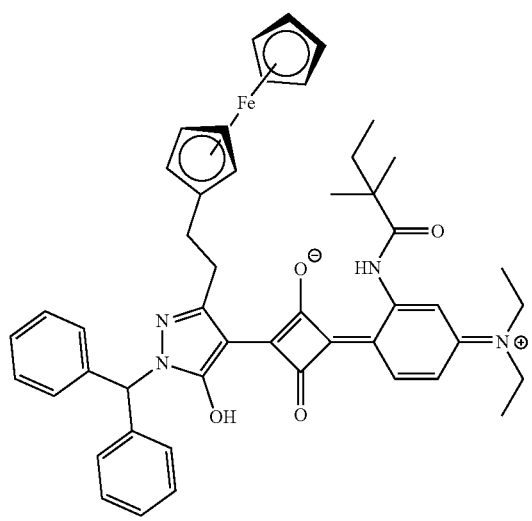
A-101
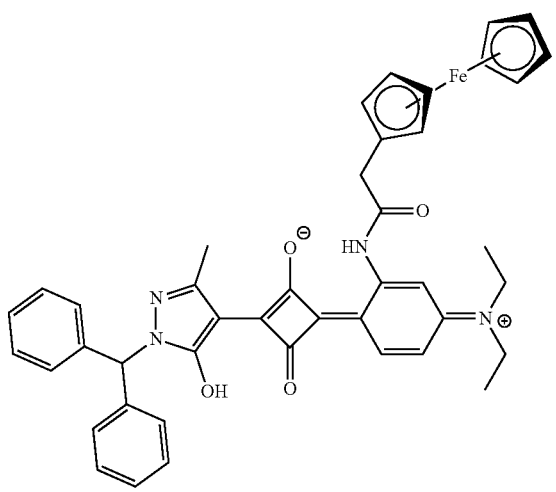
A-102
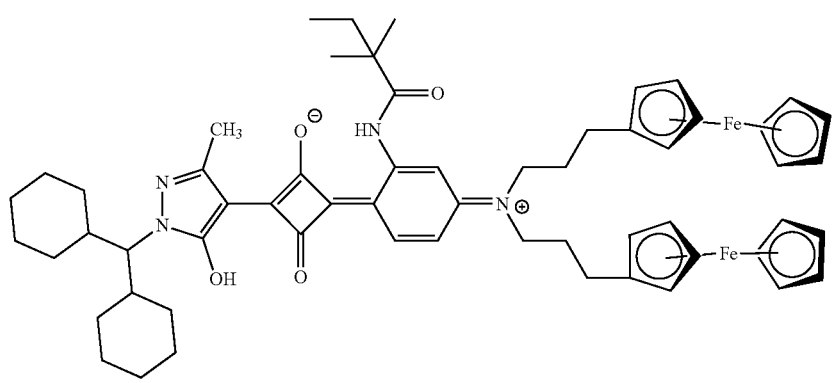

-continued
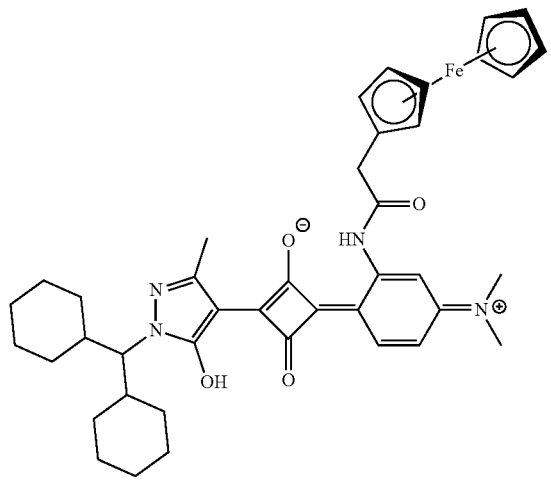
A-103
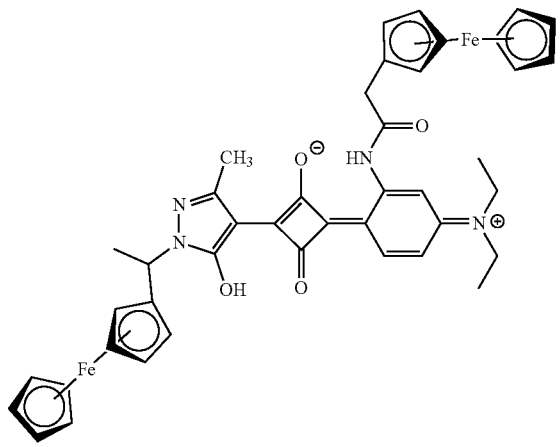
A-104
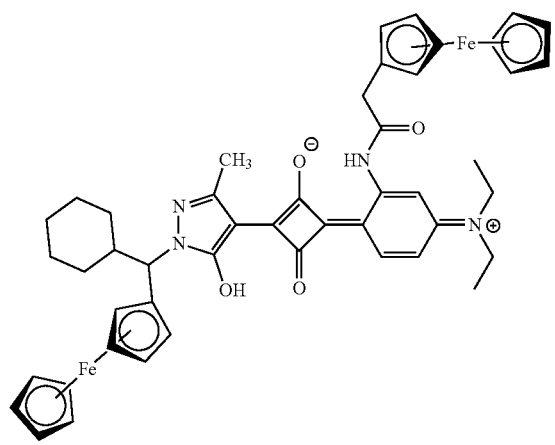
A-105
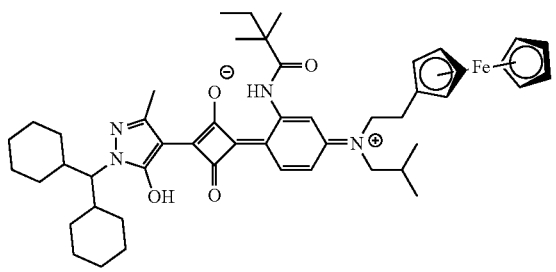
A-106
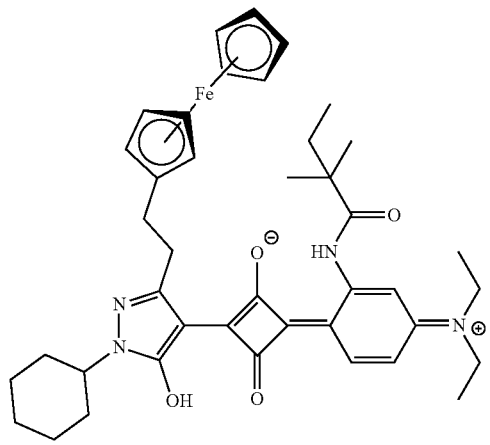
A-107
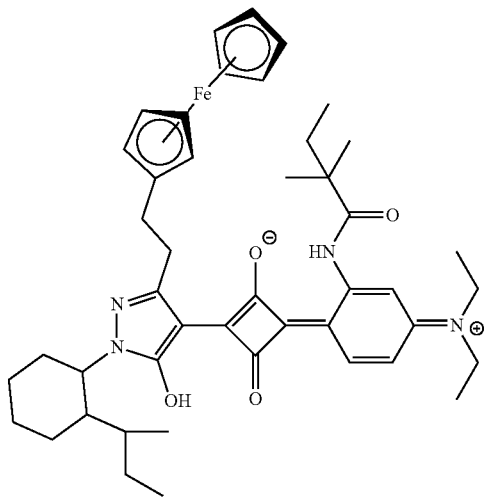
A-108

-continued
A-109
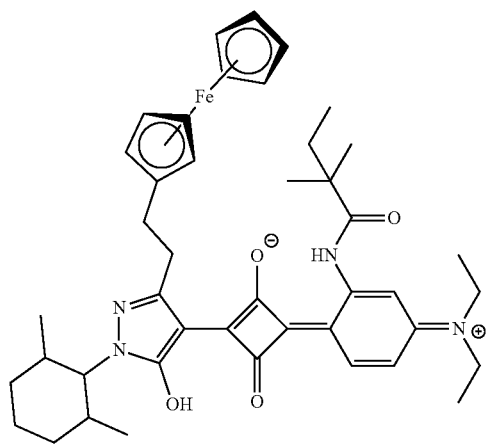
A-110
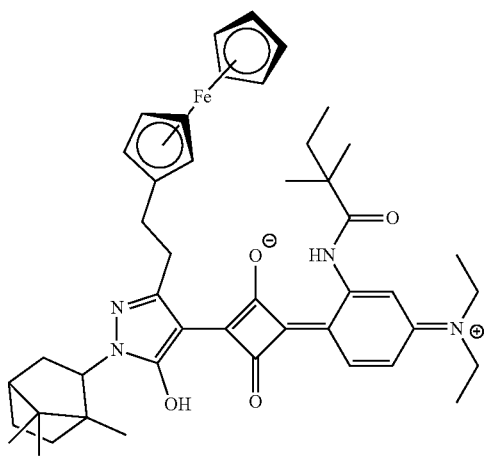
A-111
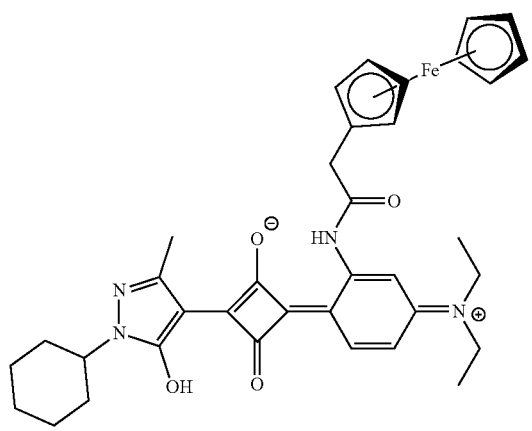
A-112
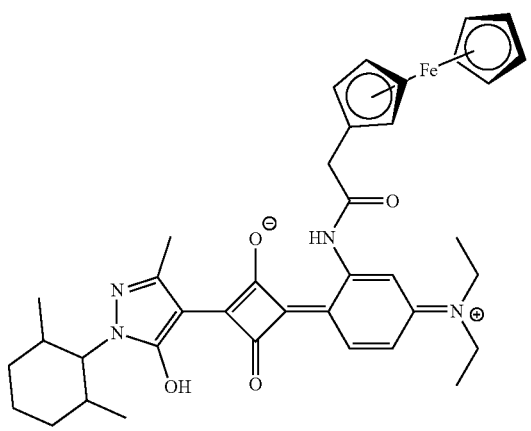
A-113
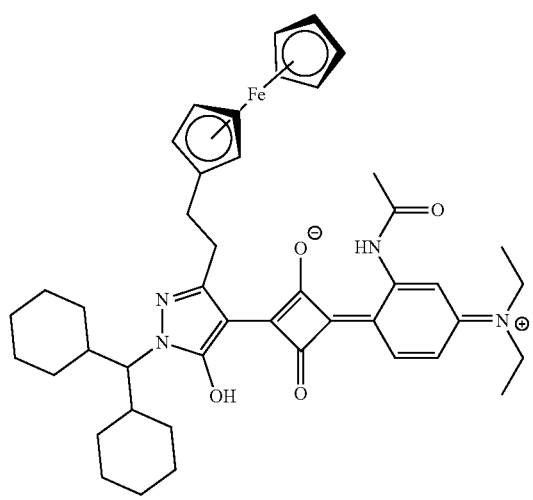
A-114
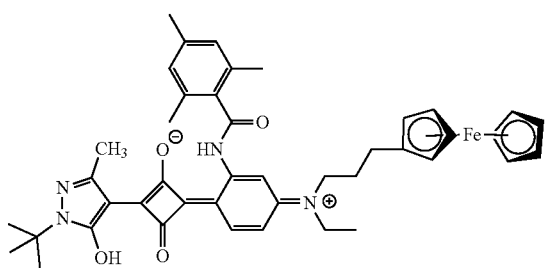

-continued

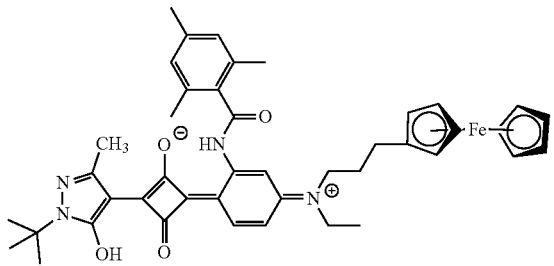
A-115

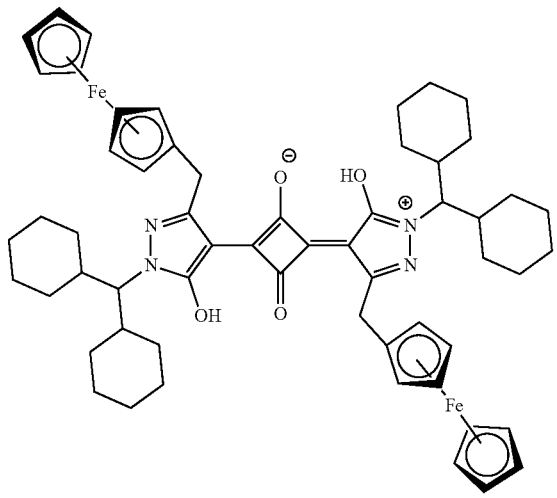
A-116

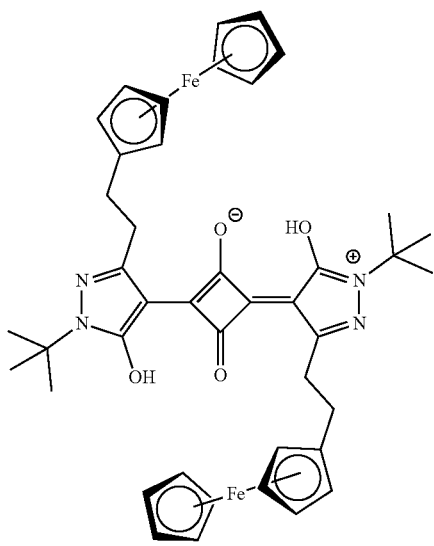
A-117

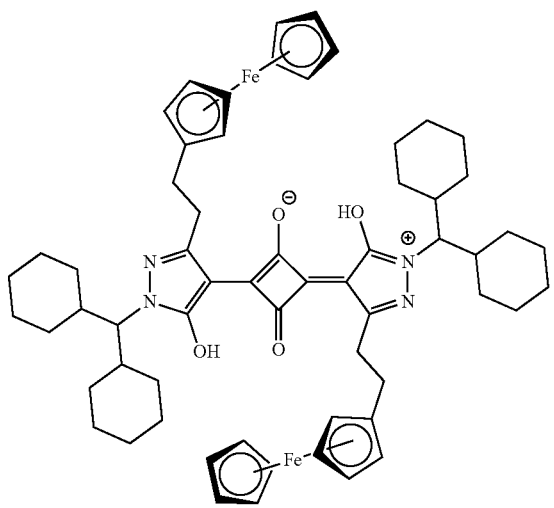
A-118

The content of the compound represented by Formula (1), which is used in the resin composition according to the embodiment of the present invention, is preferably 0.005 parts by mass to 5 parts by mass, more preferably 0.01 parts by mass to 3 parts by mass, and still more preferably 0.1 parts by mass to 1.5 parts by mass with respect to 100 parts by mass of the binder resin described later.

In a case where an optical filter includes two or more kinds of compounds represented by Formula (1), the above-described content is the total content thereof.

In a case where the optical filter according to the embodiment of the present invention also serves as a polarizing plate protective film or a pressure-sensitive adhesive layer which will be described later, it is sufficient that the content of the colorant is within the above-described range.

The compound represented by Formula (1) can be synthesized by a known method, and can be synthesized, for example, according to the synthetic method described in Examples described later.

In addition, in Formula (1A), in a case where Dye$^1$ is a colorant structural part obtained by removing n1 hydrogen atoms from a compound represented by Formula (3) and at least one of R$^3$ or R$^4$ is a group represented by Formula (2MA), the compound represented by Formula (1A) can be synthesized through the compounds shown below.

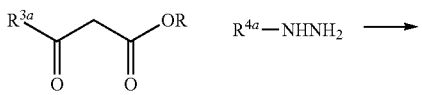

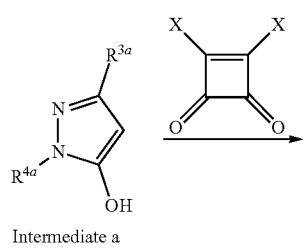

Intermediate a

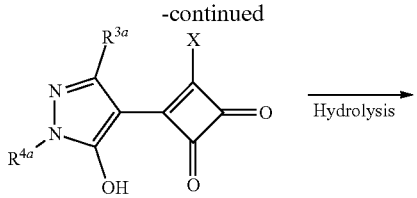

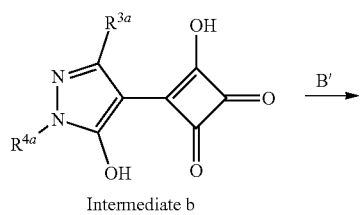

Intermediate b

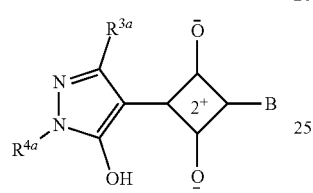

In the scheme, $R^{3a}$, $R^{4a}$, and B have the same meaning as $R^3$, $R^4$, and B in Formula (3). B' is a proton form (compound in which a direct bond of B is bonded to a hydrogen atom) of B. However, at least one of $R^{3a}$ or $R^{4a}$ represents a group represented by Formula (2MA). R represents an alkyl group, and X represents a halogen atom or an —OR group. The number of carbon atoms in the alkyl group which can be adopted as R is preferably 1 to 8 and more preferably 1 to 4. Examples of the alkyl group include methyl, ethyl, propyl, isopropyl, and butyl. Examples of the halogen atom which can be adopted as X include a fluorine atom, a chlorine atom, a bromine atom, and an iodine atom. X is preferably an —OR group or a chlorine atom.

Formula (2MA)

L represents a single bond or a divalent linking group which is not conjugated with $Dye^1$. $R^{1m}$ to $R^{9m}$ represent a hydrogen atom or a substituent. M represents Fe, Co, Ni, Ti, Cu, Zn, Zr, Cr, Mo, Os, Mn, Ru, Sn, Pd, Rh, V, or Pt. * represents a bonding part with Dye.

n1 represents an integer of 1 to 6.

The intermediate a is a compound represented by Formula (6).

The compound represented by Formula (6) can be synthesized, for example, according to the method described in Advanced Synthesis and Catalysis, 2016, vol. 358, #11, pp. 1713 to 1718.

Formula (6)

In the formula, each of $R^{3a}$ and $R^{4a}$ has the same meaning as $R^3$ and $R^4$ in Formula (3). However, at least one of $R^{3a}$ or $R^{4a}$ represents a group represented by Formula (2MB).

Formula (2MB)

In the formula, L is a single bond, a group selected from the group consisting of an alkylene group having 1 to 8 carbon atoms, an arylene group having 6 to 12 carbon atoms, —CH=CH—, —CO—, —NR—, —O—, —S—, —SO$_2$—, and —N=CH—, or a group of a combination of two or more (preferably 2 to 6) groups selected from the group consisting thereof, in which R represents a hydrogen atom or a monovalent substituent.

$R^{1m}$ to $R^{9m}$ represent a hydrogen atom or a substituent.

M represents Fe, Co, Ni, Ti, Cu, Zn, Zr, Cr, Mo, Os, Mn, Ru, Sn, Pd, Rh, V, or Pt.

* represents a bonding part.

As a group which can be adopted as L in Formula (2MB), a group selected from the group consisting of an alkylene group having 1 to 4 carbon atoms, a phenylene group. —CO—, —NH—, —O—, and —SO$_2$—, or a linking group of a combination of two or more (preferably 2 to 6) groups selected from the group consisting thereof is particularly preferable. The divalent linking group of a combination is not particularly limited, but is preferably a group including —CO—, —NH—, —O—, or —SO$_2$—. Examples thereof include a linking group including a group formed of a combination of two or more of —CO—, —NH—, —O—, and —SO$_2$— and linking groups formed of at least one of —CO—, —NH—, —O—, or —SO$_2$—, and an alkylene group or an arylene group. Examples of the linking group including a group formed of a combination of two or more of —CO—, —NH—, —O—, and —SO$_2$— include a linking group including —COO—, —OCO—, —CONH—, —NHCOO—, —NHCONH—, or —SO$_2$NH—. Examples of the linking group formed of at least one of —CO—, —NH—, —O—, or —SO$_2$—, and an alkylene group or an arylene group include a linking group of a combination of —CO—, —COO—, or —CONH—, and an alkylene group or an arylene group.

The structure of the compound represented by Formula (2MB) is the same as the structure of the compound represented by Formula (2M) except that, in a case where L is a group, L is a group (linking group) described above.

The compound represented by Formula (6) has a tautomeric structure such as the following structure, but any tautomeric structure may be adopted as long as at least one of the tautomeric structures applies to Formula (6), as described in paragraph 0008.
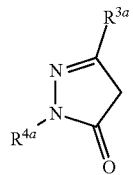
Specific examples of the compound represented by Formula (6) include the following.
G-1
G-2
G-3
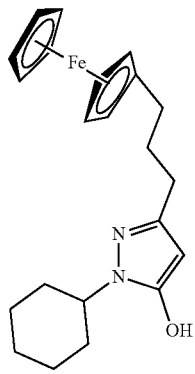
G-4
G-5
G-6
G-7
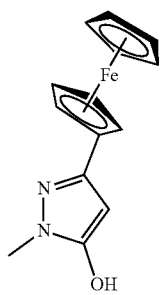
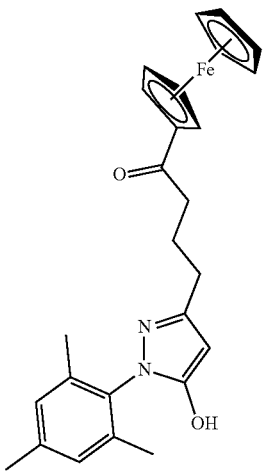
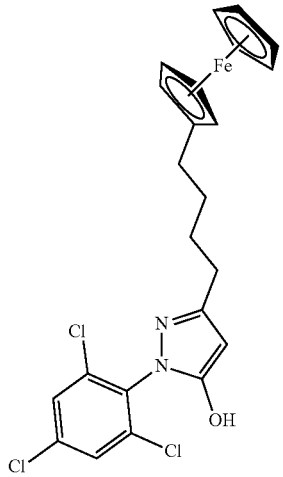

G-8
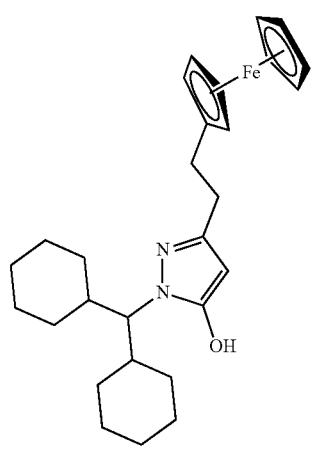
G-9
G-10
G-11
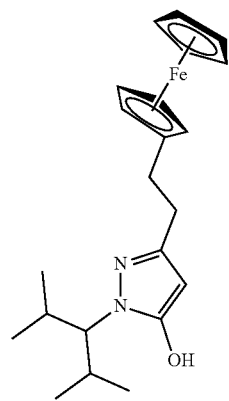
G-12
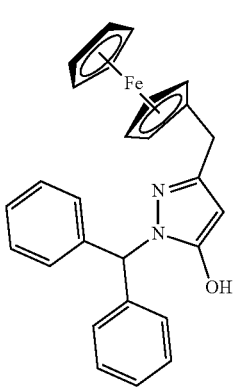
G-13
G-14
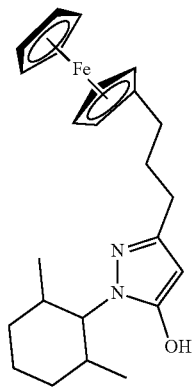
G-15
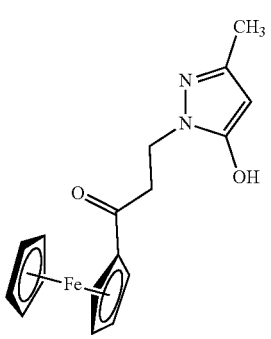
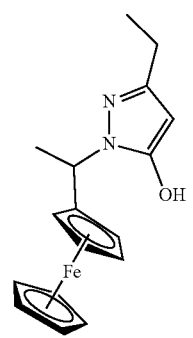

G-16
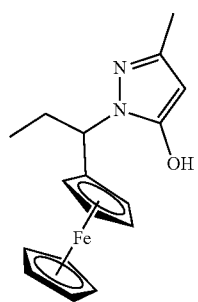
G-17
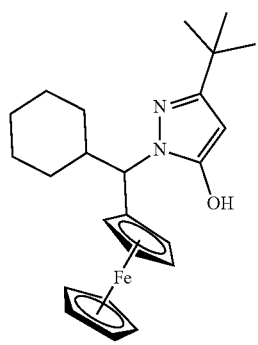
G-18
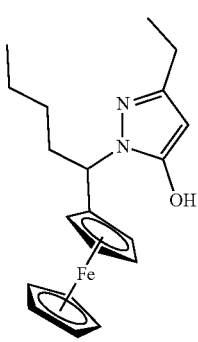
G-19
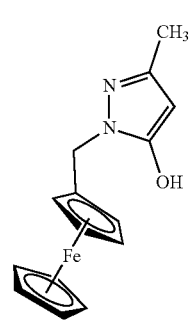
G-20
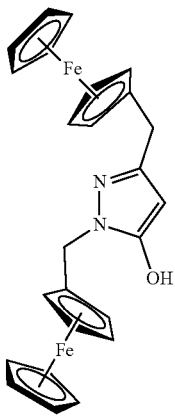
G-21
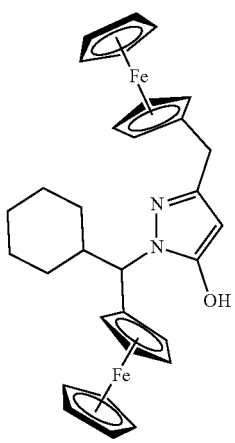
G-22
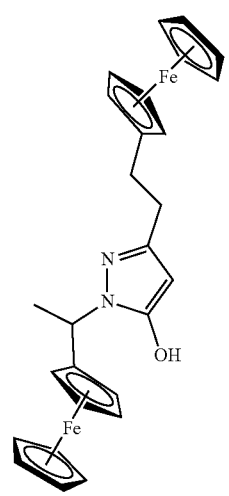
The intermediate b is a compound represented by Formula (7).
The compound represented by Formula (7) can be synthesized, for example, according to the method described in WO2001/044233A.

Formula (7)

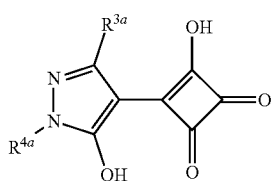

In the formula, the same substituent as $R^3$ and $R^4$ in Formula (3) can be adopted as $R^{3a}$ and $R^{4a}$. However, at least one of $R^{3a}$ or $R^{4a}$ represents a group represented by Formula (2M B).

The compound represented by Formula (7) has a tautomeric structure such as the following structure, but any tautomeric structure may be adopted as long as at least one of the tautomeric structures applies to Formula (7), as described in paragraph 0008.

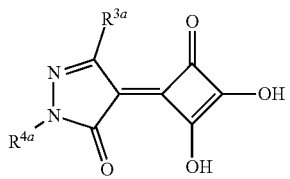

Examples of the compound represented by Formula (7) include the following.

H-1

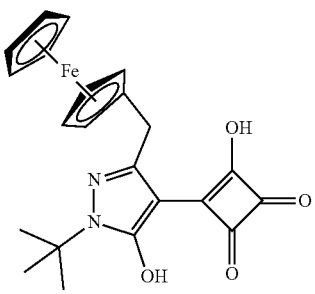

H-2

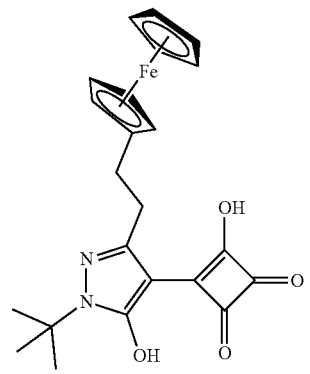

H-3

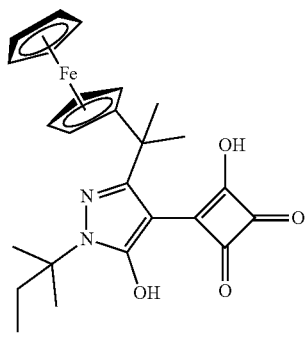

H-4

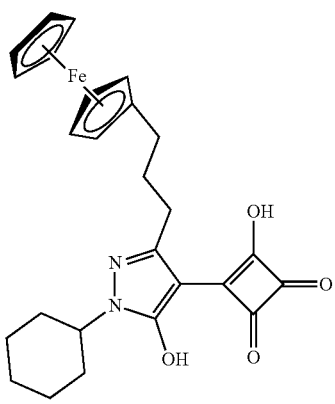

H-5

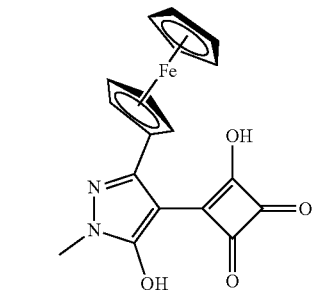

H-6

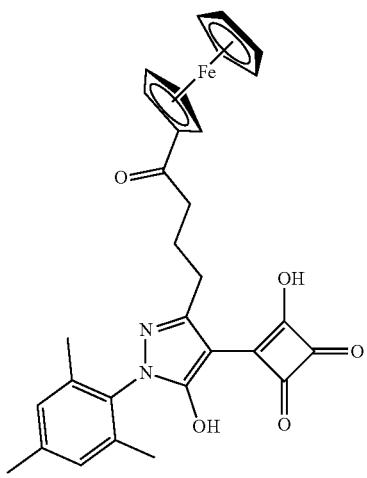

-continued
H-7
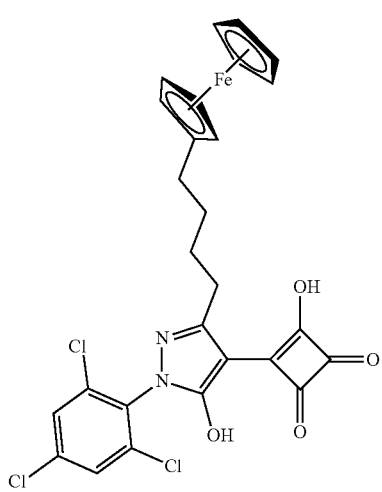
H-8
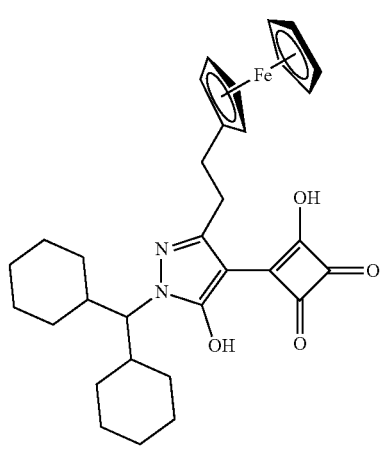
H-9
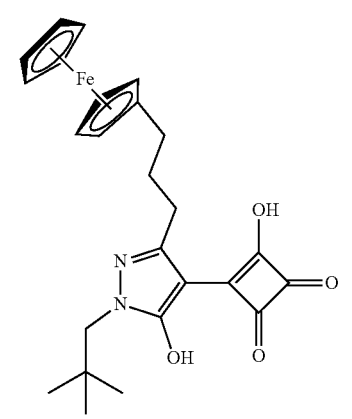
H-10
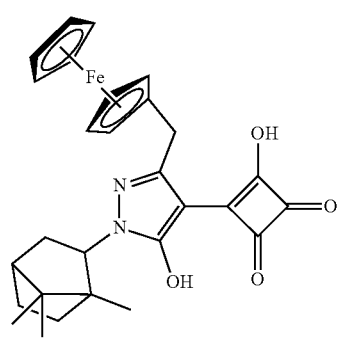
-continued
H-11
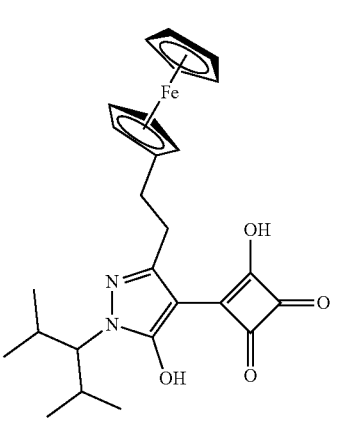
H-12
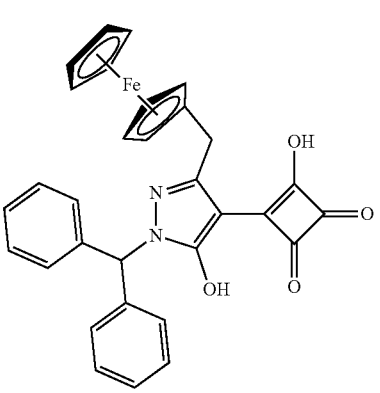
H-13
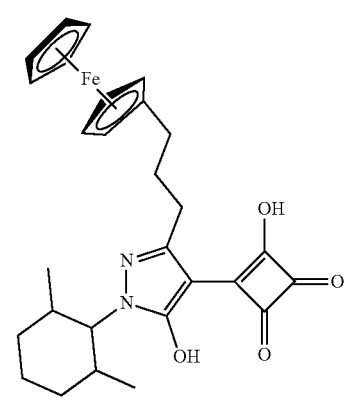
H-14
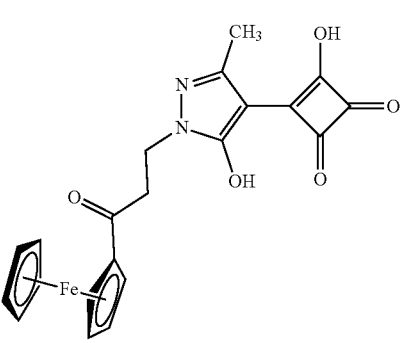

H-15
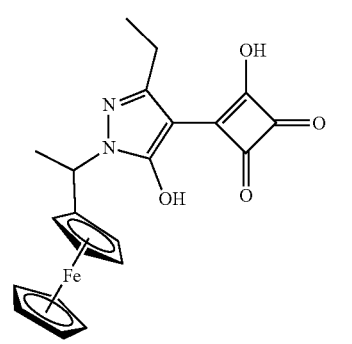

H-16
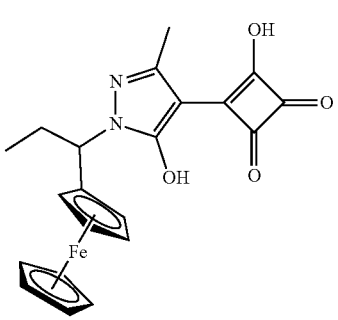

H-17
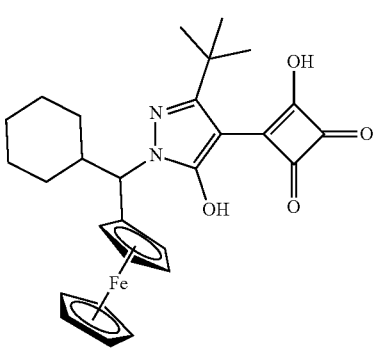

H-18
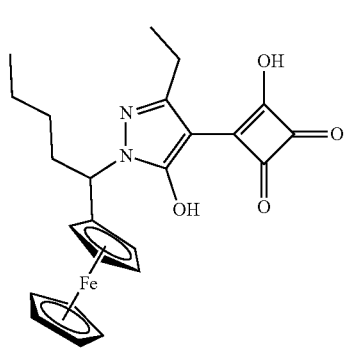

H-19
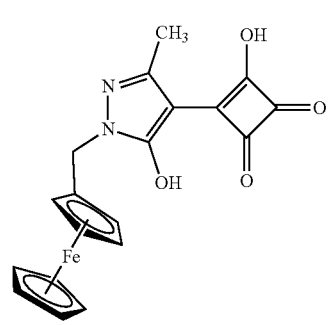

H-20
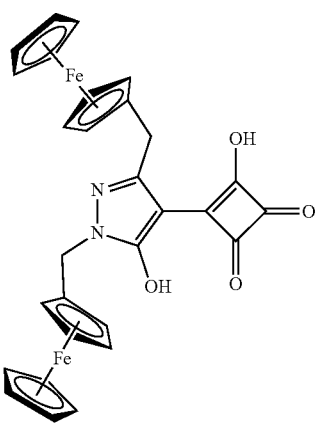

H-21
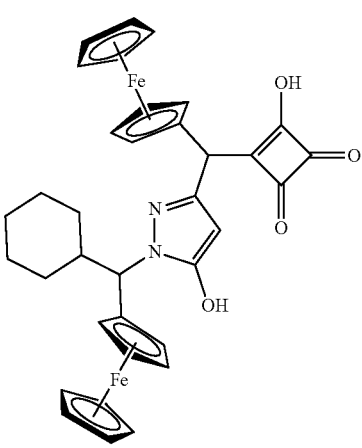

H-22
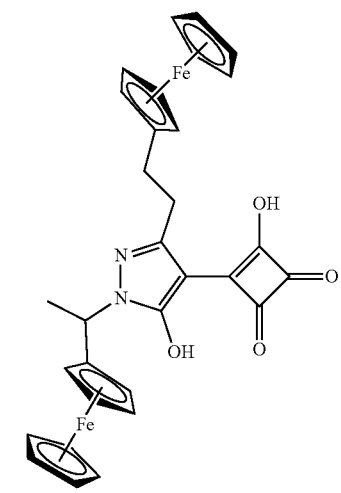

The resin composition according to the embodiment of the present invention contains a resin (binder) (binder may include any conventional component in addition to a polymer; hereinafter, may be referred to as a "binder resin"). The resin used in the present invention is preferably transparent. Here, the transparent resin refers to a resin having total light transmittance, measured by forming a 1 mm-thick test piece, of usually 70% or more, preferably 80% or more, and more preferably 90% or more. Examples of the resin used as a binder of the resin composition according to the embodiment of the present invention include a polystyrene resin, a cycloolefin-based resin, a cellulose acylate resin, and an acrylic resin, in which usual resins used as an optical filter can be applied. Among these, from the viewpoint of further reducing the fluorescence quantum yield, a polystyrene resin or a cycloolefin-based resin is preferable, and a polystyrene resin is particularly preferable.

Preferred aspects of the polystyrene resin and the cycloolefin-based resin which are preferable as the resin used in the present invention will be described.

(Polystyrene Resin)

A polystyrene included in the polystyrene resin refers to a copolymer including 50% by mass or more of a styrene component. In the present invention, only one polystyrene may be used or two or more polystyrenes may be used in combination. Here, the styrene component refers to a constitutional unit derived from a monomer having a styrene skeleton in the structure.

For the purpose of controlling a photoelastic coefficient of a resin composition or an optical filter to be preferable and controlling hygroscopicity of the resin composition or the optical filter to be preferable, the polystyrene more preferably includes 70% by mass or more of the styrene component and still more preferably includes 85% by mass or more of the styrene component. In addition, it is preferable that the polystyrene is composed of only the styrene component.

Examples of the polystyrene include a homopolymer of a styrene compound and a copolymer of two or more styrene compounds. Here, the styrene compound refers to a compound having a styrene skeleton in the structure and also refers to a compound having, in addition to styrene, a substituent introduced to a portion other than an ethylenically unsaturated bond of styrene. Examples of the styrene compound include styrene: alkyl styrenes such as α-methyl styrene, o-methyl styrene, m-methyl styrene, p-methyl styrene, 3,5-dimethyl styrene, 2,4-dimethyl styrene, o-ethyl styrene, p-ethyl styrene, and tert-butyl styrene; and substituted styrenes in which a hydroxyl group, an alkoxy group, a carboxy group, a halogen, or the like is introduced to a benzene nucleus of styrene, such as hydroxy styrene, tert-butoxy styrene, vinyl benzoic acid, o-chlorostyrene, and p-chlorostyrene. Among these, from the viewpoint of easy procurement, material costs, and the like, the polystyrene used in the present invention is preferably a homopolymer of styrene (that is, polystyrene).

In addition, constitutional components other than the styrene component, which are included in the above-described polystyrene, are not particularly limited. That is, the polystyrene may be a styrene-diene copolymer or a styrene-polymerizable unsaturated carboxylate ester copolymer. In addition, it is also possible to use a mixture of polystyrene and synthetic rubber (for example, polybutadiene, polyisoprene, and the like). In addition, high impact polystyrene (HIPS) obtained by graft-polymerizing styrene to synthetic rubber is also preferable. In addition, polystyrene (referred to as graft-type high impact polystyrene "graft HIPS") obtained by dispersing a rubber-form elastic body in a continuous phase of a polymer including the styrene component (for example, a copolymer of the styrene component and a (meth)acrylate ester component) and graft-polymerizing the copolymer to the rubber-form elastic body is also preferable. Furthermore, so-called styrene-based elastomers can also be suitably used.

In addition, the above-described polystyrene may be hydrogenated (may be a hydrogenated polystyrene). The hydrogenated polystyrene is not particularly limited, but is preferably hydrogenated styrene-diene-based copolymers such as a hydrogenated styrene-butadiene-styrene block copolymer (SEBS) and a hydrogenated styrene-isoprene-styrene block copolymer (SEPS), which are resins obtained by adding hydrogen to SBS or SIS. The hydrogenated polystyrene may be used singly or in combination of two or more thereof.

The molecular weight of the polystyrene used in the present invention is appropriately selected depending on the purpose of use, but is in range of, based on mass average molecular weight measured by gel permeation chromatography of a tetrahydrofuran solution (in a case where the polymer is not dissolved, toluene solution), usually 5000 to 500000, preferably 8000 to 200000, and more preferably 10000 to 100000. A polymer having a molecular weight within the above-described range is capable of satisfying both the mechanical strength and molding workability of a molded product at a high level in a well-balanced manner.

As the polystyrene, a plurality of types of polystyrene having different compositions, molecular weights, and the like can be used in combination.

The polystyrene resin can be obtained by a known anion, massive, suspension, emulsification, or solution polymerization method. In addition, in the polystyrene resin, an unsaturated double bond of a conjugated diene or of a benzene ring of a styrene monomer may be hydrogenated. The hydrogenation rate can be measured by a nuclear magnetic resonance device (NMR).

As the polystyrene resin, a commercially available product may be used, and examples thereof include "CLEAREN 530L", "CLEAREN 730L" manufactured by Denka Company Limited, "TUFPRENE 126S", "ASAPRENE T411" manufactured by Asahi Kasei Corporation, "KRATON D1102A", "KRATON Dl16A" manufactured by Kraton Corporation, "STYROLUX S", "STYROLUX T" manufactured by INEOS Styrolution Group GmbH, "ASAFLEX 840", "ASAFLEX 860" manufactured by Asahi Kasei Corporation (all of which is SBS), "679", "HF77", "SGP-10" manufactured by PS Japan Corporation, "DICSTYRENE XC-515", "DICSTYRENE XC-535" manufactured by DIC Corporation (all of which is GPPS), "4751", "H0103", "HT478" manufactured by PS Japan Corporation, and "DICSTYRENE GH-8300-5" manufactured by DIC Corporation (all of which is HIPS). Examples of the hydrogenated polystyrene-based resin include "TUFTEC H Series" manufactured by Asahi Kasei Corporation, "KRATON G Series" manufactured by Shell Japan Limited (all of which is SEBS), "DYNARON" manufactured by JSR Corporation (hydrogenated styrene-butadiene random copolymer), and "SEPTON" manufactured by Kuraray Co., Ltd. (SEPS). In addition, examples of a modified polystyrene-based resin include "TUFTEC M Series" manufactured by Asahi Kasei Corporation, "EPOFRIEND" manufactured by Daicel Corporation, "polar group-modified DYNARON" manufactured by JSR Corporation, and "RESEDA" manufactured by Toagosei Co., Ltd.

(Cycloolefin-Based Resin)

A cyclic olefin compound forming a cycloolefin-based polymer (also referred to as a cyclic polyolefin) included in the cycloolefin-based resin is not particularly limited as long as the cyclic olefin compound is a compound having a ring structure including a carbon-carbon double bond, and examples thereof include a norbornene compound, a monocyclic olefin compound which is not a norbornene compound, a cyclic conjugated diene compound, and a vinyl alicyclic hydrocarbon compound.

Examples of the cycloolefin-based polymer included in the cycloolefin-based resin include (1) polymers including a structural unit derived from a norbornene compound, (2) polymers including a structural unit derived from a monocyclic olefin compound which is not a norbornene compound, (3) polymers including a structural unit derived from a cyclic conjugated diene compound, (4) polymers including a structural unit derived from a vinyl alicyclic hydrocarbon compound, and hydrides of polymers including a structural unit derived from each of the compounds (1) to (4). In the present invention, the polymer including a structural unit derived from a norbornene compound and the polymer including a structural unit derived from a monocyclic olefin compound include ring-opening polymers of the respective compounds.

The cycloolefin-based polymer included in the cycloolefin-based resin is not particularly limited, but is preferably a polymer having a structural unit derived from a norbornene compound, which is represented by Formula (A-II) or (A-III). The polymer having the structural unit represented by Formula (A-II) is an addition polymer of a norbornene compound, and the polymer having the structural unit represented by Formula (A-III) is a ring-opening polymer of a norbornene compound.

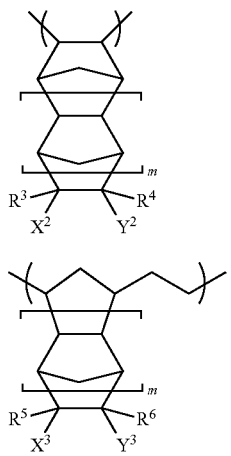

Formula (A-II)

Formula (A-III)

In Formula (A-II) or (A-III), m represents an integer of 0 to 4 and is preferably 0 or 1.

$R^3$ to $R^6$ each independently represent a hydrogen atom or a hydrocarbon group having 1 to 10 carbon atoms.

In the present invention, the hydrocarbon group is not particularly limited as long as the hydrocarbon group is a group consisting of a carbon atom and a hydrogen atom, and examples thereof include an alkyl group, an alkenyl group, an alkynyl group, and an aryl group (aromatic hydrocarbon group). Among these, an alkyl group or an aryl group is preferable.

$X^2$ and $X^3$, $Y^2$ and $Y^3$ each independently represent a hydrogen atom, a hydrocarbon group having 1 to 10 carbon atoms, a halogen atom, a hydrocarbon group having 1 to 10 carbon atoms, which is substituted with a halogen atom, —(CH$_2$)nCOOR$^{11}$, —(CH$_2$)nOCOR$^{12}$, —(CH$_2$)nNCO, —(CH$_2$)nNO$_2$, —(CH$_2$)nCN, —(CH$_2$)nCONR$^{13}$R$^{14}$, —(CH$_2$)nNR$^{13}$R$^{14}$, —(CH$_2$)nOZ, —(CH$_2$)nW, or (—CO)$_2$O or (—CO)$_2$NR$^{15}$ which is formed by bonding $X^2$ and $Y^2$, or $X^3$ and $Y^3$.

Here, $R^{11}$ to $R^{15}$ each independently represent a hydrogen atom or a hydrocarbon group having 1 to 20 carbon atoms, Z represents a hydrocarbon group or a hydrocarbon group substituted with halogen, and W represents Si(R$^{16}$)$_p$D$_{(3-p)}$ (R$^{16}$ represents a hydrocarbon group having 1 to 10 carbon atoms, and D represents a halogen atom, —OCOR$^{17}$, or —OR$^{17}$ (R$^{17}$ represents a hydrocarbon group having 1 to 10 carbon atoms), and p represents an integer of 0 to 3). n represents an integer of 0 to 10, and is preferably 0 to 8 and more preferably 0 to 6.

In Formula (A-II) or (A-III), $R^3$ to $R^6$ are respectively preferably a hydrogen atom or —CH$_3$, and from the viewpoint of moisture permeability, still more preferably a hydrogen atom.

Each of $X^2$ and $X^3$ is preferably a hydrogen atom, —CH$_3$, or —C$_2$H$_5$, and from the viewpoint of moisture permeability, still more preferably a hydrogen atom.

Each of $Y^2$ and $Y^3$ is preferably a hydrogen atom, a halogen atom (particularly a chlorine atom), or —(CH$_2$)nCOOR$^{11}$ (particularly —COOCH$_3$), and from the viewpoint of moisture permeability, still more preferably a hydrogen atom.

Other groups are appropriately selected.

The polymer having the structural unit represented by Formula (A-II) or (A-III) may further include at least one kind of a structural unit represented by Formula (A-I).

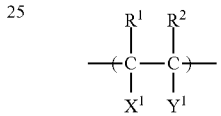

Formula (A-I)

In Formula (A-1), $R^1$ and $R^2$ each independently represent a hydrogen atom or a hydrocarbon group having 1 to 10 carbon atoms, and $X^1$ and $Y^1$ each independently represent a hydrogen atom, a hydrocarbon group having 1 to 10 carbon atoms, a halogen atom, a hydrocarbon group having 1 to 10 carbon atoms, which is substituted with a halogen atom, —(CH$_2$)nCOOR$^{11}$, —(CH$_2$)nOCOR$^{12}$, —(CH$_2$)nNCO, —(CH$_2$)nNO$_2$, —(CH$_2$)nCN, —(CH$_2$)nCONR$^{13}$R$^{14}$, —(CH$_2$)nNR$^{13}$R$^{14}$, —(CH$_2$)nOZ, —(CH$_2$)nW, or (—CO)$_2$O or (—CO)$_2$NR$^{15}$ which is formed by bonding $X^1$ and $Y^1$.

Here, $R^{11}$ to $R^{15}$ each independently represent a hydrogen atom or a hydrocarbon group having 1 to 20 carbon atoms, Z represents a hydrocarbon group or a hydrocarbon group substituted with halogen, and W represents Si(R$^{16}$)$_p$D$_{(3-p)}$ (R$^{16}$ represents a hydrocarbon group having 1 to 10 carbon atoms, and D represents a halogen atom, —OCOR$^{17}$, or —OR$^{17}$(R$^{17}$ represents a hydrocarbon group having 1 to 10 carbon atoms), and p represents an integer of 0 to 3). n represents an integer of 0 to 10.

From the viewpoint of adhesiveness to a polarizer, the content of the above-described structural unit derived from a norbornene compound in the cyclic polyolefin having the structural unit represented by Formula (A-II) or (A-III) is preferably 90% by mass or less, more preferably 30% to 85% by mass, still more preferably 50% to 79% by mass, and most preferably 60% to 75% by mass with respect to the total mass of the cyclic polyolefin. Here, the proportion of the structural unit derived from a norbornene compound represents the average value in the cyclic polyolefin.

Addition (co)polymers of a norbornene compound are described in JP1998-007732A (JP-H10-007732A), JP2002-504184A, US2004/0229157A1, WO2004/070463A, or the like.

The polymer of a norbornene compound is obtained by an addition polymerization of norbornene compounds (for example, polycyclic unsaturated compounds of norbornene).

In addition, examples of the polymer of a norbornene compound include copolymers obtained by an addition copolymerization of, as necessary, a norbornene compound, and olefin such as ethylene, propylene, and butene, conjugated diene such as butadiene and isoprene, unconjugated diene such as ethylidene norbornene, or an ethylenically unsaturated compound such as acrylonitrile, acrylic acid, methacrylic acid, maleic acid anhydride, acrylic acid ester, methacrylic acid ester, maleimide, vinyl acetate, and vinyl chloride. Among these, a copolymer with ethylene is preferable.

Examples of the above-described addition (co)polymers of a norbornene compound include APL8008T (Tg: 70° C.), APL6011T (Tg: 105° C.), APL6013T (Tg: 125° C.), and APL6015T (Tg: 145° C.) which are sold by Mitsui Chemicals, Inc. under a trade name of APL and have different glass transition temperatures (Tg). In addition, pellets such as TOPAS8007, TOPAS6013, and TOPAS6015 are commercially available from Polyplastics Co., Ltd. Furthermore, Appear3000 is commercially available from Film Ferrania S. R. L.

As the above-described polymer of a norbornene compound, a commercially available product can be used. For example, polymers are commercially available from JSR Corporation under a trade name of Arton G or Arton F, and polymers are commercially available from Zeon Corporation under a trade name of Zeonor ZF14, ZF16, Zeonex 250, or Zeonex 280.

The hydride of the polymer of a norbornene compound can be synthesized by an addition polymerization or a ring-opening metathesis polymerization of a norbornene compound or the like and then an addition of hydrogen. Synthetic methods are described in, for example, JP1989-240517A (JP-H01-240517A), JP1995-196736A (JP-H07-196736A), JP1985-026024A (JP-S60-026024A), JP1987-019801 A (JP-S62-019801A), JP2003-159767A, JP2004-309979A, and the like.

The molecular weight of the cycloolefin-based polymer used in the present invention is appropriately selected depending on the purpose of use, but is in range of, based on mass average molecular weight in terms of polyisoprene or polystyrene measured by gel permeation chromatography of a cyclohexane solution (in a case where the polymer is not dissolved, toluene solution), usually 5000 to 500000, preferably 8000 to 200000, and more preferably 10000 to 100000. A polymer having a molecular weight within the above-described range is capable of satisfying both the mechanical strength and molding workability of a molded product at a high level in a well-balanced manner.

From the viewpoint of sharpness of absorption waveform and light resistance, the resin composition according to the embodiment of the present invention includes the binder resin in an amount of preferably 50% by mass or more, more preferably 70% by mass or more, and particularly preferably 90% by mass or more with respect to the total solid content (specifically, with respect to the components excluding the above-described organic solvent).

Two or more binder resins may be used, and binders having different compositional ratios and/or molecular weights may be used in combination. In this case, the total content of the respective binder resins is within the above-described range.

<Additive>

The resin composition according to the embodiment of the present invention may include an additive as long as the effects of the present invention are not impaired. For example, the resin composition according to the embodiment of the present invention may include an additive which can be generally blended in a plastic film as necessary. Examples of the additive include an antioxidant, a heat stabilizer, a light stabilizer, an ultraviolet absorber, an antistatic agent, a lubricant, a plasticizer, and a filler, and the content thereof can be selected within a range which does not impair the object of the present invention. In addition, examples of the additive include a known plasticizer, an organic acid, a polymer, a retardation adjuster, an ultraviolet absorber, an antioxidant, and a matting agent. With regard to these compounds, reference can be made to the description in paragraphs "0062" to "0097" of JP2012-155287A, and the contents of which are incorporated herein by reference. In addition, examples of the additive include a peeling accelerator, an organic acid, and a polyvalent carboxylic acid derivative. With regard to these compounds, reference can be made to the description in paragraphs "0212" to "0219" of W2015/005398A, and the contents of which are incorporated herein by reference. Furthermore, examples of the additive include a radical scavenger and a deterioration inhibitor which will be described later.

The content of the additive (in a case where the resin composition contains two or more kinds of additives, total content thereof) is preferably 50 parts by mass or less, more preferably 30 parts by mass or less, and still more preferably 5 to 30 parts by mass with respect to 100 parts by mass of the binder resin.

(Antioxidant)

A preferred example of the additive includes an antioxidant. With regard to the antioxidant, reference can be made to the description in paragraphs "0143" to "0165" of WO2015/005398A, and the contents of which are incorporated herein by reference.

(Radical Scavenger)

A preferred example of the additive includes a radical scavenger. With regard to the radical scavenger, reference can be made to the description in paragraphs "0166" to "0199" of WO2015/005398A, and the contents of which are incorporated herein by reference.

(Deterioration Inhibitor)

A preferred example of the additive includes a deterioration inhibitor. With regard to the deterioration inhibitor, reference can be made to the description in paragraphs "0205" and "0206" of WO2015/005398A, and the contents of which are incorporated herein by reference.

(Ultraviolet Absorber)

In the present invention, from the viewpoint of preventing deterioration, an ultraviolet absorber may be added to the optical filter. From the viewpoint of excellent absorption capacity of ultraviolet rays with a wavelength of 370 nm or less and good liquid crystal display properties, an ultraviolet absorber having a small absorption of visible light with a wavelength of 400 nm or more is preferably used. Specific examples of the ultraviolet absorber preferably used in the present invention include a hindered phenol-based compound, a hydroxybenzophenone-based compound, a benzotriazole-based compound, a salicylic acid ester-based compound, a benzophenone-based compound, a cyanoacrylate-based compound, and a nickel complex salt compound.

Examples of the hindered phenol-based compound include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris-(3,5-di-tert-butyl-4-hydroxybenzyl)-isocyanurate. Examples of the benzotriazole-based compound include 2-(2'-hydroxy-5'- methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2(2'-hydroxy-3',5'-di-tert-butylphenyl)-5-chlorobenzotriazole, (2(2'-hydroxy-3',5-di-tert-amylphenyl)-5-chlorobenzotriazole, 2,6-di-tert-butyl-p-cresol, pentaerythrityl-tetrakis[3-(3,5-di-tert-butyl-4-hydroxyphenyl)propionate], and 2-(2H-benzotriazol-2-yl)-6-(1-methyl-1-phenylethyl)-4-(1,1,3,3-tetramethylbutyl)phenol.

[Optical Filter]

A film formed using the resin composition according to the embodiment of the present invention is suitable as an optical filter. That is, the optical filter according to the embodiment of the present invention is a film including the resin composition according to the embodiment of the present invention. The content of each component in the optical filter is the same as that in the resin composition according to the embodiment of the present invention.

Hereinafter, a method of producing an optical filter will be described.

<Method of Producing Optical Filter>

The method of producing an optical filter is not particularly limited as long as the resin composition according to the embodiment of the present invention is used, and the optical filter can be appropriately produced by an ordinary molding method.

The optical filter according to the embodiment of the present invention can be produced by, for example, a method of forming a solution casting film. In the method of forming a solution casting film, a film can be produced using a solution (dope, one aspect of the resin composition according to the embodiment of the present invention) prepared by dissolving at least the compound represented by Formula (1) and the binder resin in an organic solvent.

The organic solvent is not particularly limited as long as the organic solvent can dissolve the compound represented by Formula (1) and the binder resin. For example, a solvent selected from an alcohol having 1 to 4 carbon atoms, an ether having 3 to 12 carbon atoms, a ketone having 3 to 12 carbon atoms, an ester having 3 to 12 carbon atoms, and a halogenated hydrocarbon having 1 to 6 carbon atoms can be used.

The above-described ether, ketone, and ester may have a cyclic structure. In addition, a compound having any two or more functional groups (that is, —O—, —CO—, and —COO—) of the above-described ether, ketone, and ester can also be used as the organic solvent. The above-described organic solvent may have another functional group such as an alcoholic hydroxyl group. In a case of an organic solvent having two or more kinds of functional groups, it is preferable that the number of carbon atoms of the organic solvent is within the above-described preferred range with regard to the number of carbon atoms of the solvent having any functional group.

The content of the binder resin in the solution is preferably adjusted to 10% to 40% by mass and still more preferably 10% to 30% by mass. The above-described optional additive may be added to the organic solvent (main solvent).

With regard to a drying method in the method of forming a solution casting film, reference can be made to the description in U.S. Pat. Nos. 2,336,310A, 2,367,603A, 2,492,078A, 2,492,977A, 2,492,978A, 2,607,704A, 2,739,069A, 2,739,070A, GB640731B, GB736892B, JP1970-004554B (JP-S45-004554B), JP1974-005614B (JP-S49-005614B), JP1985-176834A (JP-S60-176834A), JP1985-203430A (JP-S60-203430A), and JP1987-115035A (JP-S62-115035A). Drying on a band can be performed by blowing air or an inert gas such as nitrogen.

It is preferable that the dope is cast onto the band and the solvent is evaporated to form a film. It is preferable that the concentration of the dope before casting is adjusted such that the solid content is in a range of 10% to 40% by mass. It is preferable that the surface of the band is polished off in a state of mirror surface.

It is also possible to cast two or more layers using the prepared solution (dope) to form a film.

In a case of casting a plurality of cycloolefin-based resin solutions to form a film having two or more layers, a film may be produced while casting each of the solutions including the cycloolefin-based resin from a plurality of casting ports provided at intervals in a traveling direction of a support, and laminating the solutions. With regard to the methods, for example, methods described in JP1986-158414A (JP1-S61-158414A), JP1989-122419A (JP-H01-122419A), and JP1999-198285A (JP-H11-198285A) can be used. In addition, it is also possible to cast a cycloolefin-based resin solution from two casting ports to form a film. With regard to the method, for example, methods described in JP1985-027562A (JP-S60-027562A), JP1986-094724A (JP-S61-094724A), JP1986-947245A (JP-S61-947245A), JP1986-104813A (JP-S61-104813A), JP1986-158413A (JP-S61-158413A), and JP1994-134933A (JP-H06-134933A) can be used. Furthermore, a casting method of a resin film described in JP1981-162617A (JP-S56-162617A), in which the flow of a high-viscosity resin solution is wrapped with a low-viscosity resin solution and the high-viscosity and low-viscosity resin solutions are extruded at the same time.

In addition, a film can be produced by, using two casting ports, peeling off a film formed on a support by a first casting port and performing second casting on a side which is in contact with the support surface. Examples thereof include a method described in JP1969-020235B (JP-S44-020235B).

As the solution to be cast, the same solution may be used or two or more different solutions may be used. It is sufficient that, in order to allow a plurality of layers to have a function, a solution corresponding to the function is extruded from each casting port. Furthermore, as the forming of a solution casting film, an aspect in which other functional layers (for example, an adhesive layer, a dye layer, an antistatic layer, an antihalation layer, an ultraviolet absorbing layer, a polarizing layer, and the like) are cast at the same time can be used.

The compound (colorant) represented by Formula (1) can be added to the above-described solution by, for example, mixing with the binder resin in the organic solvent in a case of preparing the dope.

(Drying Treatment)

Steps from casting of the dope to post-drying may be performed under an atmosphere of air or under an atmosphere of inert gas such as nitrogen. A winding machine used for producing the optical filter according to the embodiment of the present invention may be a commonly used winding machine, and the winding can be performed by a constant tension method, a constant torque method, a taper tension method, a program tension control method with a constant internal stress, and the like.

(Stretching Treatment)

The above-described optical filter can be also be subjected to a stretching treatment. It is possible to impart a desired retardation to the optical filter by the stretching treatment. As a stretching direction of the optical filter, any of a width direction or a longitudinal direction is preferable.

The stretching method in the width direction is described in, for example, JP1987-115035A (JP-S62-115035A), JP1992-152125A (JP-H04-152125A), JP1992-284211A (JP-H04-284211A), JP1992-298310A (JP-H04-298310A), JP1999-048271A (JP-H11-048271A), and the like.

The stretching of the film (optical filter before the stretching treatment) is performed under heating conditions. The film can be stretched during the treatment of drying, which is particularly effective in a case where the solvent remains. In a case of stretching in the longitudinal direction, for example, the film is stretched by adjusting a speed of a film transport roller so that a film winding speed is faster than a film peeling speed. In a case of stretching in the width direction, the film can be stretched by transporting the film while holding a width of the film by a tenter and gradually widening a width of the tenter. It is also possible to stretch the film using a stretching machine (preferably monoaxial stretching using a long stretching machine) after drying the film.

The method for forming the optical filter is not particularly limited, and the optical filter can be formed as described above. Furthermore, any of a heat melting molding method or a solution casting method can be used. The heat melting molding method can be classified in more detail into an extrusion molding method, a press molding method, an inflation molding method, an injection molding method, a blow molding method, a stretch molding method, and the like. Among these methods, in order to obtain a film having excellent mechanical strength, surface accuracy, and the like, an extrusion molding method, an inflation molding method, or a press molding method is preferable and an extrusion molding method is most preferable. The molding conditions are appropriately selected depending on the purpose of use and the molding method, and in a case of the heat melting molding method, the cylinder temperature is appropriately set in a range of usually 150° C. to 400° C., preferably 200° C. to 350° C., and more preferably 230° C. to 330° C. In a case where the polymer temperature is too low, the fluidity deteriorates, which may cause sink marks and distortion in the film, and in a case where the polymer temperature is too high, voids or silver streaks may be generated due to thermal decomposition of the polymer, or molding defects such as yellowing of the film may occur.

(Physical Properties or Characteristics of Optical Filter)

Preferred physical properties or characteristics of the optical filter according to the embodiment of the present invention will be described.

In consideration of handling in a case of laminating and improvement of productivity by shortening the drying time, the thickness of the optical filter is in a range of usually 5 to 300 μm, preferably 10 to 200 μm, and more preferably 20 to 100 μm.

The wetting tension of a surface of the optical filter is preferably 40 mN/m or more, more preferably 50 mN/m or more, and still more preferably 55 mN/m or more. In a case where the wetting tension of the surface is within the above-described range, the adhesive strength between the optical filter and the polarizer is improved. In order to adjust the wetting tension of the surface, a known surface treatment such as a corona discharge treatment, an ozone spraying, an ultraviolet irradiation, a flame treatment, and a chemical treatment can be performed.

The phase difference (retardation) of the optical filter according to the embodiment of the present invention will be described. The in-plane phase difference value Ro at 589 nm of the optical filter according to the embodiment of the present invention is preferably 0 to 20 nm and more preferably 0 to 10 nm. In addition, the phase difference value Rth in the thickness direction is preferably −20 to 50 nm and more preferably −10 to 20 nm.

Generally, the retardation can be controlled by a retardation of the film before stretching, a stretching ratio, a stretching temperature, and a thickness of a stretched alignment film. In a case where the film before stretching has a constant thickness, since the absolute value of retardation tends to increase as the stretching ratio increases, a stretched alignment film having a desired retardation can be obtained by changing the stretching ratio.

In a case where the optical filter is subjected to the stretching treatment, the thickness of the optical filter before stretching is preferably approximately 50 to 500 μm, and it is preferable that the uneven thickness is small, which is within ±8%, preferably within ±6%, and more preferably within ±4%.

The stretching ratio is preferably 1.1 to 10 times and more preferably 1.3 to 8 times, and it is sufficient to set a stretching ratio within the range to be a desired retardation.

In the obtained optical filter as described above, the molecules are aligned by stretching so that the optical filter can have a desired retardation value.

It is preferable that the variation of retardation is small, in which, in the optical filter according to the embodiment of the present invention, the variation of retardation at a wavelength of 589 nm in any retardation of the in-plane direction or the thickness direction is usually within ±50 nm, preferably ±30 nm or less, and more preferably ±20 nm or less.

The variations of retardation in the in-plane direction and the thickness direction or the uneven thickness of the optical filter can be reduced by using a film before stretching which has a smaller variation or uneven thickness, or by applying stress evenly to the film during stretching. For the purpose, it is desirable to stretch the film under an environment in which the temperature is controlled in a uniform temperature distribution, preferably within ±5° C., still more preferably within ±2° C., and particularly preferably within ±0.5° C.

[Image Display Device]

Examples of the image display device according to the embodiment of the present invention include a liquid crystal display device and an organic electroluminescence display device. The image display device according to the embodiment of the present invention will be described using a liquid crystal display device (also referred to as a "liquid crystal display device of the present invention") as a preferred aspect.

The liquid crystal display device of the present invention has a feature of including at least one optical filter according to the embodiment of the present invention. The optical filter according to the embodiment of the present invention may be used as a polarizing plate protective film and/or a pressure-sensitive adhesive layer as described later, or may be included in a backlight unit used in a liquid crystal display device.

It is preferable that the liquid crystal display device includes an optical filter, polarizing plates including a polarizer and a polarizing plate protective film, a pressure-sensitive adhesive layer, and a liquid crystal cell, and it is preferable that the polarizing plates are attached to the liquid crystal cell through the pressure-sensitive adhesive layer. In the liquid crystal display device, the optical filter may also serve as the polarizing plate protective film or the pressure-sensitive adhesive layer. That is, it is divided into a case where the liquid crystal display device includes polarizing plates including a polarizer and an optical filter (polarizing plate protective film), a pressure-sensitive adhesive layer, and a liquid crystal cell, and a case where the liquid crystal display device includes polarizing plates including a polarizer and a polarizing plate protective film, an optical filter (pressure-sensitive adhesive layer), and a liquid crystal cell.

FIG. 1 is a schematic view showing an embodiment of the liquid crystal display device of the present invention. In FIG. 1, a liquid crystal display device 10 consists of a liquid crystal cell having a liquid crystal layer 5 and a liquid crystal cell upper electrode substrate 3 and a liquid crystal cell lower electrode substrate 6 disposed above and below the liquid crystal layer 5, and an upper polarizing plate 1 and a lower polarizing plate 8 disposed on both sides of the liquid crystal cell. A color filter layer may be laminated on the upper electrode substrate 3 or the lower electrode substrate 6. On a rear surface of the liquid crystal display device 10, a backlight is disposed. The light source of the backlight is not particularly limited. For example, alight emitting device formed of a white LED can be used.

It is preferable that each of the upper polarizing plate 1 and the lower polarizing plate 8 has a configuration in which two polarizing plate protective films and a polarizer are laminated so as to sandwich the polarizer with the polarizing plate protective films, and in the liquid crystal display device 10 of the present invention, at least one polarizing plate is a polarizing plate including the optical filter according to the embodiment of the present invention.

In addition, in the liquid crystal display device 10 of the present invention, the liquid crystal cell and the polarizing plate (upper polarizing plate 1 and/or lower polarizing plate 8) may be bonded together through a pressure-sensitive adhesive layer (not shown). In this case, the optical filter according to the embodiment of the present invention may also serve as the above-mentioned pressure-sensitive adhesive layer.

The liquid crystal display device 10 includes an image direct vision-type liquid crystal display, an image projection-type liquid crystal display device, and a light modulation-type liquid crystal display device. An active matrix liquid crystal display device in which a three-terminal or two-terminal semiconductor element such as TFT or MIM is used is effective for the present invention. In addition, a passive matrix liquid crystal display device represented by an STN mode which is called as time division driving is also effective.

In a case where the optical filter according to the embodiment of the present invention is included in the backlight unit, the polarizing plate of the liquid crystal display device may be a normal polarizing plate (polarizing plate not including the optical filter according to the embodiment of the present invention), or may be a polarizing plate including the optical filter according to the embodiment of the present invention. In addition, the pressure-sensitive adhesive layer may be a normal pressure-sensitive adhesive layer (not the optical filter according to the embodiment of the present invention), or may be a pressure-sensitive adhesive layer formed of the optical filter according to the embodiment of the present invention.

An IPS mode liquid crystal display device described in paragraphs 0128 to 0136 of JP2010-102296A is preferable as the liquid crystal display device of the present invention.

<Polarizing Plate>

The polarizing plate used in the present invention includes a polarizer and at least one polarizing plate protective film.

The polarizing plate used in the present invention is preferably a polarizing plate having a polarizer and polarizing plate protective films on both surfaces of the polarizer, and it is preferable that at least one surface of the polarizer includes the optical filter according to the embodiment of the present invention as the polarizing plate protective film. The opposite surface of the polarizer to the surface having the optical filter according to the embodiment of the present invention (polarizing plate protective film) may have a normal polarizing plate protective film.

The film thickness of the polarizing plate protective film used in the present invention is 5 μm to 120 μm and more preferably 10 μm to 100 μm. A thinner film is preferable in that, in a case of being incorporated in the liquid crystal display device, display unevenness over time in high temperature and high humidity is less likely to occur. On the other hand, in a case where the film is too thin, it is difficult to transport the film stably in a case of producing the film and producing the polarizing plate. It is preferable that the thickness of the optical filter constituting the polarizing plate protective film satisfies the above-described range.

—Shape and Configuration—

The shape of the polarizing plate used in the present invention includes not only a polarizing plate of an aspect of a film piece cut into a size so as to be incorporated in the liquid crystal display device as it is, but also a polarizing plate of an aspect in which the polarizing plate is produced in a longitudinal shape by a continuous production and wound up in a rolled shape (for example, an aspect having a roll length of 2500 m or more or 3900 m or more). In order to use the polarizing plate as a large-sized screen liquid crystal display device, the width of the polarizing plate is preferably 1470 mm or more.

The polarizing plate used in the present invention is configured of a polarizer and at least one polarizing plate protective film, but it is also preferable that the polarizing plate is further configured by attaching a separate film on one surface of the polarizing plate.

The separate film is used for the purpose of protecting the polarizing plate during the shipping of the polarizing plate and the inspection of product. The separate film is used for the purpose of covering an adhesive layer which is attached to a liquid crystal plate, and used on a surface where the polarizing plate is attached to the liquid crystal plate.

(Polarizer)

The polarizer used for the polarizing plate used in the present invention will be described.

The polarizer which can be used for the polarizing plate used in the present invention is preferably configured of polyvinyl alcohol (PVA) and a dichroic molecule, but as described in JP1999-248937A (JP-H11-248937A), a polyvinylene-based polarizer in which a polyene structure is generated by dehydrating PVA or dechlorinating polyvinyl chloride and aligning the polyene structure can also be used.

—Film Thickness of Polarizer—

The film thickness of the polarizer before stretching is not particularly limited, but from the viewpoint of stability of retaining film and homogeneity of stretching, is preferably 1 μm to 1 mm and particularly preferably 5 to 200 μm. In addition, as described in JP2002-236212A, a thin PVA film in which the stress generated in a case of being stretched 4 to 6 times in water is 10 N or less may be used.

—Method of Producing Polarizer—

The method of producing a polarizer is not particularly limited, and for example, it is preferable that the polarizer is configured by form PVA into a film and introducing the dichroic molecule to the film. The PVA film can be produced by the method described in paragraphs "0213" to "0237" of JP2007-086748A and by the description of JP3342516B, JP1997-328593A (JP-H09-328593A), JP2001-302817A, JP2002-144401A, and the like.

(Method of Laminating Polarizer and Polarizing Plate Protective Film)

The polarizing plate used in the present invention is produced by adhering (laminating) at least one polarizing plate protective film (preferably the optical filter according to the embodiment of the present invention) on at least one surface of the above-described polarizer.

The polarizing plate used in the present invention is preferably produced by a method in which a polarizing plate protective film is subjected to an alkali treatment, and is attached, using a completely saponified polyvinyl alcohol aqueous solution, to both surfaces of a polarizer produced by dipping and stretching a polyvinyl alcohol film in an iodine solution.

Examples of an adhesive used to attach the treated surface of the polarizing plate protective film to the polarizer include polyvinyl alcohol-based adhesives such as polyvinyl alcohol and polyvinyl butyral and vinyl-based latex such as butyl acrylate.

In the polarizing plate used in the present invention, a method of attaching the polarizing plate protective film to the polarizer is preferably a method in which the polarizing plate protective film is attached to the polarizer so that a transmission axis of the polarizer and a slow axis of the polarizing plate protective film are substantially parallel, orthogonal, or 45°.

The slow axis can be measured by various known methods, for example, using a birefringence meter (KOBRADH, manufactured by Oji Scientific Instruments).

Here, "substantially parallel" refers to that the direction of the main refractive index nx of the polarizing plate protective film and the direction of the transmission axis of the polarizing plate intersect at an angle within ±5°, preferably at an angle within ±1°, and more preferably angle within ±0.5°. In a case where the intersecting angle is within ±1°, polarization performance under polarizing plate crossed nicols is less likely to be deteriorated and light leakage does not easily occur, which is preferable.

The description in which the direction of the main refractive index nx and the direction of the transmission axis are orthogonal or 45° means that the angle at which the direction of the main refractive index nx and the direction of the transmission axis intersect is within a range of ±5° with respect to an exact angle of being orthogonal and 45°, and the difference with respect to the exact angle is preferably within a range of ±1° and more preferably within a range of ±0.5°.

(Functionalization of Polarizing Plate)

The polarizing plate used in the present invention is preferably used as a functionalized polarizing plate complexed with an antireflection film for improving visibility of a display, a luminance improving film, or an optical film having a functional layer such as a hard coat layer, a forward scattering layer, an antiglare layer, an antifouling layer, and an antistatic layer. The antireflection film for functionalization, the luminance improving film, other functional optical films, the hard coat layer, the forward scattering layer, and the antiglare layer are described in paragraphs "0257" to "0276" of JP2007-086748A, and a functionalized polarizing plate can be produced based on the description.

(Pressure-Sensitive Adhesive Layer)

In the liquid crystal display device of the present invention, the polarizing plate is preferably attached to the liquid crystal cell through a pressure-sensitive adhesive layer. The optical filter according to the embodiment of the present invention may also serve as the pressure-sensitive adhesive layer. In a case where the optical filter according to the embodiment of the present invention does not serve as the pressure-sensitive adhesive layer, a normal pressure-sensitive adhesive layer can be used as the pressure-sensitive adhesive layer.

The pressure-sensitive adhesive layer is not particularly limited as long as the pressure-sensitive adhesive layer can attach the polarizing plate to the liquid crystal cell, and for example, an acrylic type, a urethane type, polyisobutylene, or the like is preferable.

In a case where the optical filter according to the embodiment of the present invention also serves as a pressure-sensitive adhesive layer, the pressure-sensitive adhesive layer includes the colorant and the binder, and further contains a cross-linking agent, a coupling agent, or the like to impart adhesiveness.

In a case where the optical filter also serves as a pressure-sensitive adhesive layer, the pressure-sensitive adhesive layer includes the binder in an amount of preferably 90% to 100% by mass and more preferably 95% to 100% by mass. The content of the colorant is as described above.

The thickness of the pressure-sensitive adhesive layer is not particularly limited, but is preferably 1 to 50 μm and more preferably 3 to 30 μm.

(Liquid Crystal Cell)

The liquid crystal cell is not particularly limited, and a normal liquid crystal cell can be used.

[Solid-State Imaging Element]

The solid-state imaging element according to the embodiment of the present invention includes the optical filter according to the embodiment of the present invention. The configuration of the solid-state imaging element according to the embodiment of the present invention is not particularly limited as long as the solid-state imaging element includes the optical filter according to the embodiment of the present invention and functions as a solid-state imaging element. Since the solid-state imaging element according to the embodiment of the present invention includes the optical filter (color filter) according to the embodiment of the present invention having excellent weather fastness and contrast, the solid-state imaging element according to the embodiment of the present invention is excellent in image tone and color reproducibility over a long period of use.

The configuration of the solid-state imaging element is not particularly limited as long as the solid-state imaging element includes the color filter of the present invention and functions as a solid-state imaging element. Examples thereof include a configuration in which, on a support, a solid-state imaging element (CCD image sensor, CMOS image sensor, or the like) has light-receiving elements which consist of a plurality of photodiodes and polysilicon or the like and constitute a light-receiving area of the solid-state imaging element, and the color filter of the present invention is provided on forming surface of the light-receiving elements in the support (for example, a portion other than a light receiving section, a pixel section for color adjustment, or the like) or on the opposite side of the forming surface.

EXAMPLES

Hereinafter, the present invention will be described in detail using examples. The materials, reagents, amounts and proportions of substances, operations, and the like described in the following examples can be appropriately modified as long as the gist of the present invention is maintained. Therefore, the scope of the present invention is not limited to the specific examples described below.

[Synthesis Example 1] Synthesis of Compound A-5

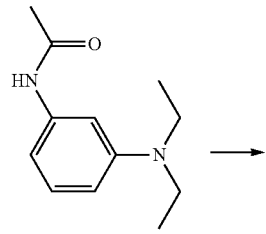

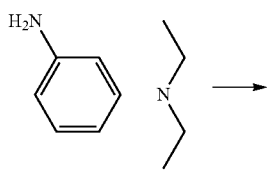

Intermediate 1

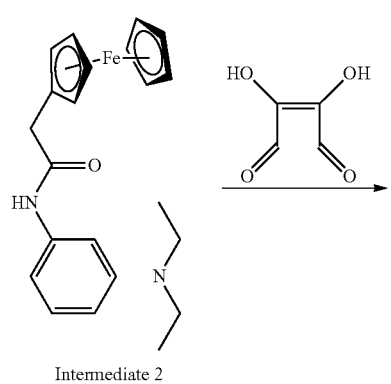

Intermediate 2

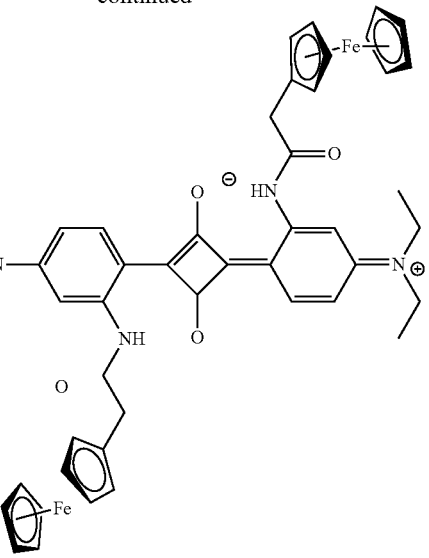

A-5

177 g of 35% hydrochloric acid was added dropwise to a mixed solution of 50 g of diethylaminoacetanilide and 265 g of isopropanol, and the solution was heated and stirred at an internal temperature of 60° C. for 24 hours. After completion of the reaction, the reaction solution was cooled to 0° C., the pH was raised to 9.5 using a 50% NaOH aqueous solution, and then 600 ml of ethyl acetate and 400 ml of water were added thereto to extract an organic layer. The organic layer was further washed with saturated saline, and the obtained organic layer was dried and concentrated over magnesium sulfate, and then purified by silica gel column chromatography (hexane/ethyl acetate=4/1) to obtain 35.1 g (88%) of an intermediate 1.

2.3 g of oxalyl chloride was added to a mixed solution of 4.5 g of ferroceneacetic acid and 33.2 g of methylene chloride, and the solution was heated and stirred at 30° C. for 1 hour to prepare a mixed solution A. Next, a mixed solution B was prepared by mixing 2.5 g of the intermediate 1, 2.3 g of triethylamine, and 8.9 g of methylene chloride, and then added dropwise to the mixed solution A cooled to 0° C., the mixture was stirred at room temperature for 2 hours. After completion of the reaction, 100 ml of chloroform and 100 ml of water were added thereto to separate an organic layer, and the organic layer was further washed with saturated saline. A crude crystal obtained by concentrating the organic layer was dissolved in 30 ml of chloroform, and reprecipitated in a mixed solution of 70 ml of hexane and 280 ml of ethyl acetate, the obtained crystal was filtered, and the filtered product was washed with hexane and ethyl acetate. In this way, 3.5 g (yield: 58%) of an intermediate 2 was obtained.

0.68 g of the intermediate 2, 0.1 g of squaric acid, 10 ml of toluene, and 10 ml of n-butanol were mixed, and the mixture was heated under reflux for 3 hours with a Dean-Stark tube. After completion of the reaction, the reaction solution was cooled to 0° C. the obtained crystal was filtered, and the filtered product was washed with methanol, 10 ml of methanol was added to the obtained crude crystal, and the mixture was further heated under reflux for 1 hour, the obtained crystal was filtered, and the filtered product was washed with methanol. In this way, 0.43 g (56%) of a target compound A-5 was obtained.

$^1$H-NMR (CDCl$_3$): δ 12.22 to 12.09 (m, 2H), 8.55 to 8.52 (m, 2H), 8.30 to 8.26 (m, 2H), 6.53 to 6.50 (m, 2H), 4.38 to 4.35 (m, 4H), 4.19 to 4.13 (m, 14H), 3.64 to 3.51 (m, 12H), 1.29 to 1.26 (m, 12H)

<Measurement of Maximum Absorption Wavelength>

The obtained compound A-5 was dissolved in chloroform (concentration: 1×10$^{-6}$ mol/L), and the maximum absorption wavelength λmax and molar absorption coefficient (ε) of the compound A-5 was measured using a cell having an optical path length of 10 mm and using a spectrophotometer UV-1800PC (manufactured by Shimadzu Corporation). The maximum absorption wavelength λmax of the compound A-5 was 679 nm, and the molar absorption coefficient (ε) was 355000. The results of the maximum absorption wavelength λmax and the molar absorption coefficient (ε) are also shown in Table 1.

[Synthesis Example 2] Synthesis of Compound A-38

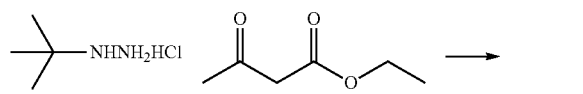

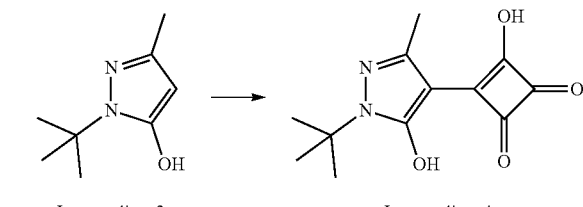

Intermediate 3   Intermediate 4

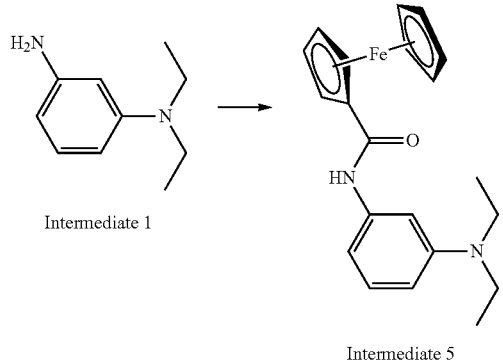

Intermediate 1   Intermediate 5

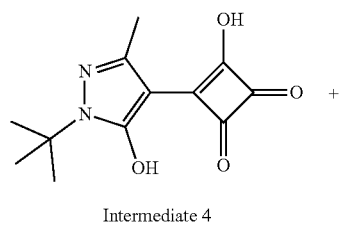

Intermediate 4

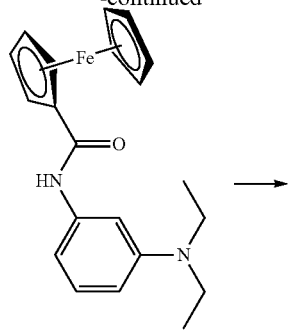

Intermediate 5

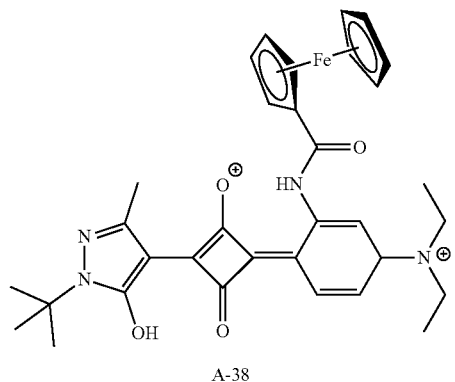

A-38

60 g of t-butylhydrazine hydrochloride was completely dissolved in 240 ml of methanol, 40 g of sodium acetate and 31.3 g of ethyl acetoacetate were added thereto, and the solution was stirred at room temperature for 1 hour. Thereafter, the solution was heated under reflux for 6 hours. After completion of the reaction, the reaction solution was cooled to room temperature, a precipitate was filtered, the obtained filtrate was concentrated such an extent in which the obtained filtrate was not completely dried, 80 ml of saturated saline was added thereto, and the mixture was extracted three times with 200 ml of chloroform. The obtained chloroform layer was concentrated and purified by silica gel column chromatography (hexane/ethyl acetate=2/1) to obtain 33.9 g (91%) of an intermediate 3.

7.7 g of the intermediate 3 and 7.3 g of dimethyl squarate were completely dissolved in 85 ml of methanol, 7.1 g of potassium carbonate was added thereto, and the mixture was stirred at room temperature for 5 hours. The obtained crystal was filtered, and the filtered product was washed with isopropanol and dried. Next, 2.1 g of potassium carbonate and 100 ml of water were added to the obtained crude crystal, and the mixture was heated and stirred at 50° C. for 5 hours. After completion of the reaction, the reaction solution was cooled to room temperature and reprecipitated in 140 ml of 1N hydrochloric acid. The obtained solid in this way was filtered, and the filtered product was washed with water and methanol. In this way, 10.6 g (85%) of a target intermediate 4 was obtained.

4.6 g of oxalyl chloride was added to a mixed solution of 8.4 g of ferrocencarboxylic acid and 70.9 g of methylene chloride, and the solution was heated and stirred at 30° C. for 1 hour to prepare a mixed solution A. Next, a mixed solution B was prepared by mixing 5.0 g of the intermediate 1, 4.6 g of triethylamine, and 17.8 g of methylene chloride, and then added dropwise to the mixed solution A cooled to 0° C., the mixture was stirred at room temperature for 2 hours.

After completion of the reaction, the obtained solid was filtered, and the filtered product was washed with methylene chloride. 100 ml of hexane was added to the obtained solid to wash at room temperature by suspension, the suspension was filtered, and the filtered product was washed with hexane. 100 ml of hexane was added to the obtained crude crystal to wash at room temperature by suspension, the suspension was filtered, and the filtered product was washed with hexane. Next, 100 ml of water was added to the obtained crude crystal to wash at room temperature by suspension, the suspension was filtered, and the filtered product was washed with water and hexane. In this way, 9.8 g (yield: 86%) of an intermediate 5 was obtained.

0.5 g of the intermediate 4, 0.75 g of the intermediate 5, 15 ml of toluene, and 15 ml of n-butanol were mixed, and the mixture was heated under reflux for 2 hours with a Dean-Stark tube. After completion of the reaction, the reaction solution was cooled to 0° C., the obtained crystal was filtered, and the filtered product was washed with methanol. The obtained crude crystal was further purified by silica gel column chromatography (hexane/ethyl acetate=2/1) and then dried. In this way, 0.95 g (78%) of a target compound A-38 was obtained.

$^1$H-NMR (CDCl$_3$): δ 11.41 to 10.84 (m, 1H), 8.58 to 8.22 (m, 2H), 6.51 to 6.48 (m, 1H), 5.28 to 5.20 (m, 2H), 4.49 (s, 2H), 4.25 (s, 5H), 3.58 to 3.53 (m, 4H), 2.57 to 2.53 (m, 3H), 1.63 to 1.61 (m, 9H), 1.33 to 1.29 (m, 6H)

<Measurement of Maximum Absorption Wavelength>

The obtained compound A-38 was dissolved in chloroform (concentration: 1×10$^{-6}$ mol/L), and the maximum absorption wavelength λmax and molar absorption coefficient (ε) of the compound A-38 was measured using a cell having an optical path length of 10 mm and using a spectrophotometer UV-1800PC (manufactured by Shimadzu Corporation). The maximum absorption wavelength λmax of the compound A-38 was 590 nm, and the molar absorption coefficient (ε) was 204000. The results of the maximum absorption wavelength λmax and the molar absorption coefficient (ε) are also shown in Table 1.

[Synthesis Example 3] Synthesis of Compound A-53

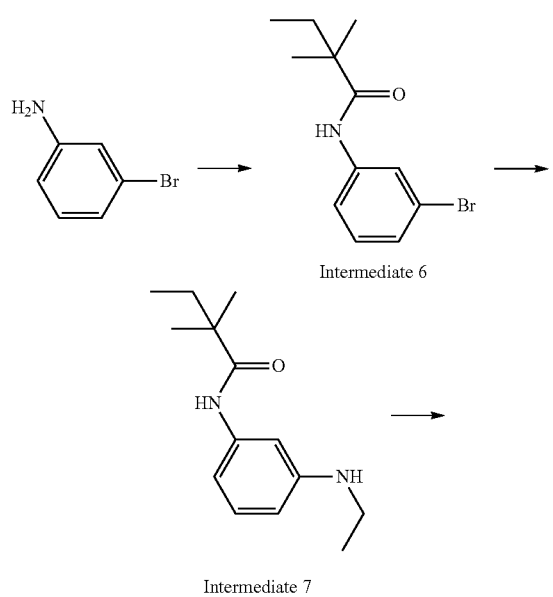

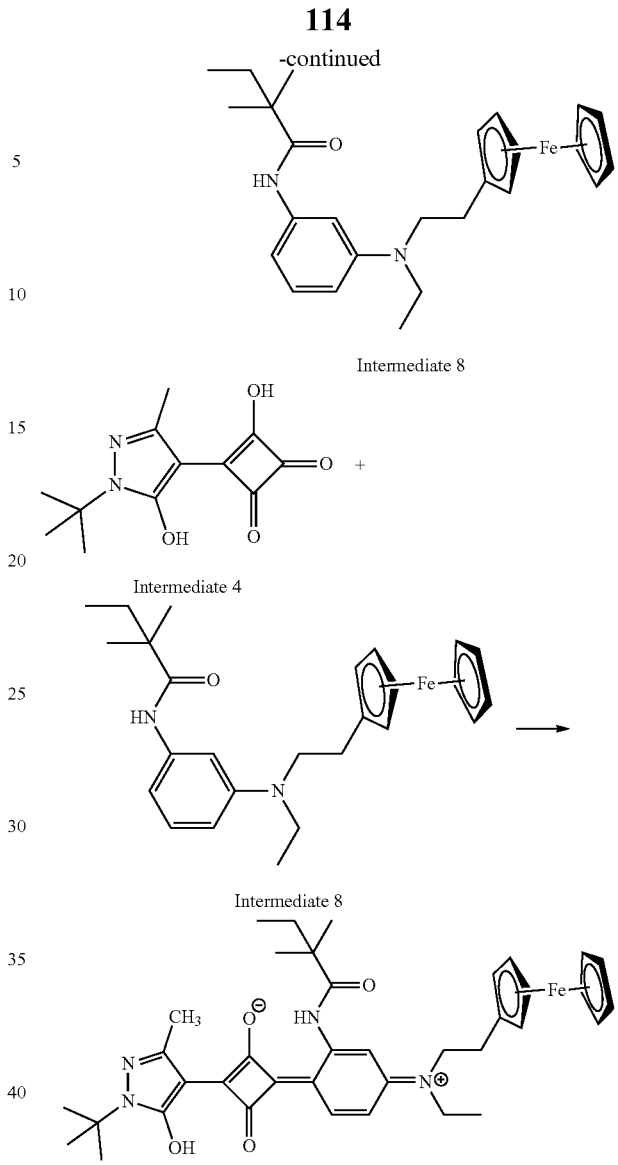

50.1 g of 3-bromoaniline, 335 g of tetrahydrofuran, and 44.2 g of triethylamine were mixed, the mixture was cooled to 5° C., and 47 g of 2,2-dimetylbutyryl chloride was slowly added dropwise thereto. After the dropwise addition, the temperature of the mixture was returned to room temperature, and the mixture was stirred for 2 hours. After completion of the reaction, 200 ml of methanol was added thereto, the solution was stirred for 1 hour, and then 950 ml of water was added thereto. The obtained solid was filtered, and the filtered product was washed with methanol and water, and dried. In this way, 73.4 g (yield: 93%) of an intermediate 6 was obtained.

3 g of the intermediate 6, 12.2 ml of ethylamine (2M, tetrahydrofuran solution), 30 ml of toluene, 0.16 g of Brettphos Pd G3, and 6.7 g of sodium tert-pentoxide were mixed, and the mixture was heated at 120° C. for 3 hours. After completion of the reaction, 20 ml of water and 30 ml of ethyl acetate were added thereto, and an organic layer was extracted. The organic layer was further washed with saturated saline, and the obtained organic layer was dried and concentrated over magnesium sulfate, and then purified by silica gel column chromatography (hexane/ethyl acetate=9/1) to obtain 1.9 g (50%) of an intermediate 7.

2.3 g of methanesulfonyl chloride was added to a mixed solution of 4.71 g of hydroxyethylferrocene, 8 ml of triethylamine, and 47 ml of ethyl acetate, and the solution was stirred at 0° C. for 30 minutes. After completion of the reaction, 15 ml of water was added thereto to extract an organic layer, the organic layer was washed with saturated saline, and the obtained organic layer was dried and concentrated over magnesium sulfate to obtain 3.1 g of ferroceneethyl methanesulfonate. Next, a mixed solution B was prepared by mixing 1.86 g of the intermediate 7, 3.3 g of potassium carbonate, 0.66 g of potassium iodide, and 28 ml of dehydrated N-methylpyrrolidone, 3.1 g of ferroceneethyl methanesulfonate was added to the mixed solution B, and the mixture was heated and stirred at 90° C. for 18 hours. After completion of the reaction, 60 ml of water, 100 ml of ethyl acetate, and 100 ml of hexane were added thereto, and an organic layer was extracted. The organic layer was washed twice with water and once with saturated saline, dried and concentrated over magnesium sulfate, and then the obtained organic layer was purified by silica gel column chromatography (hexane/ethyl acetate=9/1) to obtain 1.5 g (44%) of an intermediate 8.

0.4 g of the intermediate 4, 0.71 g of the intermediate 8, 12 ml of toluene, and 12 ml of n-butanol were mixed, and the mixture was heated under reflux for 2 hours with a Dean-Stark tube. After completion of the reaction, the reaction solution was cooled to 0° C., 10 ml of methanol was added thereto, and the solution was allowed to stand at 0° C. for 2 hours. The obtained crystal was filtered, and the filtered product was washed with methanol. In this way, 0.94 g (87%) of a target compound A-53 was obtained.

$^1$H-NMR (solvent: CDCl$_3$): δ 11.05 to 10.52 (m, 1H), 8.55 to 8.21 (m, 2H), 6.45 to 6.42 (m, 1H), 4.13 to 4.10 (m, 9H), 3.56 to 3.52 (m, 2H), 3.44 to 3.39 (m, 2H), 2.73 to 2.69 (m, 2H), 2.51 (s, 3H), 1.86 to 1.81 (m, 2H), 1.60 (s, 9H), 1.35 (s, 6H), 1.24 to 1.21 (m, 3H), 0.93 to 0.89 (m, 3H)

<Measurement of Maximum Absorption Wavelength>

The obtained compound A-53 was dissolved in chloroform (concentration: 1×10$^{-6}$, mol/L), and the maximum absorption wavelength λmax and molar absorption coefficient (ε) of the compound A-53 was measured using a cell having an optical path length of 10 mm and using a spectrophotometer UV-1800PC (manufactured by Shimadzu Corporation). The maximum absorption wavelength λmax of the compound A-53 was 590 nm, and the molar absorption coefficient (ε) was 208000. The results of the maximum absorption wavelength λmax and the molar absorption coefficient (ε) are also shown in Table 1.

[Synthesis Example 4] Synthesis of Compound A-75

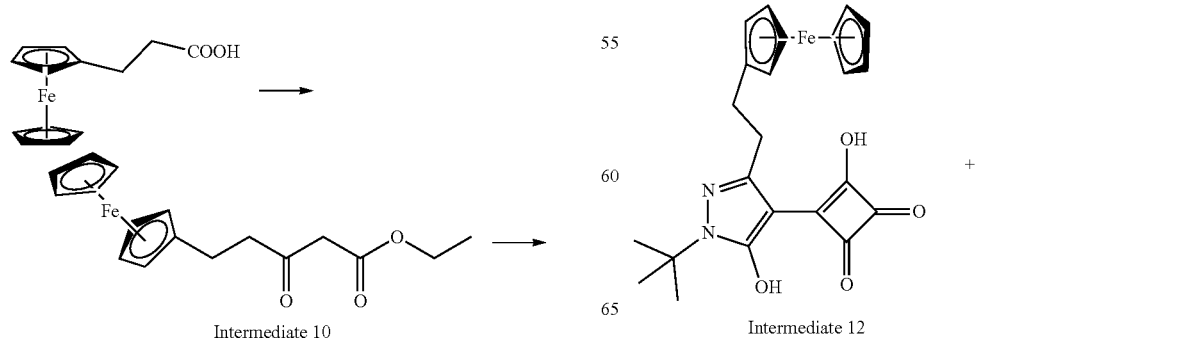

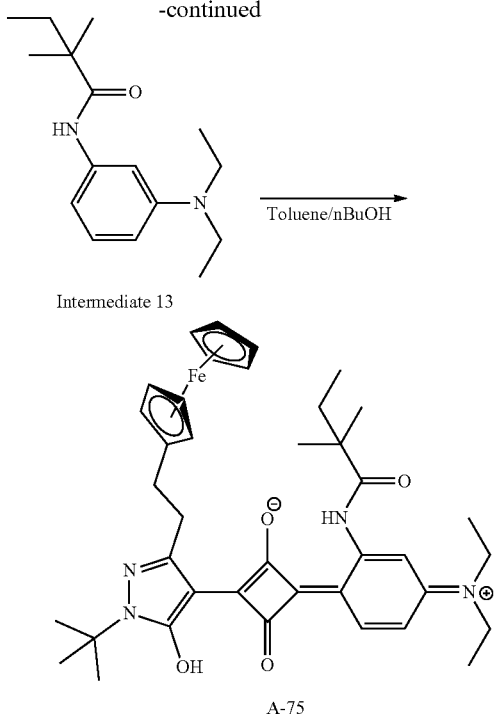

A mixed solution of 8.2 g of 1-(3-dimethylaminopropyl)-3-ethylcarbodiimide hydrochloride and 50 ml of acetonitrile was cooled to 0° C., 5.2 g of dimethylaminopyridine, 10 g of ferrocenepropionic acid (synthesized according to a method described in 4th Ed. Jikken Kagaku Koza (Courses in Experimental Chemistry), vol. 18, p. 235), and 6.1 g of Meldrum's acid were added thereto, the temperature of the solution was returned to room temperature, and the solution was stirred for 16 hours. After completion of the reaction, 150 ml of ethyl acetate and 100 ml of 1N hydrochloric acid were added thereto, and an organic layer was extracted. The organic layer was further washed with 1 N hydrochloric acid and saturated saline, and then dried and concentrated over magnesium sulfate. After completion of the concentration, 75 ml of ethanol was added thereto, and the solution was heated under reflux for 2 hours. After the reflux, ethanol was subsequently distilled off, and the residue was purified by silica gel column chromatography (hexane/ethyl acetate=4/1) to obtain 9.1 g (71%) of an intermediate 10.

6.8 g of t-butylhydrazine hydrochloride was completely dissolved in 45 ml of methanol, 4.5 g of sodium acetate and 9 g of the intermediate 10 were added thereto, and the solution was heated under reflux for 16 hours. After completion of the reaction, the reaction solution was cooled to room temperature, 25 ml of hexane and 25 ml of ethyl acetate were added thereto, 100 ml of water was subsequently added, and the mixture was stirred at room temperature for 2 hours. The obtained crystal was filtered, 45 ml of acetonitrile was further added to the filtered product, and the mixture was heated under reflux for 1 hour. After the reflux, the mixture was cooled to room temperature and filtered to obtain 6.3 g (65%) of an intermediate 11.

$^1$H-NMR (CDCl$_3$): δ 4.12 to 4.07 (m, 9H), 3.13 (s, 2H), 2.60 to 2.57 (m, 4H), 1.50 (s, 9H)

2 g of potassium carbonate was added to a mixed solution of 5 g of the intermediate 11, 2.1 g of dimethyl squarate, and 50 ml of methanol, and the mixture was stirred at 50° C. for 2 hours. After completion of the reaction, the reaction solution was cooled to 5° C., the obtained crystal was filtered, and the filtered product was washed with isopropanol and dried. Next, 1.2 g of potassium carbonate, 25 ml of water, and 25 ml of ethanol were added to the obtained crude crystal, and the mixture was heated and stirred at 50° C. for 10 hours. After completion of the reaction, only ethanol was distilled off, and the reaction solution was reprecipitated in 80 ml of 1N hydrochloric acid. The obtained solid in this way was filtered, and the filtered product was washed with water. In this way, 4.1 g (71%) of a target intermediate 12 was obtained.

$^1$H-NMR (CDCl$_3$): δ 4.59 to 4.17 (broad, 9H), 2.81 (broad, 2H), 2.33 (broad, 2H), 1.52 (s, 9H)

10 g of the intermediate 1 and 60 ml of dimethylacetamide were mixed, the mixture was cooled to 5° C., and 8.6 g of 2,2-dimethylbutyryl chloride was slowly added dropwise thereto. After the dropwise addition, the temperature of the mixture was returned to room temperature, and the mixture was stirred for 1 hour. After completion of the reaction, 180 ml of water was added thereto, 47 ml of 5% sodium hydroxide aqueous solution was subsequently added slowly, and the mixture was further stirred for 1 hour after dropwise addition. The obtained solid was filtered, and the filtered product was washed with 60 ml of a mixed solvent of methanol/water=1/1, and dried. In this way, 14.5 g (yield: 91%) of an intermediate 13 was obtained.

0.5 g of the intermediate 12, 0.29 g of the intermediate 13, 15 ml of toluene, and 15 ml of n-butanol were mixed, and the mixture was heated under reflux for 2 hours with a Dean-Stark tube. After completion of the reaction, the reaction solution was cooled to 0° C., 30 ml of methanol was added thereto, and the solution was allowed to stand at 0° C. for 24 hours. The obtained crystal was filtered, and the filtered product was washed with methanol. In this way, 0.31 g (40%) of a target compound A-75 was obtained.

$^1$H-NMR (solvent: CDCl$_3$): δ 11.13 to 10.54 (m, 1H), 8.58 to 8.23 (m, 2H), 6.48 to 6.45 (m, 1H), 4.23 to 4.04 (m, 9H), 3.56 to 3.51 (m, 4H), 3.09 to 3.06 (m, 2H), 2.71 to 2.68 (m, 2H), 1.89 to 1.86 (m, 2H), 1.60 (s, 9H), 1.36 to 1.28 (m, 12H), 0.93 to 0.89 (m, 3H)

<Measurement of Maximum Absorption Wavelength>

The obtained compound A-75 was dissolved in chloroform (concentration: $1 \times 10^{-6}$ mol/L), and the maximum absorption wavelength λmax and molar absorption coefficient (ε) of the compound A-75 was measured using a cell having an optical path length of 10 mm and using a spectrophotometer UV-1800PC (manufactured by Shimadzu Corporation). The maximum absorption wavelength λmax of the compound A-75 was 589 nm, and the molar absorption coefficient (ε) was 221000. The results of the maximum absorption wavelength λmax and the molar absorption coefficient (ε) are also shown in Table 1.

Each compound shown in the following tables was synthesized according to Synthesis Example, and the maximum absorption wavelength λmax and molar absorption coefficient (ε) thereof were measured in the same manner as described above. The number of each colorant compound corresponds to the number of the specific example of the colorant described above.

TABLE 1

Maximum absorption wavelength (λmax) and molar absorption coefficient (ε) of each compound

| Colorant compound | λmax (nm) | ε |
|---|---|---|
| A-1 | 647 | 368000 |
| A-3 | 681 | 297000 |
| A-5 | 679 | 355000 |
| A-6 | 510 | 105000 |
| A-7 | 679 | 372000 |
| A-9 | 632 | 291000 |
| A-11 | 507 | 103000 |
| A-13 | 661 | 285000 |
| A-15 | 538 | 178000 |
| A-19 | 645 | 371000 |
| A-21 | 601 | 249000 |
| A-24 | 604 | 269000 |
| A-26 | 586 | 178000 |
| A-27 | 590 | 261000 |
| A-28 | 591 | 258000 |
| A-31 | 523 | 136000 |
| A-32 | 540 | 145000 |
| A-34 | 568 | 158000 |
| A-35 | 575 | 128000 |
| A-37 | 671 | 111000 |
| A-38 | 590 | 204000 |
| A-39 | 589 | 258000 |
| A-43 | 590 | 189000 |
| A-44 | 594 | 207000 |
| A-45 | 594 | 282000 |
| A-46 | 588 | 241000 |
| A-47 | 589 | 245000 |
| A-48 | 590 | 245000 |
| A-49 | 590 | 227000 |
| A-51 | 589 | 244000 |
| A-53 | 590 | 208000 |
| A-54 | 595 | 231000 |
| A-55 | 590 | 238000 |
| A-56 | 595 | 192000 |
| A-59 | 592 | 218000 |
| A-63 | 587 | 252000 |
| A-64 | 587 | 235000 |
| A-65 | 589 | 237000 |
| A-68 | 591 | 245000 |
| A-66 | 589 | 168000 |
| A-73 | 590 | 222000 |
| A-74 | 589 | 222000 |
| A-75 | 589 | 221000 |
| A-77 | 590 | 191000 |
| A-79 | 592 | 254000 |
| A-80 | 591 | 235000 |
| A-81 | 593 | 252000 |
| A-83 | 589 | 171000 |
| A-89 | 588 | 213000 |
| A-90 | 588 | 225000 |
| A-91 | 590 | 214000 |
| A-92 | 591 | 252000 |
| A-93 | 590 | 236000 |
| A-94 | 589 | 256000 |
| A-96 | 587 | 225000 |
| A-97 | 587 | 226000 |
| A-98 | 587 | 225000 |
| A-101 | 591 | 195000 |
| A-103 | 585 | 192000 |
| A-106 | 591 | 243000 |
| A-113 | 590 | 226000 |
| A-114 | 589 | 247000 |
| A-115 | 590 | 260000 |
| A-117 | 502 | 112000 |

Example 1

<Material>

(Resin 1)

A commercially available polystyrene (manufactured by PS Japan Corporation, SGP-10, Tg: 100° C.) was heated at 110° C., returned to normal temperature (23° C.), and then used.

(Resin 2)

A commercially available Arton (manufactured by JSR Corporation, RX4500, Tg: 140° C., cyclic polyolefin) was heated at 110° C., returned to normal temperature, and then used.

(Base Material Film 1)

A commercially available polyethylene terephthalate film, LUMIRROR® S105 (film thickness: 38 μm, manufactured by Toray Industries, Inc.) was used as a base material 1.

<Preparation of Resin Solution>

The components shown below were mixed to prepare a resin solution S-1 (resin composition).

Composition of Resin Solution S-1

| | |
|---|---|
| Resin 1 | 100 parts by mass |
| Colorant compound A-1 described above | 0.063 parts by mass |
| Ethyl acetate (solvent) | 574 parts by mass |

Next, the obtained resin solution S-1 was filtered using a filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

(Production of Optical Filter)

The resin solution S-1 after the filtration treatment was applied onto the base material film 1 using a bar coater so that the film thickness after drying was 5.0 μm, and dried at 100° C., thereby producing an optical filter 101.

Examples 2 to 69 and Comparative Examples 1 to 3, 10, and 11

Each optical filter of Examples 2 to 69 and Comparative Examples 1 to 3, 10, and 11 was produced in the same manner as in Example 1, except that the resin and colorant used in Example 1 and the amount thereof were as shown in the tables below. The thickness of each optical filter was the same as in Example 1. Colorants used in Comparative Examples are shown below.

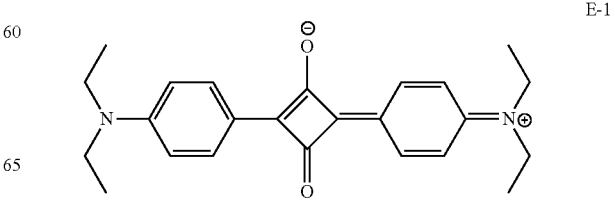

E-1

-continued

E-2

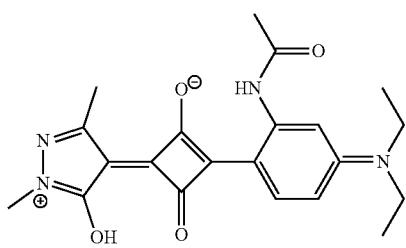

Compound No. 1 described in JP2006-312710A

E-3

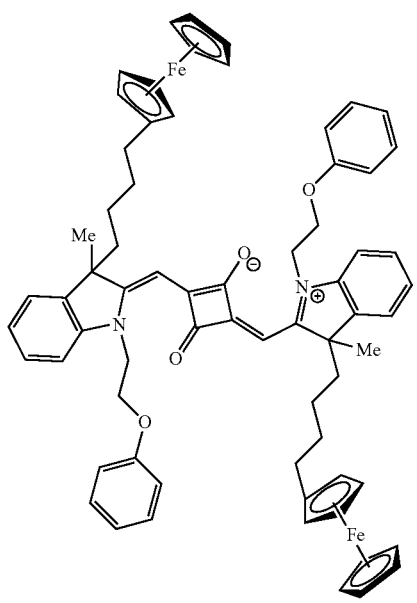

A-8

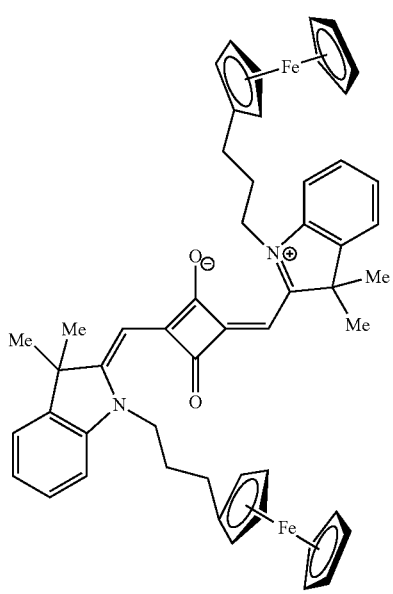

[Test Example 1] Evaluation of Light Resistance of Optical Filter

Light resistance of the optical filter was evaluated by absorbance change rate (%).

The optical filters of each of Examples and Comparative Examples were irradiated with light at 100,000 lux for 90 hours under an environment of 50° C. and a relative humidity of 50% using Super xenon weather meter SX75 manufactured by Suga Test Instruments Co., Ltd., the difference in absorbance at the absorption maximum wavelength was measured, and then the absorbance change rate was calculated by the following expression.

(Absorbance change rate) (%)=[(difference in absorbance after 90 hour irradiation)/(difference in absorbance before irradiation)]×100

The results are shown in the light resistance column of the tables below.

Here, the absorption maximum wavelength of an optical filter was determined as follows.

The absorbance of the optical filters of each of Examples and Comparative Examples in a wavelength range of 400 nm to 800 nm was measured every 1 nm using a UV3150 spectrophotometer manufactured by Shimadzu Corporation. The difference in absorbance between the absorbance at each wavelength of the optical filter and the absorbance of a filter not containing the colorant was calculated, and a wavelength at which the difference in absorbance was maximum was defined as the absorption maximum wavelength.

[Test Example 2] Fluorescence Emission Suppression Test Using Degree of Polarization as Index

[Production of Polarizing Plate]
<Surface Treatment of Optical Filter (Polarizing Plate Protective Film)>

Regarding the optical filters (with the base material film) produced in each of Examples and Comparative Examples, a surface opposite to the base material film was subjected to a corona treatment, thereby producing an optical filter with a surface treatment.

<Production of Polarizer (Polarizing Layer)>

According to Example 1 of JP2001-141926A, a circumferential speed difference was imparted between two pairs of nip rollers to stretch a film in the longitudinal direction, thereby producing a polarizing layer including a 12 μm-thick polyvinyl alcohol resin.

<Production of Front-Side Polarizing Plate Protective Film (Outer Polarizing Plate Protective Film)>
(Preparation of Acrylic Resin)

8000 g of methyl methacrylate (MMA), 2000 g of methyl 2-(hydroxymethyl)acrylate (MHMA), and 10000 g of toluene as a polymerization solvent were charged in a reactor having an inner volume of 30 L which was equipped with a stirrer, a temperature sensor, a cooling pipe, and a nitrogen introduction pipe, and heated up to 107° C. while passing nitrogen through the solution. In a case of beginning a reflux caused by the heating, 10 g of t-amyl peroxyisononanoate was added thereto as a polymerization initiator, solution polymerization was progressed under reflux at approximately 105° C. to 110° C. while adding a solution consisting of 20 g of t-amyl peroxyisononanoate and 100 g of toluene dropwise for 2 hours, and aging was further performed for 4 hours. The polymerization reaction rate was 95%, and the content rate (weight ratio) of MHMA in the obtained polymer was 20%.

Next, 10 g of a stearyl phosphate/distearyl phosphate mixture (manufactured by Sakai Chemical Industry Co., Ltd., Phoslex A-18) was added to the obtained polymerization solution as a cyclization catalyst, and a cyclization condensation reaction was progressed under reflux at approximately 80° C. to 100° C. for 5.5 hours.

Next, the obtained polymerization solution was introduced into a vent-type screw twin-screw extruder ($\phi$=29.75 mm, L/D=30) having a barrel temperature of 260° C., a rotation speed of 100 rpm, a degree of pressure reduction of 13 to 400 hPa (10 to 300 mmHg), and one rear vent and four fore-vents at a treatment rate of 2.0 kg/hour in terms of resin amount, and a cyclization condensation reaction and devolatilization were performed in the extruder. Next, after completion of the devolatilization, the resin in a hot-melt state remaining in the extruder was discharged from a front end of the extruder and pelletized using a pelletizer, thereby obtaining a (meth)acrylic resin A. The (meth)acrylic resin A had a lactone ring structure. The weight-average molecular weight of the resin was 110000, and the glass transition temperature was 125° C.

(Production of Outer Polarizing Plate Protective Film)

100 parts by mass of the (meth)acrylic resin A and 10 parts by mass of a rubber elastic body C-1 were supplied to a twin-screw extruder, melted and extruded in a sheet shape at approximately 280° C., thereby producing a 40 µm-thick long outer polarizing plate protective film. As the rubber elastic body C-1, KANE ACE M-210 (manufactured by Kaneka) was used.

(Attachment)

The polarizing layer and the optical filter with a surface treatment were laminated together using a 3% by mass aqueous solution of polyvinyl alcohol (manufactured by Kuraray Co., Ltd., PVA-117H) in a roll-to-roll manner so that the corona-treated surface of the optical filter was located on the polarizing layer side and the absorption axis of the polarizing layer and the longitudinal direction of the optical filter was parallel to each other.

Next, an adhesive M having the following composition was applied to the outer polarizing plate protective film using a microgravure coater (gravure roll: #300, rotation speed: 140%/line speed) so that the thickness was 5 µm, thereby producing an adhesive-attached front polarizing plate protective film. Next, the adhesive-attached front polarizing plate protective film and the polarizing layer were attached together such that a surface of the adhesive-attached front polarizing plate protective film to which the adhesive was attached and a surface of the polarizing layer to which the optical filter was not attached were attached together, and irradiated with ultraviolet rays from the optical filter side, thereby producing a polarizing plate. The line speed was set to 20 m/min, and the accumulated light amount of ultraviolet rays was set to 300 mJ/cm². Here, the polarizer and the outer polarizing plate protective film were disposed such that the transmission axis of the polarizer and the transportation direction of the outer polarizing plate protective film were orthogonal to each other.

—Composition of Adhesive M—
  100 parts by mass of 2-hydroxyethyl acrylate
  10 parts by mass of tolylene diisocyanate
  3 parts by mass of photopolymerization initiator (Irgacure 907, manufactured by BASF)

Next, the polarizing plate was dried at 70° C., the base material film of the optical filter was continuously peeled off using the same device as a separator-peeling device having a peeling roller, and a commercially available acrylate-based pressure-sensitive adhesive was applied to the peeled surface, thereby producing a polarizing plate (pressure-sensitive adhesive/optical filter/polarizing layer/outer polarizing plate protective film).

The degree of polarization of the obtained polarizing plate (5 cm×5 cm) was measured. The polarizing plate was attached onto a glass through a pressure-sensitive adhesive so that the optical filter was on the glass side. The sample was set in an automatic polarizing film measurement instrument VAP-7070 manufactured by JASCO Corporation such that the glass side of the sample faced a light source, and the orthogonal transmittance and the parallel transmittance in a wavelength range of 380 nm to 700 nm were measured. A polarization degree spectrum was calculated from the measurement values of the orthogonal transmittance and the parallel transmittance using the following expression, and the weighted average of the light source (auxiliary illuminant C) and the CIE luminosity factor (Y) was computed, thereby calculating the degree of polarization.

Degree of polarization (%)=[(parallel transmittance−orthogonal transmittance)/(parallel transmittance+orthogonal transmittance)]$^{1/2}$×100

The results are shown in the tables below.

TABLE 2-1

| | Resin | Colorant compound Type | Addition amount*[1] | Light resistance (%) | Degree of polarization |
|---|---|---|---|---|---|
| Example 1 | Resin 1 | A-1 | 0.063 | 90 | 99.99 |
| Example 2 | Resin 1 | A-3 | 0.042 | 94 | 99.99 |
| Example 3 | Resin 1 | A-5 | 0.043 | 81 | 99.99 |
| Example 4 | Resin 1 | A-5 | 0.172 | 80 | 99.99 |
| Example 5 | Resin 1 | A-5 | 0.343 | 80 | 99.99 |
| Example 6 | Resin 1 | A-7 | 0.889 | 87 | 99.99 |
| Example 7 | Resin 1 | A-9 | 0.068 | 80 | 99.98 |
| Example 8 | Resin 1 | A-15 | 0.108 | 84 | 99.99 |
| Example 9 | Resin 1 | A-19 | 0.167 | 88 | 99.99 |
| Example 10 | Resin 1 | A-21 | 0.031 | 77 | 99.97 |
| Example 11 | Resin 1 | A-24 | 0.055 | 80 | 99.99 |
| Example 12 | Resin 1 | A-26 | 0.053 | 83 | 99.99 |
| Example 13 | Resin 1 | A-27 | 0.632 | 81 | 99.99 |
| Example 14 | Resin 1 | A-28 | 0.428 | 82 | 99.99 |
| Example 15 | Resin 1 | A-31 | 0.038 | 92 | 99.99 |
| Example 16 | Resin 1 | A-37 | 0.031 | 80 | 99.99 |
| Example 17 | Resin 1 | A-38 | 0.243 | 95 | 99 99 |
| Example 18 | Resin 1 | A-39 | 0.125 | 84 | 99.99 |
| Example 19 | Resin 1 | A-39 | 0.554 | 82 | 99.99 |
| Example 20 | Resin 1 | A-43 | 0.141 | 80 | 99.98 |
| Example 21 | Resin 1 | A-44 | 0.592 | 82 | 99.99 |
| Example 22 | Resin 1 | A-45 | 0.063 | 86 | 99.99 |
| Example 23 | Resin 1 | A-46 | 0.567 | 83 | 99.99 |
| Example 24 | Resin 1 | A-48 | 0.046 | 81 | 99.99 |
| Example 25 | Resin 1 | A-48 | 0.092 | 81 | 99.99 |
| Example 26 | Resin 1 | A-48 | 0.818 | 80 | 99.99 |
| Example 27 | Resin 1 | A-49 | 0.793 | 83 | 99.99 |
| Example 28 | Resin 1 | A-51 | 0.616 | 83 | 99.99 |
| Example 29 | Resin 1 | A-53 | 0.604 | 85 | 99.99 |
| Example 30 | Resin 1 | A-55 | 0.255 | 82 | 99.99 |
| Example 31 | Resin 1 | A-55 | 0.567 | 82 | 99.99 |
| Example 32 | Resin 1 | A-56 | 0.065 | 93 | 99.99 |
| Example 33 | Resin 1 | A-59 | 0.065 | 92 | 99.99 |
| Example 34 | Resin 1 | A-63 | 0.260 | 92 | 99.99 |
| Example 35 | Resin 1 | A-64 | 0.155 | 94 | 99.99 |
| Example 36 | Resin 1 | A-65 | 0.663 | 83 | 99.99 |
| Example 37 | Resin 1 | A-68 | 0.579 | 83 | 99.99 |
| Example 38 | Resin 2 | A-5 | 0.043 | 83 | 99 99 |
| Example 39 | Resin 2 | A-5 | 0.172 | 83 | 99.99 |
| Example 40 | Resin 2 | A-39 | 0.125 | 86 | 99.99 |
| Example 41 | Resin 2 | A-39 | 0.554 | 85 | 99.99 |

TABLE 2-1-continued

| | Resin | Colorant compound Type | Addition amount*[1] | Light resistance (%) | Degree of polarization |
|---|---|---|---|---|---|
| Comparative Example 1 | Resin 1 | E-1 | 0.018 | 20 | 98.4 |
| Comparative Example 2 | Resin 1 | E-2 | 0.079 | 70 | 99.75 |
| Comparative Example 3 | Resin 1 | E-2 | 0.353 | 53 | 99.77 |
| Comparative Example 10 | Resin 1 | E-3 | 0.218 | 35 | 99.95 |
| Comparative Example 11 | Resin 1 | A-8 | 0.170 | 30 | 99.97 |

*[1]addition amount (parts by mass) with respect to 100 parts by mass of resin

TABLE 2-2

| | Resin | Colorant compound Type | Addition amount*[1] | Light resistance (%) | Degree of polarization |
|---|---|---|---|---|---|
| Example 42 | Resin 1 | A-73 | 0.032 | 92 | 99.99 |
| Example 43 | Resin 1 | A-74 | 0.068 | 95 | 99.99 |
| Example 44 | Resin 1 | A-74 | 0.604 | 94 | 99.99 |
| Example 45 | Resin 1 | A-75 | 0.139 | 95 | 99.99 |
| Example 46 | Resin 1 | A-75 | 0.616 | 94 | 99.99 |
| Example 47 | Resin 1 | A-77 | 0.659 | 93 | 99.99 |
| Example 48 | Resin 1 | A-79 | 0.041 | 96 | 99.99 |
| Example 49 | Resin 1 | A-80 | 0.334 | 96 | 99.99 |
| Example 50 | Resin 1 | A-83 | 0.133 | 93 | 99.99 |
| Example 51 | Resin 1 | A-89 | 0.713 | 96 | 99.99 |
| Example 52 | Resin 1 | A-90 | 0.244 | 94 | 99.99 |
| Example 53 | Resin 1 | A-91 | 0.431 | 94 | 99.99 |
| Example 54 | Resin 1 | A-93 | 0.048 | 96 | 99.99 |
| Example 55 | Resin 1 | A-93 | 0.383 | 96 | 99.99 |
| Example 56 | Resin 1 | A-94 | 0.484 | 89 | 99.99 |
| Example 57 | Resin 1 | A-94 | 1.090 | 89 | 99.99 |
| Example 58 | Resin 1 | A-98 | 0.399 | 85 | 99.99 |
| Example 59 | Resin 1 | A-101 | 0.073 | 88 | 99.99 |
| Example 60 | Resin 1 | A-103 | 0.143 | 92 | 99.99 |
| Example 61 | Resin 1 | A-106 | 0.332 | 91 | 99.99 |
| Example 62 | Resin 1 | A-113 | 0.607 | 90 | 99.99 |
| Example 63 | Resin 1 | A-114 | 0.086 | 82 | 99.99 |
| Example 64 | Resin 1 | A-115 | 0.148 | 83 | 99.99 |
| Example 65 | Resin 1 | A-117 | 0.391 | 90 | 99.99 |
| Example 66 | Resin 2 | A-73 | 0.064 | 93 | 99.99 |
| Example 67 | Resin 2 | A-73 | 0.127 | 92 | 99.99 |
| Example 68 | Resin 2 | A-117 | 0.078 | 95 | 99.99 |
| Example 69 | Resin 2 | A-117 | 0.235 | 96 | 99.99 |

*[1]addition amount (parts by mass) with respect to 100 parts by mass of resin

The colorant compounds E-1 and E-2 used in Comparative Examples 1 and 2 were compounds having a structure corresponding to Dye of the compounds used in Examples 1 to 69. It was found that the optical filters of Comparative Examples 1 and 2 reduced the degree of polarization of the polarizing plate. This is because E-1 and E-2 emit fluorescence due to absorption of light and depolarization occurs. In addition, the compounds E-1 and E-2 were also inferior in light resistance.

In addition, from the results of Comparative Examples 10 and 11, it was found that an optical filter formed of the colorant compound E-3 or A-8 which did not have an intramolecular hydrogen bond was inferior in light resistance, and also slightly inferior in fluorescence emission suppression.

On the other hand, the optical filters of Examples 1 to 69, which were formed of the colorant compound defined by the present invention, were capable of realizing an excellent degree of polarization and had excellent light resistance.

[Test Example 3] Evaluation of 10% Value Width of Optical Filter

The absorbance of an optical filter in a wavelength range of 400 nm to 800 nm was measured every 1 nm using a spectrophotometer (UV3150 manufactured by Shimadzu Corporation). In this case, the absorbance of a filter with a composition excluding the colorant compound from the optical filter used for measurement in a wavelength range of 400 nm to 800 nm was measured every 1 nm in the same manner (this measurement value was referred to as Ref value). The difference in absorbance at each wavelength was calculated by subtracting Ref value at the each wavelength from the absorbance at the corresponding wavelength of the optical filter. The maximum value of the difference in absorbance was set to 100%, the difference between two wavelengths (nm) which have a difference in absorbance of 10% with respect to the maximum value was converted into a wave number ($cm^{-1}$) and read, and the width of the wave number ($cm^{-1}$) was defined as a 10% value width.

The results are shown in the tables below.

TABLE 3-1

| | Resin | Colorant compound Type | Addition amount*[1] | 10% value width ($cm^{-1}$) |
|---|---|---|---|---|
| Example 3 | Resin 1 | A-5 | 0.043 | 1480 |
| Example 4 | Resin 1 | A-5 | 0.172 | 1500 |
| Example 5 | Resin 1 | A-5 | 0.343 | 1505 |
| Example 18 | Resin 1 | A-39 | 0.125 | 2250 |
| Example 19 | Resin 1 | A-39 | 0.554 | 2260 |
| Example 24 | Resin 1 | A-48 | 0.046 | 2155 |
| Example 25 | Resin 1 | A-48 | 0.092 | 2150 |
| Example 26 | Resin 1 | A-48 | 0.818 | 2160 |
| Example 30 | Resin 1 | A-55 | 0.255 | 2190 |
| Example 31 | Resin 1 | A-55 | 0.567 | 2190 |
| Example 38 | Resin 2 | A-5 | 0.043 | 1410 |
| Example 39 | Resin 2 | A-5 | 0.172 | 1450 |
| Example 40 | Resin 2 | A-39 | 0.125 | 2160 |
| Example 41 | Resin 2 | A-39 | 0.554 | 2170 |
| Comparative Example 2 | Resin 1 | E-2 | 0.079 | 2100 |
| Comparative Example 3 | Resin 1 | E-2 | 0.353 | 2450 |

*[1]addition amount (parts by mass) with respect to 100 parts by mass of resin

TABLE 3-2

| | Resin | Colorant compound Type | Addition amount*[1] | 10% value width ($cm^{-1}$) |
|---|---|---|---|---|
| Example 45 | Resin 1 | A-75 | 0.139 | 2100 |
| Example 46 | Resin 1 | A-75 | 0.616 | 2120 |
| Example 54 | Resin 1 | A-93 | 0.048 | 2040 |
| Example 55 | Resin 1 | A-93 | 0.383 | 2050 |

*[1]addition amount (parts by mass) with respect to 100 parts by mass of resin

In the optical filter formed of the colorant compound E-2, the 10% value width greatly spread in a case where the concentration of the colorant compound was increased. On the other hand, in the optical filter according to the embodiment of the present invention, the 10% value width did not significantly change even in a case where the concentration of the colorant compound was increased. That is, it was found that the optical filter according to the embodiment of the present invention maintained a sharp absorption spectrum even in a case where the colorant compound was contained in a high concentration.

Next, the 10% value width, light resistance, and degree of polarization were measured in the same manner as in Test Examples 1 to 3 in a case where the compound (squarylium colorant) corresponding to Dye of the compound represented by Formula (1) defined by the present invention and the compound (metallocene compound) corresponding to $Q^1$ of the compound represented by Formula (1) defined by the present invention were blended in an optical filter as separate compounds without bonding the compounds.

The results are shown in the table below.

TABLE 4

| | Resin | Colorant compound Type | Addition amount*[1] | Molar amount (mmol) | Metallocene compound Type | Addition amount*[1] | Molar amount (mmol) | 10% value width ($cm^{-1}$) | Light resistance (%) | Degree of polarization |
|---|---|---|---|---|---|---|---|---|---|---|
| Example 19 | Resin 1 | A-39 | 0.554 | 0.89 | — | — | — | 2260 | 82 | 99.99 |
| Comparative Example 3 | Resin 1 | E-2 | 0.353 | 0.89 | — | — | — | 2450 | 53 | 99.77 |
| Comparative Example 4 | Resin 1 | E-2 | 0.353 | 0.89 | Ferrocene | 0.17 | 0.89 | 2450 | 45 | 99.80 |
| Comparative Example 5 | Resin 1 | E-2 | 0.353 | 0.89 | Ferrocene | 0.84 | 4.5 | 2450 | 42 | 99.82 |

*[1]addition amount (parts by mass) with respect to 100 parts by mass of resin

In Comparative Examples 4 and 5 in which the compound (squarylium colorant) corresponding to Dye and the compound (metallocene compound) corresponding to $Q^1$ were blended in an optical filter as separate compounds without bonding the compounds, the degree of polarization was improved as compared with Comparative Example 3 in which the metallocene compound (ferrocene) was not blended. However, even in a case where a large amount of the metallocene compound was blended, the improvement of the degree of polarization had a limit (Comparative Example 5), and light resistance was also deteriorated (Comparative Examples 4 and 5).

From the results of each of Examples and Comparative Examples, it is found that, by using a resin composition formed of the compound represented by Formula (1) in the present invention and the resin, it is possible to obtain an optical filter in which fluorescence emission accompanying the absorption of light of the squarylium colorant structural part can be suppressed, photooxidative decomposition can be also suppressed, and furthermore, a sharp absorption spectrum can be maintained and light at a specific wavelength can be specifically absorbed and blocked even in a case where the light absorbing component (compound represented by Formula (1)) is blended in a high concentration.

The present invention has been described with the embodiments thereof, any details of the description of the present invention are not limited unless described otherwise, and it is obvious that the present invention is widely construed without departing from the gist and scope of the present invention described in the accompanying claims.

Priority is claimed on JP2018-035023 filed in Japan on Feb. 28, 2018, JP2018-104901 filed in Japan on May 31, 2018, and JP2018-186845 filed in Japan on Oct. 1, 2018, the contents of which are incorporated herein by reference.

EXPLANATION OF REFERENCES

1: upper polarizing plate
2: direction of absorption axis of upper polarizing plate
3: liquid crystal cell upper electrode substrate
4: alignment control direction of upper substrate
5: liquid crystal layer
6: liquid crystal cell lower electrode substrate
7: alignment control direction of lower substrate
8: lower polarizing plate
9: direction of absorption axis of lower polarizing plate
B: backlight unit
10: liquid crystal display device

What is claimed is:

1. A resin composition comprising:
a compound represented by Formula (1); and
a resin, $$\text{Dye} - (Q^1)_{n1} \quad \text{Formula (1)}$$

in Formula (1), Dye represents a colorant structural part obtained by removing n1 hydrogen atoms from a compound represented by Formula (2), Formula (2)

$$A - \underset{\underset{O^-}{|}}{\overset{\overset{O^-}{|}}{\diamond^{2+}}} - B$$

in Formula (2), A and B represent an aryl group, a heterocyclic group, or —CH=G, in which G represents a heterocyclic group, and at least A has a hydrogen-bonding group forming an intramolecular hydrogen bond, $Q^1$ represents a group represented by Formula (2M),

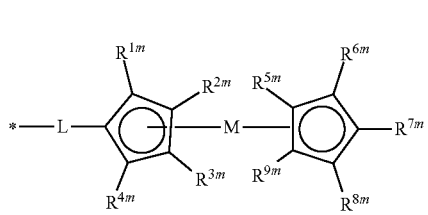

Formula (2M)

here, L represents a single bond or a divalent linking group which is not conjugated with Dye, $R^{1m}$ to $R^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part with Dye, and n1 represents an integer of 1 to 6.

2. The resin composition according to claim 1, wherein A in Formula (2) is a heterocyclic group.

3. The resin composition according to claim 1, wherein Dye represents a colorant structural part obtained by removing n1 hydrogen atoms from a compound represented by Formula (5-1) or (5-2),

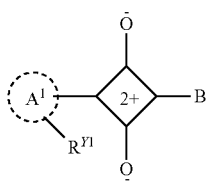

Formula (5-1)

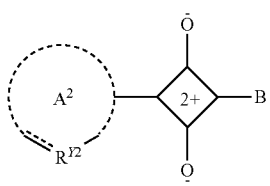

Formula (5-2)

here, A1 represents an aryl group or a heterocyclic group and A2 represents a heterocyclic group, $R^{Y1}$ represents a monovalent hydrogen-bonding group and $R^{Y2}$ represents a divalent or trivalent hydrogen-bonding group, and B has the same meaning as B in Formula (2).

4. The resin composition according to claim 1, wherein M in Formula (2M) is Fe.

5. The resin composition according to claim 1, wherein the resin is at least one kind selected from a polystyrene resin, a cellulose acylate resin, an acrylic resin, or a cycloolefin resin.

6. An optical filter comprising:
the resin composition according to claim 1.

7. The optical filter according to claim 6, wherein the optical filter has a film form.

8. An image display device comprising:
the optical filter according to claim 6.

9. A solid-state imaging element comprising:
the optical filter according to claim 6.

10. A compound represented by Formula (1A),

Formula (1A)

in Formula (1A), $Dye^1$ represents a colorant structural part obtained by removing n1 hydrogen atoms from a compound represented by Formula (2A), Formula (2A)

in Formula (2A), A represents a heterocyclic group, B represents an aryl group, a heterocyclic group, or —CH=G, in which G represents a heterocyclic group, and at least A has a hydrogen-bonding group forming an intramolecular hydrogen bond, $Q^1$ represents a group represented by Formula (2MA),

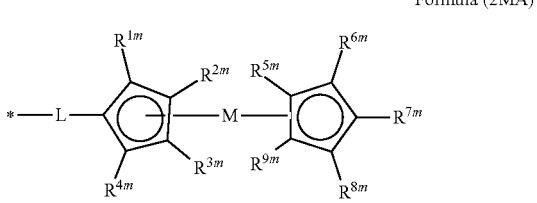

Formula (2MA)

here, L represents a single bond or a divalent linking group which is not conjugated with $Dye^1$, $R^{1m}$ to $R^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part with $Dye^1$, and n1 represents an integer of 1 to 6.

11. The compound according to claim 10, wherein L in Formula (2MA) is a single bond, a group selected from the group consisting of an alkylene group having 1 to 8 carbon atoms, an arylene group having 6 to 12 carbon atoms, —CH=CH—, —CO—, —NR—, —O—, —S—, —SO$_2$—, and —N=CH—, or a group of a combination of two or more groups selected from the group consisting thereof, in which R represents a hydrogen atom or a monovalent substituent, $R^{1m}$ to $R^{9m}$ are a hydrogen atom, a halogen atom, an alkyl group, an acyl group, or an alkoxy group, and M is Fe.

12. The compound according to claim 10, wherein $Dye^1$ represents a colorant structural part obtained by removing n1 hydrogen atoms from a compound represented by Formula (5-1A) or (5-2A),

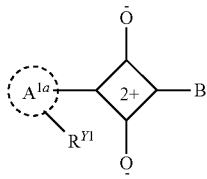

Formula (5-1A)

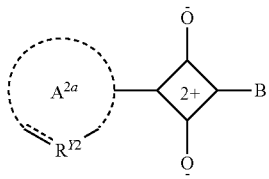

Formula (5-2A)

here, $A1^a$ and $A2^a$ represent a heterocyclic group,
$R^{Y1}$ represents a monovalent hydrogen-bonding group and $R^{Y2}$ represents a divalent or trivalent hydrogen-bonding group, and
B has the same meaning as B in Formula (2A).

13. The compound according to claim 10,
wherein $Dye^1$ represents a colorant structural part obtained by removing n1 hydrogen atoms from a compound represented by Formula (3),

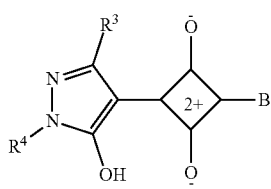

Formula (3)

here, $R^3$ and $R^4$ represent a hydrogen atom or a substituent, and
B is the same as B in Formula (2A).

14. A compound represented by Formula (6),

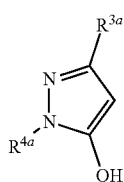

Formula (6)

in the formula, $R^{3a}$ and $R^{4a}$ represent a hydrogen atom or a substituent and at least one of $R^{3a}$ or $R^{4a}$ represents a group represented by Formula (2 MB),

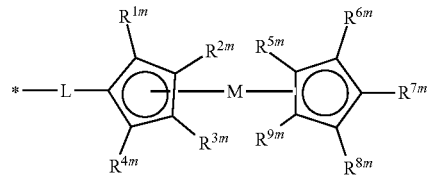

Formula (2MB)

here, L is a single bond, a group selected from the group consisting of an alkylene group having 1 to 8 carbon atoms, an arylene group having 6 to 12 carbon atoms, —CH=CH—, —CO—, —NR—, —O—, —S—, —SO₂—, and —N=CH—, or a group of a combination of two or more groups selected from the group consisting thereof, in which R represents a hydrogen atom or a monovalent substituent, $R^{1m}$ to $R^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part.

15. A compound represented by Formula (7),

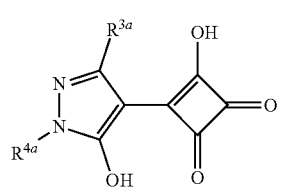

Formula (7)

in the formula, $R^{3a}$ and $R^{4a}$ represent a hydrogen atom or a substituent and at least one of $R^{3a}$ or $R^{4a}$ represents a group represented by Formula (2 MB),

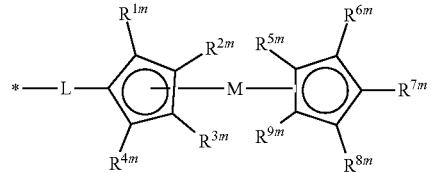

Formula (2MB)

here, L is a single bond, a group selected from the group consisting of an alkylene group having 1 to 8 carbon atoms, an arylene group having 6 to 12 carbon atoms, —CH=CH—, —CO—, —NR—, —O—, —S—, —SO₂—, and —N=CH—, or a group of a combination of two or more groups selected from the group consisting thereof, in which R represents a hydrogen atom or a monovalent substituent, $R^{1m}$ to $R^{9m}$ represent a hydrogen atom or a substituent, M represents Fe, Co, Ni, Ti, Cu, Zn, Zr, Cr, Mo, Os, Mn, Ru, Sn, Pd, Rh, V, or Pt, and * represents a bonding part.

* * * * *